(12) United States Patent
Barnitt et al.

(10) Patent No.: US 11,971,872 B2
(45) Date of Patent: Apr. 30, 2024

(54) GENERATING USER ATTRIBUTE VERIFICATION SCORES TO FACILITATE IMPROVED DATA VALIDATION FROM SCALED DATA PROVIDERS

(71) Applicant: Truthset, Inc., San Francisco, CA (US)

(72) Inventors: Kathryn Ward Barnitt, Emeryville, CA (US); Nawid Sayed, Dossenheim (DE); Aditya Chaturvedi, Dublin (IE); Theodore Jacob Kornish, San Francisco, CA (US); Yacov Salomon, Danville, CA (US); Scott Matthew McKinley, Mill Valley, CA (US)

(73) Assignee: Truthset, Inc., San Francisco, CA (US)

( * ) Notice: Subject to any disclaimer, the term of this patent is extended or adjusted under 35 U.S.C. 154(b) by 0 days.

(21) Appl. No.: 17/475,856

(22) Filed: Sep. 15, 2021

(65) Prior Publication Data
US 2022/0374412 A1 Nov. 24, 2022

Related U.S. Application Data

(60) Provisional application No. 63/188,382, filed on May 13, 2021.

(51) Int. Cl.
| | | |
|---|---|---|
| G06F 16/23 | (2019.01) | |
| G06F 3/04847 | (2022.01) | |
| G06F 16/215 | (2019.01) | |
| G06F 3/048 | (2013.01) | |

(52) U.S. Cl.
CPC ...... *G06F 16/2365* (2019.01); *G06F 3/04847* (2013.01); *G06F 16/215* (2019.01)

(58) Field of Classification Search
CPC ............ G06F 16/2365; G06F 3/04847; G06F 16/215; G06F 16/25; G06F 3/0482; G06F 3/04842
See application file for complete search history.

(56) References Cited

U.S. PATENT DOCUMENTS

| | | |
|---|---|---|
| 2009/0150166 A1 | 6/2009 | Leite et al. |
| 2012/0284090 A1* | 11/2012 | Marins ............... G06Q 10/0631 705/7.39 |
| 2013/0013489 A1 | 1/2013 | Kremen et al. |
| 2014/0025741 A1 | 1/2014 | Shuster |
| 2015/0006529 A1 | 1/2015 | Kneen et al. |

(Continued)

OTHER PUBLICATIONS

Statistical Inference, Second Edition, George Casella and Roger L. Berger; 2002; Part 1.

(Continued)

*Primary Examiner* — Kris E Mackes
*Assistant Examiner* — Cecile H Vo
(74) *Attorney, Agent, or Firm* — Keller Preece PLLC

(57) ABSTRACT

This disclosure describes one or more implementations of a data verification system that provides accurate validations of user trait data for data providers. For example, in various implementations, the data verification system generates and utilizes data verification models and approaches to determine the probability that user trait data obtained by data providers is accurate and correct. In this manner, the data verification system can independently evaluate the accuracy of both individual user records as well as collective segments of user records for data providers.

20 Claims, 20 Drawing Sheets

(56) References Cited

U.S. PATENT DOCUMENTS

| | | | |
|---|---|---|---|
| 2015/0081602 | A1 | 3/2015 | Talley et al. |
| 2015/0106390 | A1* | 4/2015 | Fuchs ............... G06F 16/24578 707/749 |
| 2020/0133955 | A1* | 4/2020 | Padmanabhan ........ G06Q 30/01 |
| 2021/0110343 | A1* | 4/2021 | Lagneaux ............... H04L 9/321 |
| 2021/0124919 | A1* | 4/2021 | Balakrishnan ....... B42D 25/309 |

OTHER PUBLICATIONS

Statistical Inference, Second Edition, George Casella and Roger L. Berger; 2002; Part 2.

Statistical Inference, Second Edition, George Casella and Roger L. Berger; 2002; Part 3.

The Probability Lifesaver, Stephen J. Miller, 2017, Princeton University Press.

Introduction to Bayesian Statistics, Third Edition, William M. Bolstad and James M. Curran; 2017; Part 1.

Introduction to Bayesian Statistics, Third Edition, William M. Bolstad and James M. Curran; 2017; Part 2.

Introduction to Bayesian Statistics, Third Edition, William M. Bolstad and James M. Curran; 2017; Part 3.

Introduction to Bayesian Statistics, Third Edition, William M. Bolstad and James M. Curran; 2017; Part 4.

Introduction to Bayesian Statistics, Third Edition, William M. Bolstad and James M. Curran; 2017; Part 5.

Estimation in Surveys with Nonresponse, Carl-Erik Sarndal, Sixten Lundstrom; Jul. 22, 2005.

Calibration Estimators in Survey Sampling, Jean-Claude Deville and Carl-Eric Sarndal, Journal of the American Statistical Association, vol. 87, Jun. 1992.

Calibration Estimators in Survey Sampling, Jae Kwang Kim and Mingue Park, International Statistical Review, Apr. 2010.

An Introduction to Calibration Estimators, Jennifer H. Nguyen, 2011.

Charles M. Grinstead and J. Laurie Snell; Grinstead and Snell's Introduction to Probability, Version dated Jul. 4, 2006; published by the American Mathematical Society.

Distributions of the Linear Combination of Two or More general beta variables and applications, T. Pham-Gia and N. Turkkan, Jun. 2007.

Sums, products and ratios of generalized beta variables, Saralees Nadarajah, Department of Statistics, University of Nebraska, revised version May 5. 2004.

The Optimality of Naive Bayes, Harry Zhang, available at: http://www.cs.unb.ca/~hzhang/publications/FLAIRS04ZhangH.pdf; Faculty of Computer Science; University of New Brunswick; 2004.

Beyond Independence: Conditions for the Optimality of the Simple Bayesian Classifier, Pedro Domingos and Michael Pazzani, available at: https://homes.cs.washington.edu/~pedrod/papers/mlc96.pdf; Published in ICML; 1996.

Statistical Data Mining and Machine Learning, Prof Dino Sejdinovic, Oxford University, Hilary Term; 2016, available at: http://www.stats.ox.ac.uk/~sejdinov/sdmml/.

Statistical Programming, Prof Geoff Nichols, Oxford University, Hilary Term; 2019, available at: http://www.stats.ox.ac.uk/~nicholls/PartASSP/prog_slid.pdf#page=1.

Introduction to Probability and Statistics, Massachusetts Institute of Technology, Spring 2014, "Conjugate priors: beta and normal" https://ocw.mit.edu/courses/mathematics/1805-introduction-to-probability-and-statistics-spring-2014/readings/MIT18_05S14_Reading15a.pdf.

Bayesian Modeling and Inference, Prof. Michael Jordan, Chapter 9 the Exponential Family, Conjugate Priors, 2010; available at: https://people.eecs.berkeley.edu/~jordan/courses/260-spring10/other-readings/chapter9.pdf.

Diaconis, P. and Ylvisaker, D. 1979. Conjugate priors for exponential families. Annals of Statistics, 7269281, available at: https://statweb.stanford.edu/~cgates/PERSI/papers/conjprior.pdf.

"Effective Sample Size for Importance Sampling", L. Martino and V. Elvira; Date downloaded Sep. 27, 2021; available at: http://www.lucamartino.altervista.org/ESS_PRES_tsc.pdf.

The Wisdom of Crowds, James Surowiecki, Anchor Press, 2004; Part 1.

The Wisdom of Crowds, James Surowiecki, Anchor Press, 2004; Part 2.

Catherine Tucker and Nico Neumann, Harvard Business Review, "Buying Consumer Data? Tread Carefully," May 1, 2020. At https://hbr.org/2020/05/buying-consumer-data-tread-carefully.

Ross Benes; Digiday, "Why is third party data so often wrong," Jan. 5, 2017 at https://digiday.com/marketing/data-vendors-struggle-gender/.

Kevin Gianatiempo; GreenBook, "The Publisher's Secret Weapon, Using Self-Declared Data to Build Audience Profiles," May 22, 2017; at https://www.greenbook.org/mr/market-research-methodology/generating-accurate-audience-data-publishers-secret-weapon-in-competition- with-facebook-and-google/.

International Search Report & Written Opinion as received in PCT/US2022/072215 dated Aug. 10, 2022.

Gupta. "The 6 dimensions of data quality." Collibra. Apr. 6, 2021 (Apr. 6, 2021) Retrieved on Jul. 8, 2022 (Jul. 8, 2022) from <https://www.collibra.corniusten/blog/the-6-dimensions-of-data-quality> entire document.

* cited by examiner

320

Validation Dataset — Data Provider (Age)

| Age | 18-24 | 25-34 | 35-44 | 45-54 | 55-64 | 65+ | |
|---|---|---|---|---|---|---|---|
| 18-24 | 400 | 75 | 5 | 0 | 0 | 0 | 480 |
| 25-34 | 100 | 300 | 50 | 80 | 0 | 0 | 530 |
| 35-44 | 50 | 75 | 350 | 70 | 5 | 25 | 575 |
| 45-54 | 25 | 40 | 75 | 225 | 55 | 25 | 445 |
| 55-64 | 13 | 35 | 15 | 75 | 275 | 100 | 513 |
| 65+ | 12 | 25 | 5 | 50 | 115 | 250 | 457 |
| Totals: | 600 | 550 | 500 | 500 | 450 | 400 | 3000 |

330

Validation Dataset — Data Provider (Age)

| Age | 18-24 | 25-34 | 35-44 | 45-54 | 55-64 | 65+ |
|---|---|---|---|---|---|---|
| 18-24 | 0.67 | 0.14 | 0.01 | 0.00 | 0.00 | 0.00 |
| 25-34 | 0.17 | 0.55 | 0.10 | 0.16 | 0.00 | 0.00 |
| 35-44 | 0.08 | 0.14 | 0.70 | 0.14 | 0.01 | 0.06 |
| 45-54 | 0.04 | 0.07 | 0.15 | 0.45 | 0.12 | 0.06 |
| 55-64 | 0.02 | 0.06 | 0.03 | 0.15 | 0.61 | 0.25 |
| 65+ | 0.02 | 0.05 | 0.01 | 0.10 | 0.26 | 0.63 |
| Totals: | 1 | 1 | 1 | 1 | 1 | 1 |

*Fig. 3B*

Data Provider A (340)

| Validation Set | Gender | Male | Female |
|---|---|---|---|
| | Male | 0.82 | 0.11 |
| | Female | 0.18 | 0.89 |

Data Provider B (350)

| Validation Set | Gender | Male | Female |
|---|---|---|---|
| | Male | 0.75 | 0.08 |
| | Female | 0.25 | 0.92 |

*Fig. 3C*

GENERATING USER ATTRIBUTE VERIFICATION SCORES TO FACILITATE IMPROVED DATA VALIDATION FROM SCALED DATA PROVIDERS

CROSS REFERENCE TO RELATED APPLICATIONS

This application claims the benefit of priority to U.S. Provisional Patent Application No. 63/188,382, filed May 13, 2021, and titled GENERATING USER ATTRIBUTE VERIFICATION SCORES TO FACILITATE IMPROVED DATA VALIDATION FROM SCALED DATA PROVIDERS, which is incorporated herein by reference in its entirety.

BACKGROUND

Recent years have seen significant improvements in hardware and software platforms for gathering and obtaining personal-level data. For instance, data providers continue to implement improved methods to gather, request, monitor, observe, receive, or otherwise obtain user trait information about individuals. Notwithstanding these improvements, data providers continue to suffer from several problems with regard to the data accuracy. As an example, despite improved data gathering methods, data providers often collect inaccurate information. Furthermore, in many instances, these data providers are unable to accurately discover what portions of their information are incorrect. As another example, when a data provider is unable to gather a full set of user trait information, the data provider often employs models to estimate or infer missing trait information. Again, these data providers are unable to determine when estimated and inferred information is incorrect. When relying on false and incorrect data, data providers can inefficiently waste computing resources by targeting a fictional audience. Accordingly, these along with additional problems and issues exist.

BRIEF SUMMARY

Implementations of the present disclosure provide benefits and/or solve one or more of the foregoing or other problems in the art with systems, non-transitory computer-readable media, and methods that accurately, flexibly, and efficiently measure the accuracy of user information of a data provider. For example, one or more embodiments determine user attribute verification scores for user attributes provided by a data provider. Indeed, in various implementations, the disclosed systems determine user attribute verification scores (e.g., truth scores) by cross-referencing assertions from multiple data providers with smaller, highly accurate sources of declared data.

To illustrate, in various implementations, the disclosed systems utilize user trait data from data providers and validation datasets to determine the accuracy of each data provider. The disclosed systems also utilize the accuracy rates across the multiple data providers to determine the likelihood that a user attribute for a user record is true and accurate. In some implementations, the disclosed systems generate a user attribute verification score database (e.g., truth score database) that indicates user attribute verification scores for each user attribute value assigned to a user record. In this manner, the disclosed systems can independently evaluate and validate the accuracy of individual user data for data providers as well as facilitate the removal of incorrect and false user information.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

FIGS. 3A-3C illustrate block diagrams of determining user attribute accuracy rates for data providers in accordance with one or more implementations.

DETAILED DESCRIPTION

Figure 1:
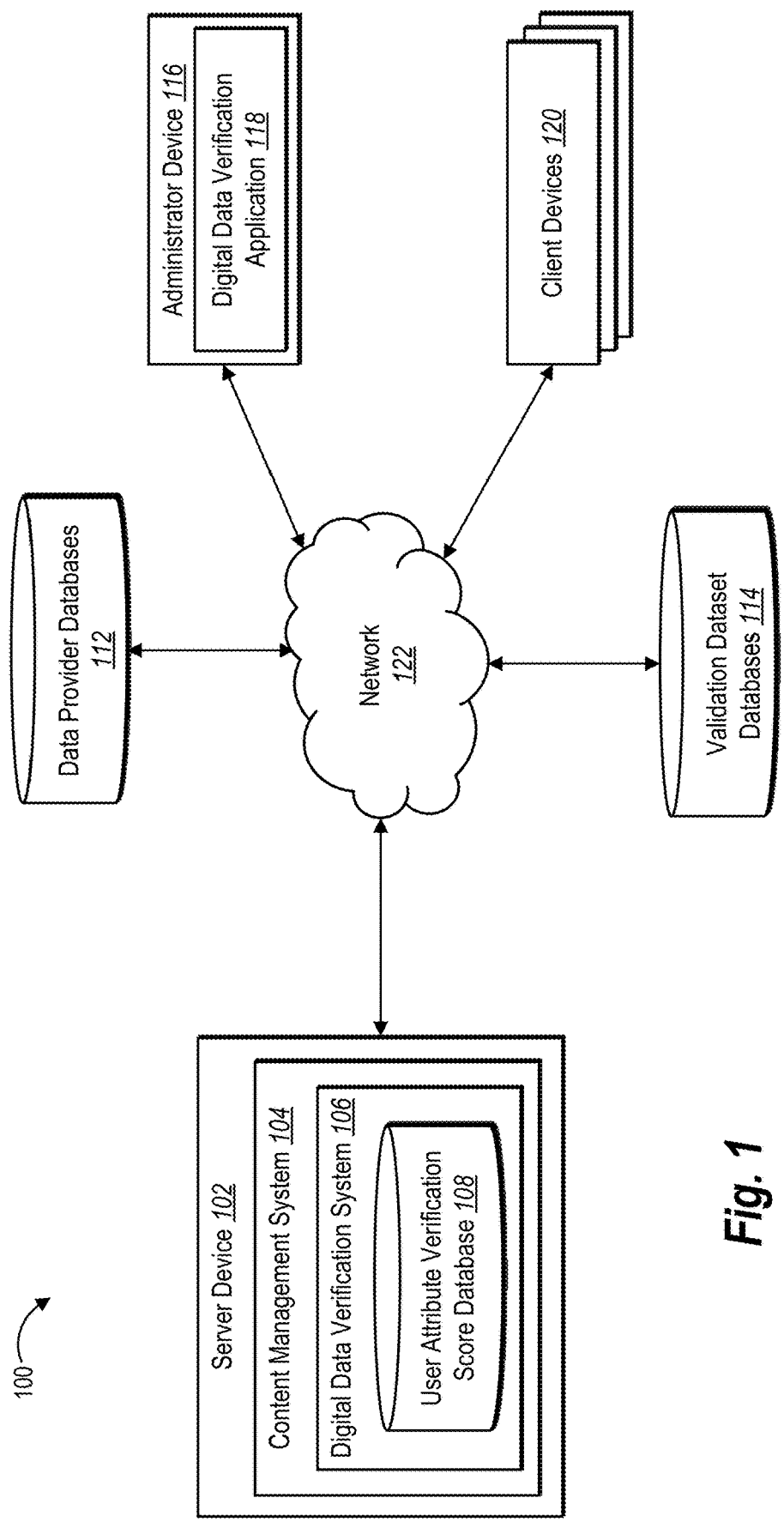
FIG. 1 illustrates a schematic diagram of a system environment in which a digital data verification system operates in accordance with one or more implementations.

This disclosure describes one or more implementations of a digital data verification system (or simply "data verification system") that provides accurate validations of user trait data for data providers. For example, in various implementations, the data verification system generates and utilizes data verification models and approaches to determine the probability (e.g., a truth score) that user trait data obtained by data providers is accurate and correct. In this manner, the data verification system can independently evaluate the accuracy of both individual user records as well as collective segments of user records from data providers. Additionally, in some implementations, the data verification system can also detect when the data verification models and approaches begin to over-correct or under-correct to ensure that the data verification system itself is determining accurate results.

To illustrate, in various implementations, the data verification system receives user trait data from multiple data providers where the user trait data includes user identifiers and corresponding user attributes. Similarly, the data verification system can receive additional user trait data from one or more validation datasets. In addition, in one or more implementations, the data verification system determines a user attribute accuracy rate for each data provider based on comparing target user attributes of user identifiers included in the user trait data to the corresponding user attributes from the validation datasets. Further, by utilizing the user attribute accuracy rates determined for each data provider, the data verification system can generate a target user attribute verification score (e.g., a user attribute truth score) for each user attribute of each user identifier. Moreover, the data verification system can generate a user attribute verification score database (e.g., a truth score database) that stores user attribute verification scores for user attributes of each user identifier.

As mentioned above, the data verification system can receive user trait data from multiple data sources. For example, in one or more implementations, the data verification system receives user trait data from multiple data providers. In general, data providers maintain large-scaled datasets that may include questionable accuracy. For instance, a data provider often includes implicitly gathered or estimated user trait data. In addition, the data verification system receives user trait data from one or more validation datasets. In many implementations, a validation dataset maintains a smaller number of records than a data provider. However, validation datasets largely include declared data that is highly accurate. For instance, validation datasets often include self-reported user trait data that is frequently sampled and re-verified.

As also mentioned above, in various implementations, as part of generating user attribute verification scores (e.g., truth scores) for user attributes of a user identifier, the data verification system first determines a user attribute accuracy rate for a data provider. In one or more implementations, the data verification system identifies user identifiers in user trait data from a data provider that also belong to a validation dataset. For these matching user identifiers, the data verification system can compare user attributes listed in the user trait data from the data provider to the corresponding user attributes listed in the validation dataset to determine the number of user attributes that are accurately listed in the user trait data from the data provider. The data verification system can then utilize the number of accurate user attributes to generate a user attribute accuracy rate for the user attribute of the user trait data from the data provider.

In various implementations, utilizing the user attribute accuracy rates for multiple data providers, the data verification system can generate a user attribute verification score for a user identifier. For example, in a number of implementations, the data verification system utilizes a wisdom of the crowds approach to generate user attribute accuracy rates (e.g., truth scores) for user attribute values of a user identifier. For instance, in one or more implementations, the data verification system weights the user attribute value for a target user attribute of a user identifier from a first data provider by the first data provider's user attribute accuracy rate for the target user attribute. The data verification system performs similar actions for the same user attribute value from a second data provider or additional data providers. The data verification system can then combine the weighted user attribute values to determine a user attribute verification score for the user attribute value of the user identifier.

Indeed, by combining user attribute values across data providers, the data verification system can determine a user attribute verification score for user identifiers, even if the user identifier is not found in a validation dataset. In various implementations, the data verification system combines multiple validation datasets into an aggregated or combined validation dataset. In this manner, the data verification system can compare the data of any given data provider against the combined validation dataset to determine the user attribute accuracy rate for the data provider.

In some implementations, the data verification system performs conflict resolution for duplicative user identifiers upon generating the combined validation dataset, as further described below. For example, in various implementations, the data verification system 106 determines that multiple entries for the user identifier are present within a validation dataset. Further, the data verification system 106 determines that the duplicate user identifier include conflicting user trait data. Accordingly, the data verification system 106 can perform one or more actions to resolve conflicting user trait data, further described below.

In various implementations, the data verification system determines and corrects underlying data skew in a validation dataset. For instance, in one or more implementations, the detects an amount of deviation between user trait data in a validation dataset and an aggregated statistical user data. Based on the detected deviation, in some implementations, the data verification system 106 determines and applies a user attribute correction factor to the data verification system 106 to correct the underlying data skew.

Additionally, in example implementations, the data verification system aligns user attribute value ranges between data providers and validation datasets, as provided below. To illustrate, in some implementations, the data verification system 106 determines that the user attribute values for a user attribute do not match between two sources of user trait data. In these implementations, the data verification system 106 can utilize one or more statistical models to redistribute one of the data sources to align with the other data source.

In one or more implementations, the data verification system validates the accuracy of the user attribute verification scores. For example, in some implementations, the data verification system withholds a percentage of randomly selected user trait data from the validation dataset for subsequent testing of user attribute verification score. In these implementations, the data verification system compares user identifiers in holdout data to corresponding user attribute verification scores in the user attribute verification score database to determine if a linear correspondence exists. When discrepancies are identified, the data verification system applies the appropriate corrections, as detailed below.

In various implementations, the data verification system utilizes the user attribute verification scores of user identifiers in the user attribute verification score database to improve the accuracy of data provided by data providers. For example, as described below, the data verification system can generate corrected and/or improved user identifier segments based on the user attribute verification scores. In some implementations, the data verification system provides an interactive graphical user interface that displays segments of user identifiers that satisfy user attribute verification score thresholds. In additional implementations, when changes to the user attribute verification score threshold within the interactive interface are detected, the data verification system can update, on-the-spot, displayed results within the interactive interface to reflect the requested changes.

In some implementations, the data verification system facilitates the selection of target segments that meet particular accuracy and verification thresholds. For example, the data verification system can provide an interactive graphical user interface that allows a client device (e.g., an administrator client device) to navigate and select one or more user identifier segments that include user identifiers that accurately reflect a target criteria. Additionally, as described below, in various implementations, the data verification system provides up-to-date reporting on digital content campaigns based on the accuracy of their current audiences.

As mentioned above, conventional systems suffer from a number of problems with regard to the accuracy and flexibility of determining user trait information. To illustrate, regarding accuracy, many data providers produce inaccurate user trait data. As a first example, many data providers collect inaccurate user trait data. For example, a data provider frequently obtains trait data about a user that does not accurately reflect the user, such as the wrong gender, age, race, income, or interest. Incorrect user trait data, due to these inaccuracies, causes the data provider to execute wasteful and inefficient computing operations (e.g., providing digital resources to the wrong segment of target user identifiers). Further, third-party systems are unable to rely on user trait data from a data provider due to the questionable validity of the data, especially when relying heavily on the correctness of user trait data at the user attribute level for specific user identifiers.

As another example, while data providers can discover some user attributes of a user, they are commonly unable to discover a full set of user attributes for the user. In some cases, a data provider obtains only one or two user attributes out of a large set of potential user attributes. In these cases, data providers often model out values through estimates and inferences. For example, a data provider interpolates missing pieces of user information based on other user trait data (e.g., other demographics) that the data provider presumes about a user identifier. Again, if the presumed user trait data is incorrect, the inferred data will also be incorrect. Further, even with correctly presumed user information, data providers often make inaccurate inferences of questionable accuracy. As noted above, incorrect user trait data at the data provider can result in additional problems, such as improper modeling, mistargeting audience segments, and inefficient computing operations.

As another issue, data providers vary greatly with respect to user trait data accuracy, and systems that rely on user trait data from data providers are unable to determine which data provider includes true user trait data for a given user identifier. Further, because of these accuracy discrepancies, combining user trait data from multiple data providers can corrupt the combined set of user trait data due to unknown inaccuracies.

As mentioned above, many conventional systems are also inflexible. For example, several data providers and/or other digital content campaign conventional systems are unable to provide real-time reporting with respect to the accuracy of a reached audience for ongoing digital content campaigns. Often, these conventional systems often rely on user responses to determine whether their reached audience reflects the metrics set for a digital content campaign. For example, these conventional systems may not be able to correctly report whether digital content intended for 18-24 year-olds was actually provided to this age group until a later time in the digital content campaign. Indeed, these conventional systems are limited in their ability to determine whether the audience to which digital content is being provided accurately reflects the reached audience. As a result, these conventional systems are unable to make changes and/or optimizations in real time, which results in inefficiencies and wasted computing resources, as described above.

The data verification system can provide numerous advantages and benefits over conventional systems. As described below, in many implementations, the data verification system improves accuracy by validating the user trait data of data providers. As noted above, in various implementations, the data verification system utilizes a combination of data providers and validation datasets to initially determine user attribute accuracy rates for each data provider. The data verification system can then generate user attribute verification scores for user attribute values of a user identifier based on the user attribute accuracy rates of the data provider. In some implementations, the data verification system utilizes a weighted wisdom of the crowds approach to generate the user attribute verification scores.

By utilizing the user attribute verification scores, the data verification system can determine and/or reveal the accuracy of the user trait data of a data provider. In particular, in various implementations, the data verification system determines the likelihood or probability that a user attribute value reported for a user identifier is true and correct. Additionally, the data verification system can utilize the user attribute verification scores to validate segments of user identifiers to indicate whether the user identifiers actually are associated with a target user attribute value.

In some implementations, the data verification system improves accuracy by culling or removing inaccurate user trait data. For example, a data provider identifies a segment of user identifiers that have a target user attribute value (e.g., female) and provides the user identifier segment to the data verification system. In one or more implementations, the determines the validity probability of the target user attribute value for each user identifier (e.g., the likelihood that each user identifier is really female). The data verification system can remove user identifiers from the segment that fail to satisfy the target user attribute value.

As mentioned above, data providers often provide data with questionable accuracy. In many instances, the data verification system is able to correct or improve the accuracy of questionable data by updating user identifier segments. Indeed, the data verification system is able to maintain correct data in a dataset while removing incorrect user trait data on a per-user identifier level, which can result in highly accurate and precise audience segments. Further, the data verification system can provide a similar refinement process based on a combination of target user attribute values.

Further, the data verification system improves flexibility relative to conventional systems. As mentioned above, the data verification system provides user attribute verification scores for multiple data providers. Additionally, the data verification system can utilize user attribute verification scores to perform a variety of validation operations. For example, in some implementations, the data verification system provides real-time feedback with respect to a digital content campaign. In particular, the data verification system can provide immediate feedback as to whether the reached audience (e.g., the users receiving the digital content) accurately reflects the target criteria of the digital content campaign. In this manner, the data verification system allows for quick adjustment, correction, and optimization of digital content campaign parameters based on real-time feedback, which reduces inefficiencies and wasted computing resources caused by rigid conventional systems, as previously described. Indeed, because the data verification system quickly and accurately validates user trait data, the data verification system can flexibly provide unprecedented insight into digital content campaigns.

As illustrated by the foregoing discussion, the present disclosure utilizes a variety of terms to describe the features and advantages of the media segment system. To illustrate, the term "user trait data" refers to a user attribute information that corresponds to a user identifier. User trait data can include demographic information, digital media information, biographic information, behavioral information, social information, employment information, economic information, interest information, and/or other types of descriptive user information. The data verification system can receive user trait data from various sources, such as from data providers (i.e., data provider devices) and/or validation dataset devices. When referring to user trait data received from validation dataset devices, the term validation dataset is often used herein.

As used herein, the term "user identifier" refers to an identifier that uniquely (or with a very high probability) identifies a particular user. For instance, a user identifier includes a name, username, phone number, email address, or other distinguishing user labels. In various implementations, the data validation system hashes the user identifier or otherwise obfuscates user identifiers to protect the identity of the user. For example, in one or more implementations, a user identifier includes a hashed email address (or HEM).

The term "user attribute" (or simply "attribute"), as used herein, refers to characteristics and descriptions of a person associated with a user identifier. In some implementations, a user attribute includes demographic-based descriptors of a person associated with an individual user identifier, such as age, gender, ethnicity, presence of children in a household (or HH), household income, or geographic location. In some implementations, a user attribute includes digital behavior information of a user identifier. In various implementations, a user attribute includes other user information that describes and/or classifies a user.

In many implementations, a user attribute corresponds to an attribute classification, which is further defined by a user attribute value. As used herein, the terms "user attribute value" "attribute value," or "assertion" refer to a distinct value or level for a given user attribute. For example, for the user attribute of birth year, the corresponding user attribute value is a specific year in which a user was born. User attribute values or assertions include binary values, a range of values, or multiple selected values.

As mentioned above, the data verification system generates a user attribute accuracy rate for data providers. As used herein, the term "user attribute accuracy rate" refers to a level or amount of accuracy for a given user attribute and/or user attribute value across user trait data of a data provider. In some implementations, a user attribute accuracy rate includes the average accuracy of an asserted user attribute value for user identifiers that can be verified against a validation dataset (e.g., the number of user identifiers that indicate an age of 18-24 that are verified as being 18-24). In one or more implementations, the data verification system determines a user attribute accuracy rate for each user attribute value of a user attribute.

The terms, "user attribute verification score," "truth score," or "Truthscores™" refer to a probability or likelihood that a particular user identifier is accurately associated with an asserted attribute value (e.g., as indicated by a data provider). For instance, a user attribute verification score quantifies the probability that a user attribute value asserted by a data provider is correct. In various implementations, a user attribute verification score ranges from 0-1, but can include other numerical ranges, such as −1-0 or −1-1, 0-10, 1-10, 0-100, 1-100, etc. When utilizing a scoring range from 0-1, the combined user attribute verification scores across a user attribute commonly sums to 1.0. In example implementations, the data verification system distributes user attribute verification scores for a user attribute value into ten decile groups where deciles includes all user attribute verification score that fall between 0.0-0.1, 0.1-0.2, 0.2-0.3, . . . , 0.9-1.0). Further, as described below, in many implementations, the data verification system stores user attribute verification score for each user attribute associated with a user identifier in a user attribute verification score database (or table).

As used herein, the terms "declared data" or "declared user data" refer to collected data. In particular, declared data refers to data that is not inferred, modeled, estimated, or extrapolated data. For instance, declared data includes user trait data such as self-reported, declared user data. For example, declared data includes user data gathered directly from users via survey panels. Some examples of declared data include user data gathered from survey panels, intake surveys, behavioral panels, consumer surveys, and/or opt-in provided user information. In various implementations, validation dataset database(s) include declared data.

Additional detail regarding the data verification system will now be provided with reference to the figures. For example, FIG. 1 illustrates a schematic diagram of a digital medium system environment 100 in which a digital data verification system 106 (or simply "data verification system 106") operates in accordance with one or more implementations. As shown in FIG. 1, the digital medium system environment 100 ("environment 100") includes a server device 102, data provider databases 112 provided by data providers, validation dataset databases 114, an administrator device 116, and client devices 120 connected via a network 122. Additional detail regarding these computing devices is provided below in connection with FIG. 12. In addition, FIG. 12 also provides additional detail regarding networks, such as the illustrated network 122.

As shown, the environment 100 includes the server device 102, which includes a content management system 104. The content management system 104 performs a variety of functions. For example, in one or more implementations, the content management system 104 facilitates the distribution of various digital content items across the network 122. For instance, the content management system provides digital content items to the client devices 120 as part of a digital content campaign. Indeed, in various implementations, the content management system 104 facilitates, identifies, receives, accesses, opens, provides, shares, removes, stores, transmits, and/or imports digital content items. Examples of digital content items include digital images, text, links, advertisements, webpages, applications, and/or other media.

As illustrated, the content management system 104 includes a data verification system 106 (i.e., a digital data verification system) having a user attribute verification score database 108. While shown within the content management system 104, in various implementations, the data verification system 106 is located apart from the content management system 104. Further, in some implementations, the data verification system 106 is implemented on a client device (e.g., the administrator device 116) or across multiple computing devices (e.g., on both a server device and one or more client devices).

In one or more implementations, the data verification system 106 generates user attribute verification scores (e.g., truth scores) for user identifiers. For instance, in various implementations, the data verification system 106 receives user information from the data providers (e.g., user trait data from the data provider databases 112) and the validation dataset database(s) 114. In addition, the data verification system 106 can compare the user information to determine user attribute accuracy rates for the data providers. Further, based on the data provider accuracy rates, the data verification system 106 can determine the user attribute verification scores. Additional detail regarding operations and approaches of the data verification system 106 is provided below.

As shown, the data verification system 106 includes the user attribute verification score database 108 (e.g., a truth score database). In various implementations, the user attribute verification score database 108 (or simply "attribute score database 108") includes the user attribute verification scores of each user attribute verified by the data verification system 106. For example, in many implementations, the attribute score database 108 includes a user attribute verification score per user attribute value per user attribute per user identifier. Additional detail regarding the attribute score database 108 is provided below.

As illustrated, the environment 100 includes the user trait databases 112 provided/maintained by data providers. In various implementations, the data provider databases 112 include consumer-level user information stored as user attribute values or user attribute assertions in connection with user identifiers. For example, a data provider database 112 maintains a large list of user identifiers (e.g., hashed email addresses or HEMs) and each user identifier includes assertions (or user attribute values) for a dozen or more user attributes. In some instances, the user attributes include demographic data, such as gender, age, household income, presence of children, race, and/or ethnicity. Accordingly, for each user attribute of each user identifier, a data provider can include an assertion (i.e., user attribute value) of the user attribute.

As shown, the user information can be stored within a data provider database 112 by a data provider. Generally, each of the data provider databases 112 includes tens of millions to hundreds of millions user identifiers. For example, when user trait data is combined across multiple data providers, the validation dataset may receive over a billion unique user identifiers. In some implementations, the user identifiers are separated into user segments, such as segments sorted by a particular user attribute or combinations of user attributes.

In various implementations, the data provider can continually additionally, edit, revise, or remove user identifiers and/or user attribute assertions from the data provider databases 112. For example, as mentioned above, the data provider may collect user trait data both explicitly and implicitly. For instance, a data provider observes a number of user traits with respect to a user browsing an e-commerce website. For user traits not observed, the data provider can model or extrapolate the user attribute values. Accordingly, while the number of user identifiers and the amount of user trait data can be vast, in many cases, the user trait data within the data provider databases 112 includes estimated assertions rather than observed user actions, which can be of questionable accuracy and validity.

As illustrated, the environment 100 includes the validation dataset database(s) 114. Similar to the data provider databases 112 provided by data providers, the validation dataset database(s) 114 can store user trait data. For example, the user trait data includes demographic user attributes and/or other overlapping user trait data with one or more of the data provider databases 112 provided by a data. Unlike data provider databases 112, however, the user trait data provided by validation dataset database(s) 114 is highly accurate. In many instances, a validation dataset database(s) 114 provides user trait data that includes self-reported, declared user data (e.g., user data gathered from survey panels, intake surveys, behavioral panels, consumer surveys, and/or opt-in provided user information). Indeed, in one or more implementations, the user trait data for the validation dataset database(s) 114 does not include modeled, estimated, or extrapolated data.

In various implementations, user trait data from a validation dataset database 114 is often referred to as a validation dataset to distinguish it from user trait data received from a data provider. Indeed, as described below, user trait data from a validation dataset is presumed as true and serves as ground truth for comparing user trait data from data providers. Additionally, the data verification system 106 can utilize the user trait data from validation datasets to test and correct user attribute verification score deviations, as described below with respect to FIGS. 6A-6B.

For context, while the data provider databases 112 can combine to include over a billion user identifier entries, the validation dataset database(s) 114 can combine to provide over a million user identifier entries, although the and the validation dataset database(s) 114 can include any number of user identifier entries. In some cases, some of the user identifiers (e.g., ~4,000) from the validation dataset database 114 overlaps from two or more other validation dataset databases 114. In the event of conflicting user attribute values or assertions for a user identifier, the data verification system 106 resolves the conflict, which is described below in connection with FIG. 5.

In various implementations, the validation dataset database(s) 114 ensures high levels of accuracy by implementing various due diligence actions. For example, in one or more implementations, the validation dataset database(s) 114 routinely verify and/or validate reported user attribute assertions, re-survey panelists, utilize models to detect fraudulent responses, and/or perform statistical analyses. Further, validators of the validation dataset database(s) 114 may recruit a diverse group of respondents to achieve balanced datasets. In some implementations, the data verification system 106 may require a validator to practice one or more of the above actions before accepting user trait data as part of a validation dataset.

As illustrated, the environment 100 includes the administrator device 116. In various implementations, the administrator device 116 is a client device that enables a user (e.g., an administrator) to communicate with the data verification system 106. In one or more implementations, the administrator device 116 is associated with one or more of the data providers and facilitates providing user trait data to the data verification system 106. In some implementations, the administrator device 116 is similarly associated with one or more of the validation dataset database(s) 114.

In various implementations, the administrator device 116 accesses an interactive graphical user interface provided by the data verification system 106 (via a digital data verification application 118) for selecting, viewing, modifying, and/or providing user identifier segments in connection with the data verification system 106 generating user attribute verification scores for the user identifier segments. For example, in one or more implementations, the data verification system 106 receives a user identifier segment via the administrator device 116 and provides, in return, an updated user identifier segment based on user attribute verification scores, as described below in connection with FIGS. 8C and 8D. In some implementations, the administrator device 116 facilitates the management of a digital content campaign via the digital data verification application 118, as described below in connection with FIGS. 9A and 9B.

As illustrated, the environment 100 includes the client devices 120. In one or more implementations, one or more of the client devices 120 correspond to users that provide user trait data, either explicitly or inherently, to one of the data providers and/or validators that is in turn stored in the data provider databases 112 and/or validation dataset database(s) 114. In some implementations, one or more of the client devices 120 correspond to a user that receives a digital content item from the content management system 104 and/or data verification system 106.

Although FIG. 1 illustrates a particular number, type, and arrangement of components within the environment 100, various additional environment configurations are possible. For example, the server device 102 represents a set of connected server devices. Additionally, the server device 102 may communicate directly with the administrator device 116, bypassing the network 122, or utilizing a separate and/or an additional network. In some implementations, the administrator device 116 (or function described in connection with the administrator device 116) may be performed directly on the server device 102. Further, in some implementations, the environment 100 includes additional components, such as additional administrator devices.

Figure 2:
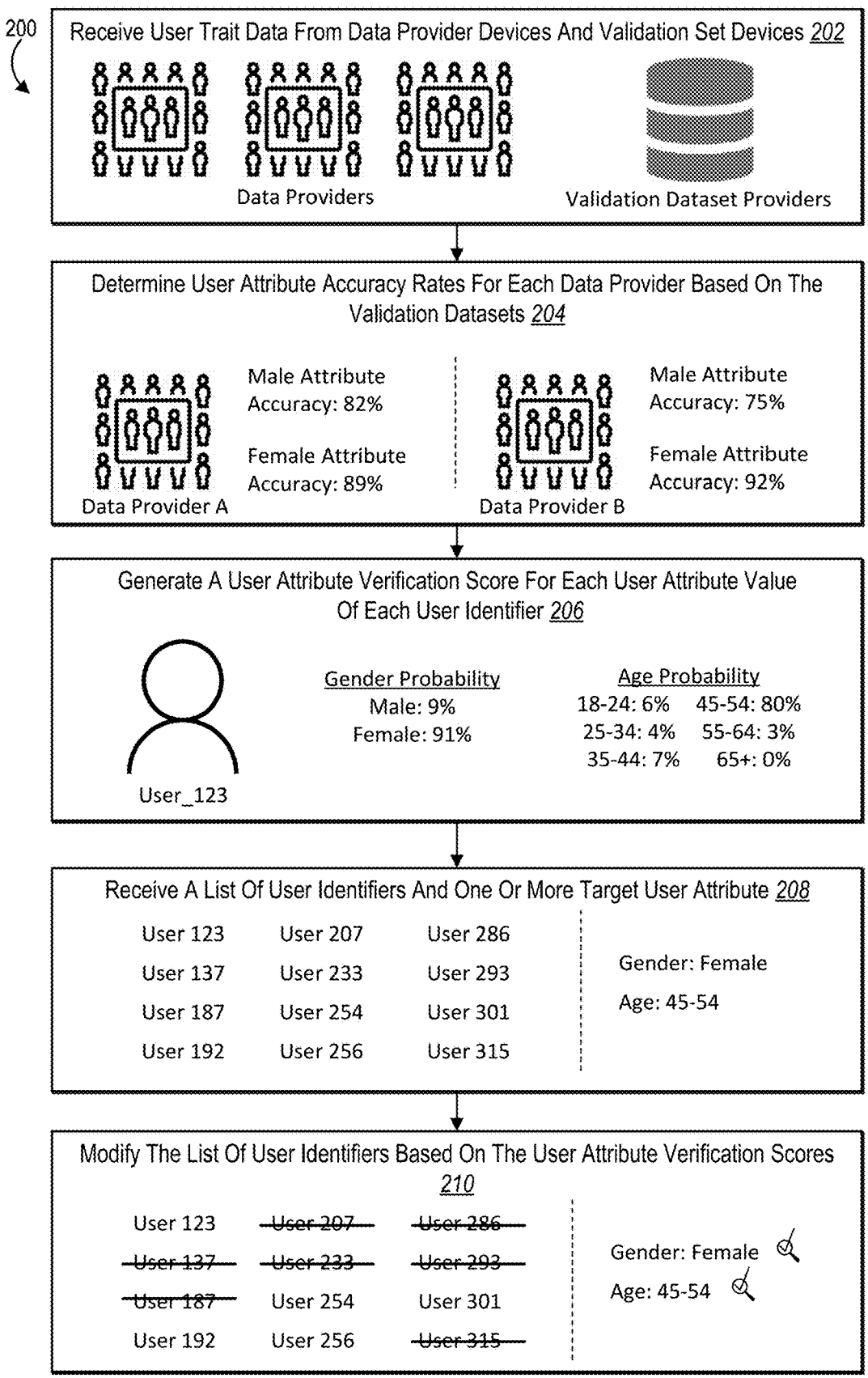
FIG. 2 illustrates an overview diagram of validating user trait data from a data provider in accordance with one or more implementations.

As indicated above, FIG. 2 illustrates an overview diagram of validating user trait data from a data provider in accordance with one or more implementations. In particular, FIG. 2 includes a series of acts 200 of generating and utilizing user attribute verification scores. As shown, the data verification system 106 can perform one or more acts of the series of acts 200.

To illustrate, the series of acts 200 includes an act 202 of receiving user trait data from data providers and validation dataset databases. As provided previously, various data providers can provide user trait data that includes both observed and inferred scaled data to the data verification system 106. Additionally, one or more validators can provide self-declared or self-reported user trait data (e.g., a validation dataset) to the data verification system 106, which can serve as ground-truth user trait data. As described above, in various implementations, user trait data includes user identifiers along with corresponding user attribute data.

As shown in FIG. 2, the series of acts 200 includes an act 204 of determining user attribute accuracy rates for each data provider based on the validation dataset. For example, in one or more implementations, the data verification system 106 compares user trait data from the data providers with the validation dataset from the validation dataset database to quantify the frequency with which the assertions of the data provider match the ground-truth user attribute values as asserted by the validation dataset. In this manner, the data verification system 106 can determine the accuracy rate of each data provider with respect to each user attribute value. For instance, the data verification system 106 determines that a first data provider has an accuracy rate of 75% (i.e., 0.75) when a user identifier asserts the gender as male. Additional detail regarding determining user attribute accuracy rates is provided below with respect to FIGS. 3A-3C.

As illustrated in FIG. 2, the series of acts 200 includes an act 206 of generating a user attribute verification score (e.g., truth score) for each user attribute value of each user identifier. For example, in one or more implementations, the data verification system 106 utilizes the user attribute assertions from across the data providers along with the corresponding user attribute accuracy rates of the data providers to determine user attribute verification scores. As mentioned above, in various implementations, the data verification system 106 maintains user attribute verification scores for user identifiers in a user attribute verification score database (e.g., a truth score database).

As a simplistic example of the act 206, suppose a first data provider has a male user attribute accuracy rate of 90% and indicates that a given user identifier is male. Also, suppose that a second data provider has a male user attribute accuracy rate of 80% and indicates that the given user identifier is male. In these cases, the data verification system 106 can perform the act 206 by determining a user attribute verification score of 85% for the user attribute value of male for the given user based on data provider assertions and user attribute accuracy rates of the data providers.

As shown, the act 206 includes two user attribute verification scores for User_123, namely, the data verification system 106 determines that User_123 has a 91% probability of being female and an 80% probability of being 45-54 years old. Additional detail regarding determining user attribute verification scores is provided below with respect to FIG. 4.

FIG. 2 also shows the series of acts 200 including an act 208 of receiving a list of user identifiers and one or more target user attributes. For instance, in various implementations, the data verification system 106 receives a segment of user identifiers from an administrator device and/or data provider as well as a target user attribute assertion or value. To illustrate, the act 208 shows a list of twelve user identifiers and the target user attribute assertions of female (for the gender user attribute) and 45-54 (for the age user attribute).

In various implementations, the data verification system 106 identifies the user identifiers in the user attribute verification score database (or simply "attribute score database"). Additionally, the data verification system 106 identifies the corresponding user attribute (or user attributes) in the attribute score database for the identified user identifiers. The data verification system 106 can then determine if the user identifiers identified in the attribute score database have the requested user attribute value. In some implementations, the data verification system 106 utilizes an attribute score threshold (e.g., a probability amount) to determine if one of the identified user identifiers satisfies the requested user attribute values.

As shown, the series of acts 200 includes an act 210 of modifying the list of user identifiers based on the user attribute verification scores. For example, if a user identifier does not have a user attribute value that matches the target user attribute assertion, the data verification system 106 removes the user identifier from the list. As shown in the act 210, the data verification system 106 removes user identifiers whose user attributes for gender and age do not accurately match the target user attribute values of female and 45-54, respectively. In addition, in various implementations, the data verification system 106 returns the modified user identifier list with the inaccurate user identifiers removed (or otherwise noted). Additional detail regarding receiving, modifying, and returning user identifier lists or segments is provided below in connection with FIG. 7.

Figure 3A:
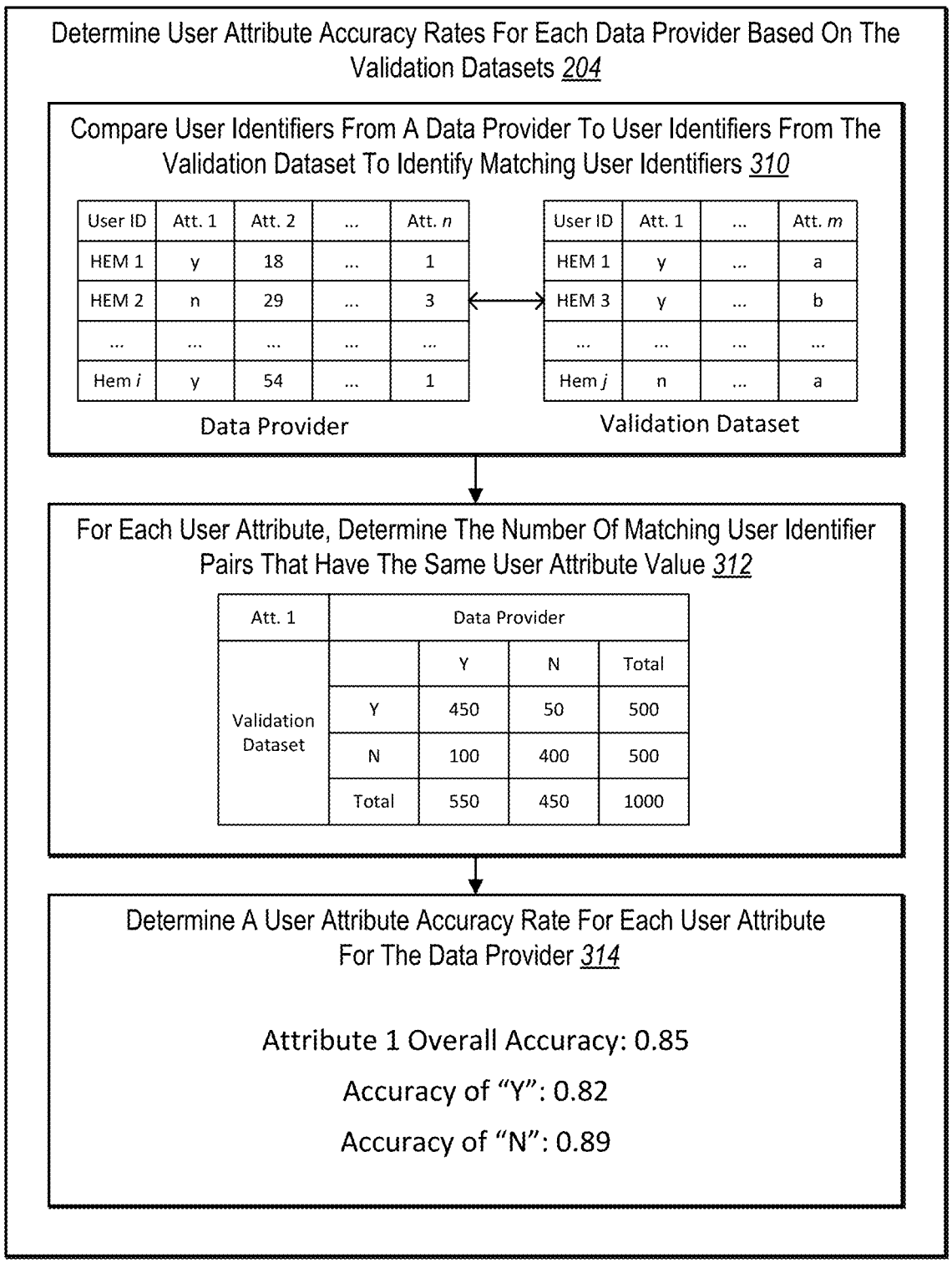

As mentioned above, FIGS. 3A-3C relate to determining user attribute accuracy rates. In particular, FIGS. 3A-3C illustrate block diagrams of determining user attribute accuracy rates for data providers in accordance with one or more implementations. For example, FIG. 3A shows an expanded version of the act 204 of determining user attribute accuracy rates for each data provider based on the validation dataset that includes various sub-acts.

As shown in FIG. 3A, the act 204 includes a sub-act 310 of comparing user identifiers from a data provider to user identifiers from the validation dataset to identify matching user identifiers. As noted above, user trait data from a data provider commonly includes a larger number of user identifiers than the validation datasets. Still, in many implementations, there is an overlap of user identifiers between the two sets of user trait data. Accordingly, the data verification system 106 can use the overlapping (e.g., matching) user identifiers to evaluate the accuracy of each data provider.

To illustrate, in one or more implementations, the data verification system 106 identifies pairs of matching user identifiers for a data provider that also exist in one or more validation datasets. In addition, the data verification system 106 can also determine overlapping or matching user attributes for a user identifier pair. In some implementations, the user attributes associated with the user identifier from the data provider do not match the user attributes associated with the same user identifier from the validation datasets. For example, because user trait data from a validation dataset does not include inferred data, in some implementations, the data provider will have additional user attributes inferred by the data provider that are not included in the validation datasets. In one or more implementations, several or all of the user attributes for a user identifier from a data provider are included in the user attributes for the same user identifier from the validation datasets.

As shown in the act 310, the table of user trait data from the data provider includes i user identifiers and n user attributes, where i and n are whole numbers. The table of user trait data from the validation dataset includes j user identifiers and m user attributes, where j and m are whole numbers. In many instances, i>>j. Additionally, n may be larger than m, m may be larger than n, or n may be the same or a similar number as m. As also shown in the act 310, both tables of user trait data include at least the user identifier of "HEM 1" as well as a user attribute of "Att. 1" (i.e., User Attribute 1) with corresponding user attribute values.

As shown in FIG. 3A, the act 204 includes a sub-act 312 of determining, for each user attribute, the number of matching user identifier pairs that have the same user attribute value. For instance, upon identifying each of the user identifier pairs that match between the data provider and the validation dataset as well as the matching user attribute, in various implementations, the data verification system 106 determines the number of user attribute assertions or values that match. For example, for each of the matching user identifiers that asserts male for the user attribute of gender from the data provider, the data verification system 106 counts the number of times the validation dataset also asserts male for the same user identifier.

As shown, the act 312 includes an image of a confusion matrix for the first user attribute (i.e., Att. 1), which has the user attribute values of "Y" or "N." In this example, the first user attribute is a binary attribute with two user attribute values. An example of a non-binary confusion matrix corresponding to the act 312 is shown in FIG. 3B and described below.

As shown in the confusion matrix in the act 312, the data verification system 106 identified 1,000 matching user identifiers that include assertions for the first user attribute (e.g., indicated by the 1,000 total matches). According to the data provider, 550 user identifiers are Y and 450 are N. According to the validation dataset (e.g., the presumed ground truth), 500 user identifiers are Y and 500 are N.

Within those 1,000 paired user identifiers, the data provider and the validation dataset both asserted Y 450 times for the same user identifier. 400 times, both the data provider and the validation dataset both asserted N for the same user identifier. As shown, the data provider asserted N while the validation dataset asserted Y 50 times for the same user identifiers. Further, the data provider asserted Y while the validation dataset asserted N 100 times for the same user identifiers. Overall, as shown, the data provider and the validation dataset matched in their user attribute assertions for the first user attribute 850 times out of 1,000, while mismatching 150 times out of 1,000.

As shown in FIG. 3A, the act 204 includes a sub-act 314 of determining a user attribute accuracy rate for each user attribute for the data provider. In one or more implementations, the data verification system 106 determines a user attribute accuracy rate for the user attribute as a whole (e.g., Att. 1) as well as for each user attribute value (e.g., Y and N). For instance, in various implementations, the data verification system 106 compares the matching user attribute assertions with the non-matching user attribute assertions for each user attribute to determine a user attribute accuracy rate for the user attribute. The data verification system 106 can make a similar determination at the user attribute value level as well.

To illustrate, in one or more implementations, to determine the overall user attribute accuracy rate for the first attribute, the data verification system 106 combines or sums the diagonal entries of the confusion matrix and divides by the total number of paired user identifiers in the validation dataset. In some implementations, the data verification system 106 follows the formulation shown in Equation 1 below:

$$\text{Overall } Provder \text{ Accuracy Rate for Attribute } 1 = \frac{450+400}{1000} = 0.85 \tag{1}$$

In some implementations, to determine the user attribute accuracy rate of the data provider asserting the user attribute value of Y, the data verification system 106 compares or divides the number of matched assertions over the total number of Y assertions for the data provider. In various implementations, the data verification system 106 follows the formulation shown in Equation 2 below:

$$Provder \text{ Accuracy Rate for } Y \text{ within Attribute } 1 = \frac{450}{550} = 0.82 \tag{2}$$

Conversely, in various implementations, to determine the user attribute misclassification rate of the data provider for asserting the user attribute value of Y, the data verification system 106 compares or divides the number of paired user identifiers where the data provider asserts Y and the validation dataset asserts N for the same user identifier over the total number of Y assertions for the data provider. In one or more implementations, the data verification system 106 follows the formulation shown in Equation 3 below:

$$Provder \text{ Mis-Classification Rate for } Y \text{ within Attribute } 1 = \tag{3}$$
$$\frac{100}{550} = 0.18$$

Notably, for binary user attribute values, the user attribute accuracy rate of a user attribute value for a data provider is the complement to its misclassification rate (1 minus the user attribute accuracy rate for the user attribute value). For example, if the user attribute accuracy rate for the user attribute value of Y is 0.82, then the misclassification rate is 1-0.82 or 0.18. This formulation becomes less trivial for non-binary user attribute values.

Similar to above, to determine the user attribute accuracy rate of the data provider asserting the user attribute value of N, the data verification system 106 compares or divides the number of matched assertions over the total number of N assertions for the data provider. Additionally, the data verification system 106 can likewise follow a similar approach to Equation 3 to determine the misclassification rate for the data provider with respect to asserting N when the paired user identifier in the validation dataset asserts Y. Indeed, the data verification system 106 can determine a misclassification rate for the user attribute assertion of N for the data provider as 0.11 or 11%.

In various implementations, the data verification system 106 converts the confusion matrix for a user attribute into a table of user attribute accuracy rates and/or misclassification rates. To illustrate, in one or more implementations, the data verification system 106 divides each cell in the confusion matrix by the total number of paired user identifiers in its column. For example, the confusion matrix in the act 312 becomes the following user attribute accuracy rate table, shown in Table 1 below. Notably, the user attribute accuracy rates for the data provider align with the above calculations in Equations 2-3.

TABLE 1

User Attribute Verification Score for Att. 1

| Att. 1 | | Data Provider | |
| --- | --- | --- | --- |
| | | Y | N |
| Validation | Y | 0.82 | 0.11 |
| Dataset | N | 0.18 | 0.89 |

In various implementations, determining the user attribute accuracy rate for each user attribute value of each user attribute for a data provider (e.g., quantifying the accuracy of a data provider at the level of the provider and attribute value) has various beneficial properties. For example, in one or more implementations, user attribute accuracy rates account for differences in data quality between different data providers. As another example, in some implementations, user attribute accuracy rates allows for intra-provider disparities in the accuracy of certain attributes (e.g., a first data provider may be more accurate with respect to gender than a second data provider while the second data provider is more accurate with respect to age than the first data provider. As an additional example, within a given attribute, a data provider's user trait data for specific user attribute values (e.g., gender: females) may be more accurate and precise than for another user attribute value within the same user attribute (e.g., gender: males).

In some implementations, the data verification system 106 treats the counts in a given column of the confusion matrix (e.g., the 550 Y assertions made by the data provider shown in the act 312) as a binomial random variable (e.g., a binomial random variable with parameters n and p). For example, the count in the given column is equal to the column total n and a successful match parameter p, then the data provider user attribute accuracy rate for a given user attribute value, p̂, is the maximum likelihood estimate for p. For instance, in various implementations, the data verification system 106 follows the formulation shown in Equation 5 below:

$$\text{Provider Accuracy Rate for } Y = \tag{5}$$
$$P(\text{User Identifier is actually } Y \mid \text{Provider Assertion of } Y) =$$
$$\frac{\text{Total User Identifiers that Data Provider and Validation Dataset Agree are } Y}{\text{Total } Y \text{ Assertions for Data Provider}} = \hat{p}$$

Additionally, in various implementations, by utilizing maximum likelihood estimators, the data verification system 106 can achieve beneficial properties, such as improved efficiency, consistency, and asymptotic normality. Indeed, in one or more implementations, for user attribute accuracy rates of data providers, utilizing maximum likelihood estimators can mean that $\hat{p} \rightarrow_n \text{User Identifiers}_{s \rightarrow \infty} p$.

While the acts 310-314 shows an example of the data verification system 106 determining user attribute assertion matches for one attribute of a data provider, the data verification system 106 can repeat these acts for all matching user attribute assertions between the data provider and the validation dataset for matching user attributes. Moreover, in various implementations, the data verification system 106 repeats the above acts for each data provider and the validation datasets. Indeed, the data verification system 106 can utilize the same validation dataset to determine the user attribute accuracy rates for each user attribute value or assertion for each data provider.

As mentioned above, while the sub-acts 310-314 show examples of binary user attributes, the data verification system 106 can perform similar actions and approaches with non-binary user attributes. To illustrate, FIG. 3B corresponds to a user attribute of age and includes multiple user attribute values (e.g., 18-24, 25-34, 35-44, 45-54, 55-64, and 65+).

As shown, FIG. 3B includes an age confusion matrix 320 that corresponds to the actions described above in connection with the sub-act 312. For example, the data verification system 106 identifies 3,000 matching user identifier pairs for the user attribute of age between a data provider and the validation dataset. The age confusion matrix 320 indicates the number of times the data provider asserted a user attribute value for a user identifier and the validation dataset asserted a user attribute value (e.g., the same or different user attribute value) for the same user identifier in a matching pair. For instance, both the data provider and the validation dataset asserted 300 user identifier pairs that asserted a user attribute value of 25-34. Also, for twelve user identifier pairs, the data provider asserted a user attribute value of 18-24 with the validation dataset asserted a user attribute value of 65+.

Additionally, FIG. 3B shows an age user attribute accuracy rate table 330 that corresponds to the actions described above in connection with the sub-act 314. For example, the data verification system 106 utilizes Equations 2-4 to determine the user attribute accuracy rates and/or misclassification rates. In some implementations, the data verification system 106 divides each cell by the total number of user identifier pairs in the column to determine the corresponding user attribute accuracy rate and/or misclassification rate, as described above. As shown in FIG. 3B, as with binary user attributes, each of the columns sum to one.

In many implementations, the validation dataset utilizes the age user attribute accuracy rate table 330 to determine how frequently a data provider is incorrect and in what direction of error. To illustrate, in the age user attribute accuracy rate table 330, for a user identifier in the age range of 25-34, the data provider incorrectly guessed that the user identifier was younger (e.g., 18-24) 14% of the time or older (35-44 and 45-54) 21% of the time. Indeed, the data verification system 106 can determine not only when a data provider has an incorrect user attribute assertion but also how the user attribute assertion is incorrect.

As mentioned above, the data verification system 106 can determine user attribute accuracy rates for multiple data providers. For example, in various implementations, the data verification system 106 repeats the sub-acts 310-314 for each data provider against the same validation dataset to determine the user attribute accuracy rates for each user attribute value or assertion for each data provider.

To illustrate, FIG. 3C shows a first gender user attribute accuracy rate table 340 for Data Provider A and a second gender user attribute accuracy rate table 350 for Data Provider B. As shown, Data Provider A is more accurate in correctly asserting male user identifiers while Data Provider B is more accurate in correctly asserting female user identifiers. The data verification system 106 can determine user attribute accuracy rates for any number of data providers and/or any number of user attributes (including non-binary user attributes), as described above.

Figure 4:
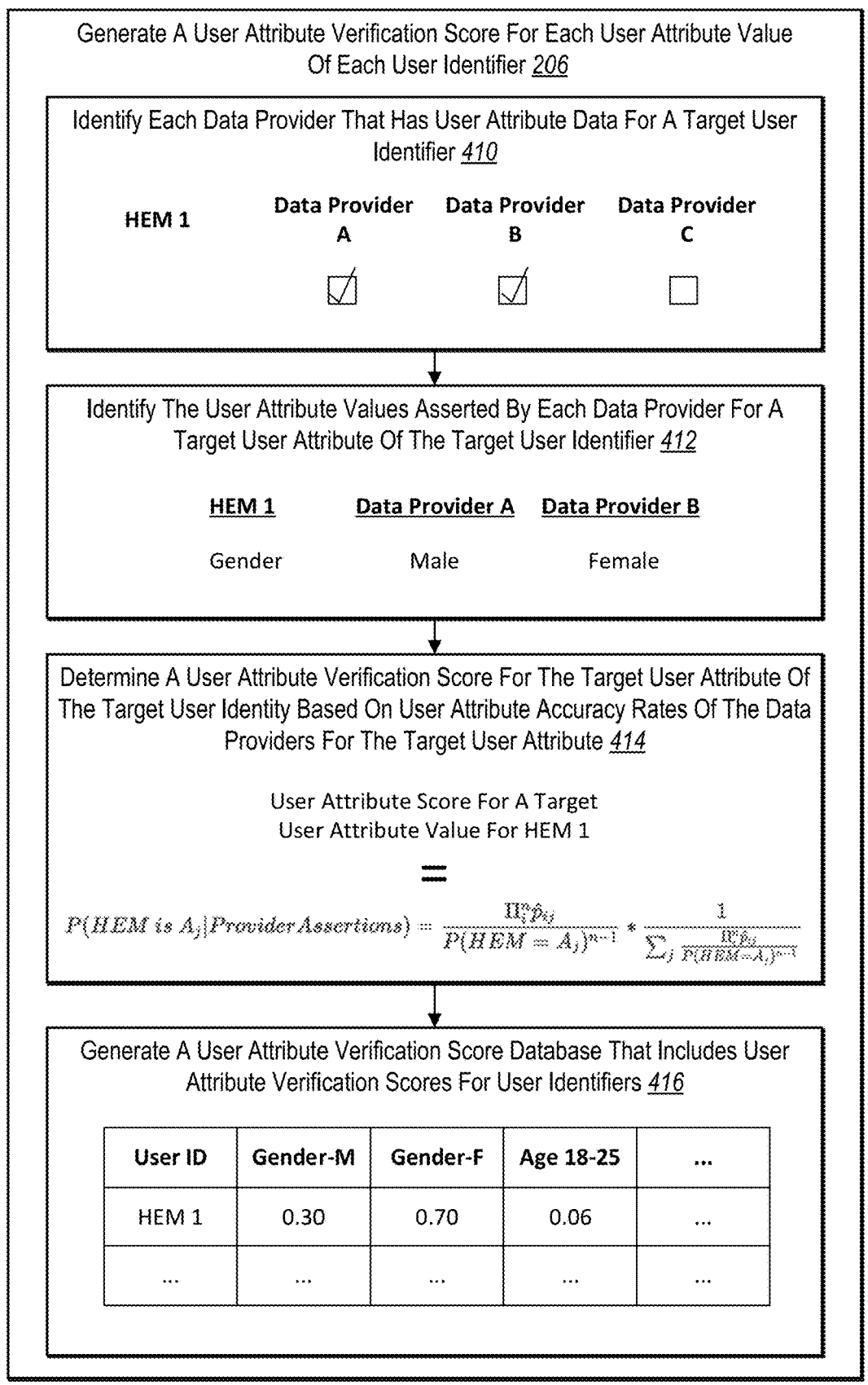
FIG. 4 illustrates a block diagram of generating user attribute verification scores for user attributes in accordance with one or more implementations.

As mentioned above, FIG. 4 relates to determining user attribute verification scores (e.g., truth scores). In particular, FIG. 4 illustrates a block diagram of generating user attribute verification scores for user attributes in accordance with one or more implementations. Indeed, once user attribute accuracy rates are generated for each of the data providers, the data verification system 106 can translate the user attribute assertions across multiple data providers into user attribute verification scores (e.g., truth scores). As noted above, a truth score for a given user attribute value of a user identifier indicates the probability or likelihood that the assertion is accurate and correct based on a series of data provider assertions for the user attribute value.

As shown, FIG. 4 shows an expanded version of the act 206 of generating a user attribute verification score for each user attribute value of each user identifier that includes various sub-acts. Accordingly, the sub-acts 410-416 of the act 206 focus on a target user attribute for a target user identifier. In various implementations, the data verification system 106 repeats the sub-acts 410-416 for each user attribute and/or user attribute value for the target user. In additional implementations, the data verification system 106 also repeats the sub-acts 410-416 for each user identifier provided by the data providers.

For example, the act 206 includes a sub-act 410 of identifying each data provider that has user attribute data for a target user identifier. For instance, in various implementations, the data verification system 106 analyses, indexes, searches, and/or looks up each data provider that provided user identifiers to the data verification system 106 for matching user identifiers (e.g., HEMs). In several implementations, the target user interface will not be a user identifier that is included in the validation dataset as the data providers are much larger than the validation datasets.

As illustrated in the sub-act 410, the data verification system 106 determines that Data Provider A and Data Provider B each includes the user identifier of HEM 1 while Data Provider C does not include this user identifier. In various implementations, the data verification system 106 generates and utilizes a user identifier lookup table that indicates which data providers include a target user identifier. In some implementations, the data verification system 106 queries each data provider (or user trait data received from the data provider) with a given user identifier to determine which data providers include the target user identifier.

As shown, the act 206 includes a sub-act 412 of identifying the user attribute values asserted by each data provider for a target user attribute of the target user identifier. For instance, in one or more implementations, the data verification system 106 first verifies that the user trait data for the target user identifier includes a target user attribute. For example, the data verification system 106 determines that the data providers that include the target user identifier, Data Provider A and Data Provider B, each include the target user attribute of gender.

In some implementations, the data verification system 106 accesses the assertions of each of the data providers made for the target user identifier and the target user attribute. For example, as shown, Data Provider A asserts a target user attribute value of "Male" for user identifier HEM 1, and Data Provider B assets a target user attribute value of "Female" for the same user identifier. As shown, in some implementations, the data providers assert different user attribute values for the target user attribute. In alternative implementations, the data providers assert the same user attribute value.

As shown, the act 206 includes a sub-act 414 of determining a user attribute verification score for the target user attribute of the target user identifier based on user attribute accuracy rates of the data providers for the target user attribute. For instance, in one or more implementations, the data verification system 106 combines the user attribute assertions for the target user identifier and the target user attribute to determine a user attribute verification score for each user attribute value of the target user attribute.

As mentioned above, in many implementations, when determining a user attribute verification score for a user attribute value, the data verification system 106 weighs the user attribute assertion made by a data provider by the data provider's user attribute accuracy rate for the user attribute value. Indeed, a data provider that is 50% accurate when asserting an age of 45-54 should be given less influence than a data provider that is 80% accurate when asserting 45-54. Similarly, when two or more data providers assert different user attribute values for a target user attribute, the average user attribute accuracy rate of each data provider for the user attribute becomes more important in determining an accurate user attribute verification score.

As noted above, in several implementations, the target user identifier from the data providers is not found in the validation dataset. Thus, the user attribute value for the target user attribute cannot be fully confirmed. However, as described above, if the data providers have some user identifiers that match those of the validation datasets for the target user attribute, then the data verification system 106 determines an average user attribute accuracy rate for the target user attribute that can be applied to all user attribute values of the target user attribute. In this manner, the data verification system 106 can utilize the average user attribute accuracy rate of the target user attribute of the data provider to weigh each target user attribute value of the target user attribute asserted by a data provider.

In one or more implementations, the data verification system 106 follows the formulation shown in Equation 6 below to determine the user attribute verification score:

User Attribute Verification Score for a Target User Attribute Value=$P$(User Identifier is the Target User Attribute Value|Series of Data Provider Assertions) (6)

As described above, in some implementations, the data verification system 106 utilizes a weighted wisdom of the crowds approach to determine a user attribute verification score for a target user attribute. In one or more implementations, the data verification system 106 utilizes a Bayesian wisdom of the crowds approach where a truth score (i.e., user attribute verification score) of a user attribute value is an updated posterior for the underlying success parameter. In alternative implementations, the data verification system 106 utilizes other approaches, such as random forest or another type of machine-learning model, combined with the wisdom of the crowds approach to determine a truth score of a user attribute value.

As a roadmap, the following description provides detail regarding generating user attribute verification scores utilizing a Bayesian wisdom of the crowds algorithm. First, implementations of the data verification system 106 describe generating a user attribute verification score for a user attribute value based on a single data provider. Next, the implementations are expanded to describe generating a user attribute verification score for a user attribute value based on multiple data providers. For ease of explanation, the following provides the example of determining a user attribute verification score for the target user attribute of gender and a user attribute value of male for a user identifier of HEM.

To illustrate, in one or more implementations, the data verification system 106 determines that one data provider has user trait data for a target HEM and target user attribute. In these implementations, the data provider provides the only user attribute value assertion for the target user attribute for the target HEM (i.e., the target user identifier). Also, in these implementations, the data verification system 106 largely determines the user attribute verification score (e.g., truth score) from a combination of the single user attribute assertion and the user attribute accuracy rate of the data provider for the target user attribute.

By way of example, the data verification system 106 determines the user attribute verification score for the HEM 1 being male given the single assertion by Data Provider A asserting HEM1 having a gender user attribute value of male. In this example, Table 2 provides user attribute accuracy rate data for Data Provider A, and Table 3 provides user attribute verification score data for Data Provider A.

TABLE 2

User Attribute Accuracy Rate for Gender

| Gender | | Data Provider A | |
|---|---|---|---|
| | | Male | Female |
| Validation Dataset | Male | 450 | 50 |
| | Female | 100 | 400 |
| | Total | 550 | 450 |

TABLE 3

User Attribute Verification Score for Gender

| Gender | | Data Provider B | |
|---|---|---|---|
| | | Male | Female |
| Validation Dataset | Male | 0.82 | 0.11 |
| | Female | 0.18 | 0.89 |

For convenience, Tables 2 and 3 include similar numbers as described above with respect to FIGS. 3A-3C. For example, Table 3 matches the first gender user attribute accuracy rate table 340 for Data Provider A in FIG. 3C. As shown, Table 3 shows that Data Provider A has a user attribute accuracy rate of 0.82 for accurately asserting the gender of male for a user identifier. In this example, the data verification system 106 can determine the user attribute verification score for the likelihood that HEM1 is male by following the formulation shown in Equation 7 below.

User Attribute Verification Score of Male for HEM1=$P$(HEM1 is Male|Data Provider $A$ Asserts Male) (7)

In some implementations, the data verification system 106 constructs a Bayesian posterior density to determine the user attribute verification score. For instance, as outlined above, Data Provider A has a normalized confusion matrix (i.e., Table 2) that quantifies a point estimate, specifically a maximum likelihood estimate (MLE) for the term "P(HEM1 is Male|Data Provider A Asserts Male)" in Equation 7. As noted above, in this example, this term is equivalent to the user attribute accuracy rate for the gender user attribute assertion of Male by Data Provider A or 0.82 (see Table 3 above).

In some implementations, relying on point estimates fails to capture expected variance and can cause uncertainty and inaccuracy to the point estimate itself. Accordingly, in one or more implementations, the data verification system 106 constructs a Bayesian posterior density to combat these issues and to determine a true underlying value of the term "P(HEM1 is Male|Data Provider A Asserts Male)" in Equation 7.

In various implementations, the data verification system 106 forms the distribution of the Bayesian posterior (or "p") based on 1) a prior assumption for how p is distributed (i.e., the Bayesian prior for a digital provider's true underlying user attribute-value, p) and/or 2) the observed data in a given data provider's confusion matrix for a particular user attribute and a user attribute value (i.e., the user attribute assertion of "male" column in Data Provider A's confusion matrix for the gender user attribute). In this way, the same data that underlies the MLE for the term "P(HEM1 is Male|Data Provider A Asserts Male)" in Equation 7 also informs the shape of the Bayesian posterior distribution. In some implementations, if the counts in a given column in a data provider's confusion matrix (i.e., all the HEMs for which Data Provider A asserts as "male") are modeled by the random variable X, where X~Binom(n,p), then the hyperparameter, which is the true underlying value for "P(HEM1 is Male|Data Provider A Asserts Male)" in Equation 7, can be modeled according to the conjugate prior p~Beta($\alpha$, $\beta$).

In various implementations, if x success and n−x failures are observed as a result of X~Binom(n,p), then the updated Bayesian posterior for p can be represented as p~Beta($\alpha'$, $\beta'$) (i.e., the conjugate prior and the posterior for the binomial distribution both adhere to a beta distribution) and where the conditions in Equation 8, shown below, hold.

$$\alpha' = \alpha = x \text{ successes} \tag{8}$$

$$\beta' = \beta + n - x \text{ failures}$$

$$E[p] = \frac{\alpha'}{\alpha' + \beta'}$$

$$\text{Var}[p] = \frac{\alpha'\beta'}{(\alpha' + \beta')^2(\alpha' + \beta' + 1)}$$

In Equation 8, the parameters of α and β may represent parameters from the prior distribution for p. In some implementations, the data verification system 106 utilizes α=β=1, which is the uninformative prior distribution for p. In various implementations, for any beta random variable Y~Beta(α, β), the shape parameters of α and β are both 1 or larger.

In one or more implementations, such as when determining user attribute verification score for binary user attributes in particular, the uninformative prior of p~Beta(1, 1) may be equivalent to p~U[0, 1]. In these implementations, the choice of the uniformed prior for p makes it so that any value between 0.0-1.0 is equally likely and no particular value on that range is favored.

Continuing the above example, upon the data verification system 106 determining or constructing a Bayesian posterior distribution for the term in Equation 7 of "P(HEM1 is Male|Data Provider A Asserts Male)," in various implementations, the data verification system 106 can draw numerous samples from this distribution. In this way, the data verification system 106 can estimate and/or simulate a distribution for the true value of p. In one or more implementations, this distribution quantifies and captures, to a much greater extent than any point estimate for p, the full range of potential values that p could likely assume, given the data observed in a given data provider's confusion matrix.

To illustrate, given the information shown in Tables 2 and 3 above, the user attribute accuracy rate for the gender user attribute assertion of Male by Data Provider A is 0.82. That is, the MLE for p of Data Provider A accurately asserting Male for a HEM is 82%. Given this data and assuming a uniformed prior for p, the data verification system 106 can implement a sampling protocol that first, samples a random estimate for P(HEM1 is Male|Data Provider A Asserts Male) from a beta distribution with α=450+1, β=100+1, where 450 represents the correct assertions of male HEMs by Data Provider A and 100 represents the incorrect assertions of male HEMs by Data Provider A (see Table 2 above).

In additional implementations, the data verification system 106 repeats the random estimate sampling several times. For example, the data verification system 106 samples 100, 500, or 1,000 times to generate a user attribute verification score distribution. Additionally, in some implementations, the data verification system 106 determines the average user attribute verification score (i.e., the estimated posterior mean) from the resulting distribution. In one or more implementations, the estimated posterior mean becomes the "Male" truth score (i.e., user attribute verification score) for all HEMs (e.g., user identifiers) for which only Data Provider A asserted "Male."

In various implementations, the action of randomly sampling a beta distribution numerous times and taking the average user attribute verification score can ensure that all HEMs with the same underlying information (i.e., HEMs for which the same set of data providers made the same assertions) will have the same resulting user attribute verification score. In some implementations, the data verification system 106 utilizes a short sampling protocol, as described above, because the "crowd" of data providers is made up of a single provider. A more detailed generalized sampling protocol, for when the "crowd" of data providers asserts a given HEM-attribute combination is greater than one, is included below.

As mentioned above, the data verification system 106 can determine a user attribute verification score for multiple data providers. Adding on the above examples of Data Provider A and Tables 2 and 3, suppose the following assertions for the gender user attribute from Data Provider B, as shown in Table 4 and Table 5 below.

TABLE 4

User Attribute Accuracy Rate for Gender

| | | Data Provider B | |
|---|---|---|---|
| Gender | | Male | Female |
| Validation Dataset | Male | 338 | 28 |
| | Female | 112 | 322 |
| | Total | 450 | 350 |

TABLE 5

User Attribute Verification Score for Gender

| | | Data Provider B | |
|---|---|---|---|
| Gender | | Male | Female |
| Validation Dataset | Male | 0.75 | 0.08 |
| | Female | 0.25 | 0.92 |

As mentioned above, suppose Data Provider A asserts that HEM 1 has a gender user attribute of Male. Now suppose Data Provider B asserts that HEM 1 has a conflicting gender user attribute of Female. As noted in Table 5, Data Provider B is very accurate when asserting a user attribute value of Female (e.g., a user attribute accuracy rate of 92%). Accordingly, Data Provider B has a misclassification rate of 8% for its "female" assertions. In this scenario, the data verification system 106 can calculate the male user attribute verification score for HEM 1 between Data Provider A and Data Provider B as shown in Equation 9 below.

User Attribute Verification Score of Male for HEM
1=P(HEM1 is Male|Data Provider Assertions) (9)

In some implementations, the data verification system 106 utilizes Bayes' Theorem. In these implementations, the data verification system 106 can represent the user attribute verification score of Male for HEM 1 as shown in Equation 10.

(10)

$$P(HEM1 \text{ is Male} | \text{Data Provider Assertions}) =$$

$$\frac{P(HEM1 \text{ is Male}) * P(\text{Data Provider Assertions} | HEM1 \text{ is Male})}{P(\text{Data Provider Assertions})}$$

In some implementations, to overcome the difficulties of quantifying the probability of observing this particular series of data provider assertions conditioned on the fact that a HEM is male, the data verification system 106 assumes that the data provider assertions are conditionally independent.

In these implementations, the data verification system 106 derives a Naive Bayes estimator for the user attribute verification score (e.g., truth score). For example, the data verification system 106 re-writes Equation 10 as shown in Equation 11.

$$P(HEM1 \text{ is Male} \mid \text{Data Provider Assertions}) = \frac{P(HEM1 \text{ is Male}) * \prod_i^k P(\text{Data Provider}_i \text{ Assertion} \mid HEM1 \text{ is Male})}{P(\text{Data Provider Assertions})} \quad (11)$$

In one or more implementations, the data verification system 106 utilizes Bayes' Theorem again on the conditional probabilities in the numerator of Equation 11. After simplifying, the data verification system 106 can obtain the formulation shown in Equation 12 below.

$$P(HEM1 \text{ is Male} \mid \text{Data Provider Assertions}) = \frac{\prod_i^k P(HEM1 \text{ is Male} \mid \text{Data Provider}_i \text{ Assertion})}{P(HEM1 \text{ is Actually Male})^{k-1}} * \frac{1}{Z} \quad (12)$$

In Equations 11 and 12, k may represent the number of data providers and i may represent ith data provider. Further, Z may represent a normalization constant that does not depend on P(HEM1 is Actually Male). In some instances, Equation 12 is equivalent to Equation 13, shown below.

$$P(HEM1 \text{ is Male} \mid \text{Data Provider Assertions}) = \frac{P(HEM1 \text{ is Male} \mid \text{Data Provider } A \text{ Asserts Male}) * P(HEM1 \text{ is Male})}{P(HEM1 \text{ is Male})^{2-1}} \quad (13)$$

In Equation 13, the data verification system 106 can estimate the two terms in the numerator based on the confusion matrices for gender for Data Provider A (e.g., Table 2) and Data Provider B (e.g., Table 4). In some implementations, the true underlying probability that any given HEM (i.e., user identifier) is Male (i.e., P(HEM1 is Male)) is calculated from aggregated statistical user data, as described below in connection with FIG. 5.

Moving on, determining Bayesian densities and utilizing sampling protocol with multiple data providers will now be described. In various implementations, the data verification system 106 can extend the sampling and Bayesian prior-posterior protocol from the description above. As a reminder from Tables 2-3, Data Provider A correctly asserting a male HEM 450 times and incorrectly asserted a male HEM 100 times, which results in an MLE for p (e.g., P(HEM1 is Male|Data Provider A Asserted Male)), equal to 0.82. From Tables 3-4, Data Provider B correctly asserted a female HEM 322 times and incorrectly asserting a female HEM 28 times, which results in an MLE for p(e.g., P(HEM1 is Male|Data Provider B Asserted Female)), equal to 0.08.

In one or more implementations, the data verification system 106 first randomly samples one potential value for P(HEM1 is Male|Data Provider A Asserted Male) from a beta distribution with $\alpha=450+1$, $\beta=100+1$. In addition, the data verification system 106 second randomly samples one potential value for P(HEM1 is Male|Data Provider B Asserted Female) from a beta distribution with $\alpha=28+1$, $\beta=322+1$. As before, in these implementations, both actions can utilize a uniformed prior for p~Beta($\alpha=1$, $\beta=1$), which leads to p~U[0, 1].

In additional implementations, the data verification system 106 takes the first and second results of the above actions and inserts the randomly drown estimates into the Naive Bayes estimator for the user attribute verification score (e.g., truth score). Further, in various implementations, the data verification system 106 repeats the above actions numerous times (e.g., 100, 500, 1,000, or 5,000 times) to obtain a distribution of user attribute verification scores. Moreover, as before, in some implementations, the data verification system 106 determines the average user attribute verification score (i.e., the estimated posterior mean) from the resulting distribution. In this example, the estimated posterior mean represents the user attribute verification score for all HEMs for which Data Provider A asserts as Male and Data Provider B asserts as Female.

To further illustrate by way of example, utilizing the MLEs for P(HEM1 is Male|Data Provider A Asserted Male) and P(HEM1 is Male|Data Provider B Asserted Female), the data verification system 106 generates the user attribute verification score for HEM 1 asserting a gender user attribute value of male and asserting a gender user attribute value of female. As a reminder, the data verification system 106 determined a user attribute accuracy rate of 0.82 for Data Provider A correctly asserting HEMs as male and a user attribute accuracy rate of 0.08 for Data Provider B misclassifying a male assertion (e.g., P(HEM1 is Male|Data Provider B Asserted Female≈Data Provider B Misclassification of Male Assertion). In addition, P(HEM1 is Male) is 0.49. Utilizing these values, the data verification system 106 can determine a user attribute verification score for HEM 1 being male as 0.14 (e.g., [(0.82)*(0.08)]/0.49=0.14).

As mentioned above, under the assumption that the assertions for HEM 1 from Data Provider A and Data Provider B are conditionally independent, the user attribute verification score for HEM 1 being female is shown in Equation 14 below. For example, the data verification system 106 determines a user attribute verification score for HEM 1 being female as 0.32.

User Attribute Verification Score of Female for $HEM1 =$ (13)

$P(HEM1$ is Female $\mid$ Series of Data Provider Assertions) $\approx$ $P(HEM1$ is Female $\mid$ Provider $A$ Asserts Male and Provider $B$ Asserts Female) $=$ $$\frac{(0.18)*(0.92)}{0.51} = 0.32$$

In some implementations, the data verification system 106 adds the normalization constant, Z, as part of determining the user attribute verification scores for a user attribute. To illustrate, Equation 14 shows the data verification system 106 normalizing the user attribute verification score for the gender user attribute so that the user attribute values sum to 1.0.

User Attribute Verification Score of Male for $HEM1 =$ (14)

$$\frac{0.14}{0.14 + 0.32} = 0.30$$

User Attribute Verification Score of Female for $HEM1 =$ $$\frac{0.32}{0.14 + 0.32} = 0.70$$

As shown in Equation 14, the normalization constant, Z, ensures that across all user attribute verification score (e.g., male and female) for a user attribute (e.g., gender), all user attribute verification score (e.g., truth score) for a given user identifier (e.g., HEM) sum to 1.0. Indeed, in various implementations, the data verification system 106 can normalize each of the user attribute values of a user attribute to add to one. In this manner, the total probability of a user identifier having at least one user attribute value of a user attribute is 100%.

In various implementations, the data verification system 106 can apply a generalized formulation to determine a user attribute verification score for a user identifier. To illustrate, Equation 15 shown below provides an example of one such formulation.

User Attribute Verification Score of $A_j$ for $HEM =$ (15)

$P(HEM$ is $A_j |$ Data Provider Assertions$) =$ $$\frac{\prod_i^n \hat{p}_{ij}}{P(HEM = A_j)^{n-1}} * \frac{1}{\sum_j \frac{\prod_i^n \hat{p}_{ij}}{P(HEM = A_j)^{n-1}}}$$

In Equation 15, n may represent the total number of data providers with user attribute assertions from the HEM, $A_j$ may represent the jth level of a given user attribute A (e.g., Male or Female for the Gender user attribute), and $\hat{p}_{ij}$ may represent the accuracy weight the data verification system 106 utilizes based on the frequency with a HEM belonging to $A_j$ given the observed assertion for the ith database and derived from the posterior distribution for p.

Notably, the generalized formulation the data verification system 106 utilizes to determine a user attribute verification score for a user identifier, as shown in Equation 15, matches the equation shown in connection with the sub-act 414 shown in FIG. 4. Indeed, while the above description corresponds to two data providers, the data verification system 106 can further extrapolate to additional data providers.

Similarly, while the above description corresponds to a binary user attribute having two user attribute values, the data verification system 106 can further extrapolate to non-binary user attributes having more than two user attribute values. To illustrate, the data verification system 106 generates a confusion matrix for a user attribute having multiple user attribute values, as described above in connection with FIG. 3B. Upon generating confusion matrices for continuous and non-binary categorical user attributes, the data verification system 106 can utilize the Naive Bayes calculation and the Bayesian prior-posterior updating approach as described above. Indeed, in some implementations, as with binary user attributes, the data verification system 106 utilizes the data in a given data provider's confusion matrix to generate the Bayesian posterior density from a given user attribute value.

In one or more implementations, however, the data verification system 106 utilizes different prior and posterior densities to simulate user attribute verification scores (e.g., truth scores) for non-binary user attributes. For example, for attributes with more than two potential user attribute values (e.g., age, household income, or a compound attribute), the counts in a given column of a given data provider's confusion matrix are no longer distributed according to Binom(n, p), but rather according to Multinomial(n,p), where p is a vector of probabilities (i.e., p=$p_1$, $p_2$, . . . $p_k$). In some implementations, where independent trials result in a success for exactly one in k categories, p may represent the vector of length k with those success probabilities for each category.

In example implementations, the conjugate prior (and thus posterior) for p in the Multinomial distribution is governed by the Dirichlet distribution, which is the multivariate generalization of the Beta distribution. For example, in various implementations, the Dirichlet is parameterized by $\alpha = (\alpha_1, \alpha_2, \ldots \alpha_k)$, which is a vector of length k, and where each $\alpha_i > 0$. In some implementations, as with the binomial case, the data verification system 106 selects a default choice prior distribution of p that includes the uninformative prior, and where all entries in are 1.

In one or more implementations, the additive relationship between the shape parameters of conjugate prior and posterior distribution exists for the Dirichlet distribution, similarly to the Beta distribution described above. For example, in various implementations, the data verification system 106 observe $x_i$ successes in each of the k categories of X~Multinomial(n,p), such that $\Sigma_i^k x_i = n$, and the conjugate prior distribution for p is p~Dirichlet($\alpha$). In these implementations, the updated Bayesian posterior for p can be written as p~Dirichlet($\alpha'$), where $\alpha' = (\alpha_1 + x_1, \alpha_2 + x_2, \ldots, \alpha_k + x_k)$.

In some implementations, the data verification system 106 determines user attribute verification scores (e.g., truth scores) for compound user attributes. An example of a compound user attribute includes age and gender user attribute. Indeed, a compound user attribute is the intersection of two or more user attributes. As with single-user attributes, compound user attributes can include a number of user attribute values. For example, for the compound user attribute of age and gender, some of the user attribute values include male-18-24, male-45-54, female-25-34, and female-65+.

In various implementations, the data verification system 106 utilizes the same approach and methodology for determining user attribute verification score for compound user attributes. For example, in some implementations, the data verification system 106 determines a confusion matrix that indicates the user attribute accuracy rate of each data provider that asserts a user attribute value for the compound user attribute. In particular, the data verification system 106 expands the axes of the confusion matrix to include rows and columns for each user attribute value of the compound user attribute. For instance, for a compound user attribute that combines the two binary user attributes of gender and legal adult, the data verification system 106 generates a confusion matrix with rows and columns of male/adult, male/non-adult, female/adult, and female/non-adult. User attributes with additional user attribute values, such as non-binary user attributes, will result in a larger confusion matrix when combined into a compound user attribute.

Further, in various implementations, utilizing the confusion matrix, the data verification system 106 utilizes a wisdom of the crowds algorithm approach (e.g., a weighted or Bayesian wisdom of the crowds algorithm approach), as described above, to determine user attribute verification scores for the user attribute values of the compound user attribute. For example, in one or more implementations, the data verification system 106 generates a user attribute verification score for each user identifier for each of the user attribute values of the compound user attribute, in a similar manner as described above. For instance, in some implementations, the data verification system 106 normalizes the user attribute values of the compound user attribute, as provided previously.

In a few implementations, especially with compound user attributes, one or more of the data providers may be missing part one or more user attribute values of the compound user attribute. In these implementations, the data verification system 106 may digest and unify assertions for compound user attributes across multiple data providers. In this way, the data verification system 106 can increases the number of user identifiers that are eligible to be scored for compound user attributes (e.g., the overall number of user attribute verification scores) and/or prevent the data verification system 106 from needlessly discarding information about a user identifier.

To illustrate, for the compound user attribute of gender and age, consider the example where assertions about a target user identifier's (e.g., HEM 1) age and gender vary across data providers. For example, if in addition to Data Provider A and Data Provider B asserting a different gender (see the above example), suppose there is also a third data provider (e.g., Data Provider C) who makes no assertion about the target user identifier's age while also asserting that the target HEM is female. The additional information from Data Provider C should not be discarded in the user attribute verification score calculation for the target user identifier. Instead, the data verification system 106 should update the age-gender compound user attribute verification score (e.g., truth score) for HEM 1 to reflect Data Provider C's female assertion. Otherwise, the data verification system 106 may be discarding valuable information and the resulting user attribute verification score may be misleading.

In the above example, the data verification system 106 may determine a user attribute verification score for the assertion that HEM 1 is a female and 18-24. Equation 16 provides an example formulation.

$$\text{User Attribute Verification Score of} \tag{16}$$
$$18\text{-}24 \text{ for } HEM1 = P(HEM1 \text{ is Female and } 18\text{-}24 \,|\,$$
$$\text{Series of Data Provider Assertions}) \Rightarrow$$
$$\frac{\prod_i^n P(HEM1 \text{ is Female and } 18\text{-}24 \,|\, \text{Data Provider}_i \text{ Assertion})}{P(HEM1 \text{ is Female and } 18\text{-}24)^{n-1}} * \frac{1}{Z}$$

In some implementations, in Equation 16, n may represent is the number of data providers that have asserted HEM 1, and Z may represent is a normalization constant that does not depend on P(HEM1 is Female and 18-24).

In various implementations, when determining a user attribute verification score, the data verification system 106 does not require that the dimensionality of a given data provider's assertion (e.g., an age assertion) match the dimensionality of the demographic being scored (e.g., age and gender, simultaneously). Accordingly, if Data Provider A asserts that HEM 1 is female, and Data Provider B asserts that Hem 1 is 18-24, the data verification system 106 can estimate the probability this HEM 1 is both female AND 18-24. To illustrate, the data verification system 106 may follow the formulation shown in Equation 17 below.

$$\text{User Attribute Verification Score of} \tag{17}$$
$$\text{Female and } 18\text{-}24 \text{ for } HEM1 =$$
$$\frac{P(HEM1 \text{ is } F, 18\text{-}24 \,|\, \text{Provider } A \text{ Asserts } F) *}{P(HEM1 \text{ is Female and } 18\text{-}24)} * \frac{1}{Z}$$

As described above, the data verification system 106 can generate a confusion matrix and calculate an MLE for both P(HEM1 is F, 18-24|Provider A Asserts F) and P(HEM1 is F, 18-24|Provider B Asserts 18-24). To illustrate, the data verification system 106 may generate the non-square confusion matrix for P(HEM1 is F, 18-24|Provider A Asserts F) shown in Table 6 below. Similarly, the data verification system 106 may generate the non-square confusion matrix for P(HEM1 is F, 18-24|Provider B Asserts 18-24) shown in Table 7 below.

TABLE 6

User Attribute Accuracy Rate for P (HEM1 is F, 18-24 | Provider A Asserts F)

| | | Data Provider A | |
|---|---|---|---|
| | | Female | Male |
| Validation Dataset | F18-24 | 800 | 40 |
| | F25-34 | 400 | 50 |
| | F35-44 | 100 | 20 |
| | F45-54 | 75 | 10 |
| | F55-64 | 50 | 20 |
| | F65+ | 25 | 5 |
| | M18-24 | 100 | 100 |
| | M25-34 | 150 | 600 |
| | M35-44 | 50 | 100 |
| | M45-54 | 25 | 75 |
| | M55-64 | 25 | 105 |
| | M65+ | 0 | 75 |
| | Total | 1800 | 1200 |

TABLE 7

User Attribute Accuracy Rate for P(HEM1 is F, 18-24 | Provider B Asserts 18-24)

| | | Data Provider B | | | | | |
|---|---|---|---|---|---|---|---|
| | | 18-24 | 25-34 | 35-44 | 45-54 | 55-64 | 65+ |
| Validation Dataset | F18-24 | 150 | 50 | 25 | 0 | 0 | 0 |
| | F25-34 | 20 | 200 | 50 | 5 | 0 | 0 |
| | F35-44 | 15 | 25 | 200 | 25 | 0 | 0 |
| | F45-54 | 0 | 5 | 35 | 100 | 25 | 20 |
| | F55-64 | 0 | 5 | 15 | 25 | 300 | 50 |
| | F65+ | 0 | 0 | 5 | 20 | 75 | 150 |
| | M18-24 | 100 | 75 | 0 | 0 | 0 | 0 |
| | M25-34 | 5 | 250 | 50 | 0 | 0 | 0 |
| | M35-44 | 10 | 25 | 150 | 25 | 0 | 05 |
| | M45-54 | 0 | 15 | 50 | 75 | 0 | 25 |
| | M55-64 | 0 | 0 | 15 | 20 | 250 | 50 |
| | M65+ | 0 | 0 | 5 | 5 | 50 | 100 |
| | Total | 350 | 650 | 600 | 300 | 700 | 400 |

As shown in Tables 6 and 7, in various implementations, the data verification system 106 can generate confusion tables of user attribute accuracy rates that are non-square. Indeed, as shown, in various implementations, the data verification system 106 aligns the axes of the confusion matrix with the same number of dimensions of the compound user attribute. In this way, the axis of the confusion matrix that corresponds to data provider assertions retains the dimension of the user attribute space for that data provider.

In some implementations, before determining a user attribute verification score and/or executing a wisdom of the crowds algorithm, the data verification system 106 performs anomaly detection. For example, in one or more implementations, the data verification system 106 filters user identifiers with abnormal occurrence patterns. To illustrate, in various implementations, if a given data provider has multiple assertions associated with a given user identifier such that an assertion number threshold (e.g., 2, 3, 5, 7, or 10), the data verification system 106 can exclude and/or remove the user identifier. For instance, if Data Provider A has 10 separate assertions for the age of HEM123, the data verification system 106 can remove some or all of the user attribute assertion for HEM123.

In one or more implementations, the data verification system 106 encounters sparse confusion matrices. For example, in some cases, entire columns and/or rows in a confusion matrix are sparsely populated. For instance, in some implementations, the amount of user attribute data in a confusion matrix is insufficient, which results in the statistical fluctuations governing the estimate $\hat{p}_{ij}$, (i.e., the margin of error around the point estimate $\hat{p}_{ij}$) possibly being too large to make an accurate inference about $\hat{p}_{ij}$. Stated differently, in many implementations, the data verification system 106 needs a confusion matrix of sufficient sample size in each column to determine user attribute accuracy rates from a data provider. In some implementations, a five-percentage point change in an estimate for the attribute-value accuracy (e.g., $\hat{p}_{ij}$) of a given data provider is statistically significant at either a 90% or 95% significance threshold.

In various implementations, the data verification system 106 utilizes one or more approaches to improve space confusion matrices. For example, in one or more implementations, the data verification system 106 utilizes a Wald confidence interval. In some instances, the data verification system 106 utilizes the formula for the Wald confidence interval for the success probability of the binomial distribution (i.e., the hyper-parameter p in Binom(n,p)) to provide additional guidance on a sample size of n, which would be needed for an estimate of a given data provider's accuracy for a given attribute value, $\hat{p}_{ij}$, to be statistically representative. To illustrate, Equation 18 shows formulations for the Wald confidence interval:

$$\text{Wald Confidence Interval} = \hat{p} \pm z^* \sqrt{\frac{\hat{p}(1-\hat{p})}{n}} \quad (18)$$

$$\text{Margin of Error } (MoE) = z^* \sqrt{\frac{\hat{p}(1-\hat{p})}{n}} \Rightarrow n = \frac{(z^*)^2(\hat{p}(1-\hat{p}))}{(MoE)^2}$$

In Equation 18, n may represent the statistically representative sample size, z* may represent the (1−α/2) quartile of a standard normal distribution (i.e., probit) corresponding to the target error rate α, and $\hat{p}$ may represent the assumed data provider accuracy. In some instances, because determining $\hat{p}$ is difficult before constructing the confusion matrices, the data verification system 106 utilizes an initial default value of 0.5 to maximize the $\hat{p}(1-\hat{p})$ term.

In various implementations, using a statistical significance level of 90% (and, by extension, a target error rate/p-value of α=0.1 and z*=1.645), the data verification system 106 assumes a margin of error of 5%, and a $\hat{p}$ of 0.5. In these implementations, the data verification system 106 performs the formulations shown in Equation 19 below.

$$n = \frac{(1.645)^2(0.5(1-0.5))}{(0.05)^2} = 270.6 \quad (19)$$

As shown in Equation 19, in some implementations, for a 5% difference in data provider accuracies and for given user attribute values to be statistically significant at the 90% level, there needs to at least 271 observations in a given column of the confusion matrix. For attributes that are bias-corrected, the sample size n that governs the statistical fluctuations in $\hat{p}$ is not simply the raw column total. Since the process of bias correction applies a weight to certain or all user identifiers, the data verification system 106 determines a new sample of user identifiers (e.g., HEMs) where some observations are perfectly correlated with one another. As a result, the nominal sample size (i.e., column total) of the confusion matrix needs to be adjusted to reflect these weights. In some implementations, this adjusted sample size is called the effective sample size, or $n_{eff}$, and is always smaller (or equal to) the nominal sample size n.

In various implementations, the data verification system 106 determines the effective sample size calculation (e.g., known as Kish's effective sample size) by first adding the weights on each user identifier, squaring, then divided by the sum of squared weights. In some implementations, the data verification system 106 utilizes the formulation shown in Equation 20 below.

$$n_{eff} = \frac{\left(\sum_i^n w_i\right)^2}{\sum_i^n w_i^2} \quad (20)$$

In Equation 20, in various implementations, the effective sample size governs the statistical fluctuation. Accordingly, in these implementations, the data verification system 106 may observe accuracies for a given user attribute value $\hat{p}$ of a data provider. In one or more implementations, $\hat{p}$ is the value that must exceed 271 observations in a given column for bias-corrected user attributes.

Returning to FIG. 4, as shown, the act 206 includes a sub-act 416 of generating a user attribute verification score database that includes user attribute verification score for user identifiers. For example, in various implementations, the data verification system 106 records each of the user attribute verification scores (e.g., truth scores) determined for each user attribute for each user identifier. In some implementations, the data verification system 106 generates a listing of unique, non-repeating user identifiers along with corresponding truth scores for each available user attribute value. As described below, in one or more implementations, the data verification system accesses the user attribute verification score database (or "verification score database") to improve the accuracy of user identifier segments and/or perform other practical applications.

Figure 5:
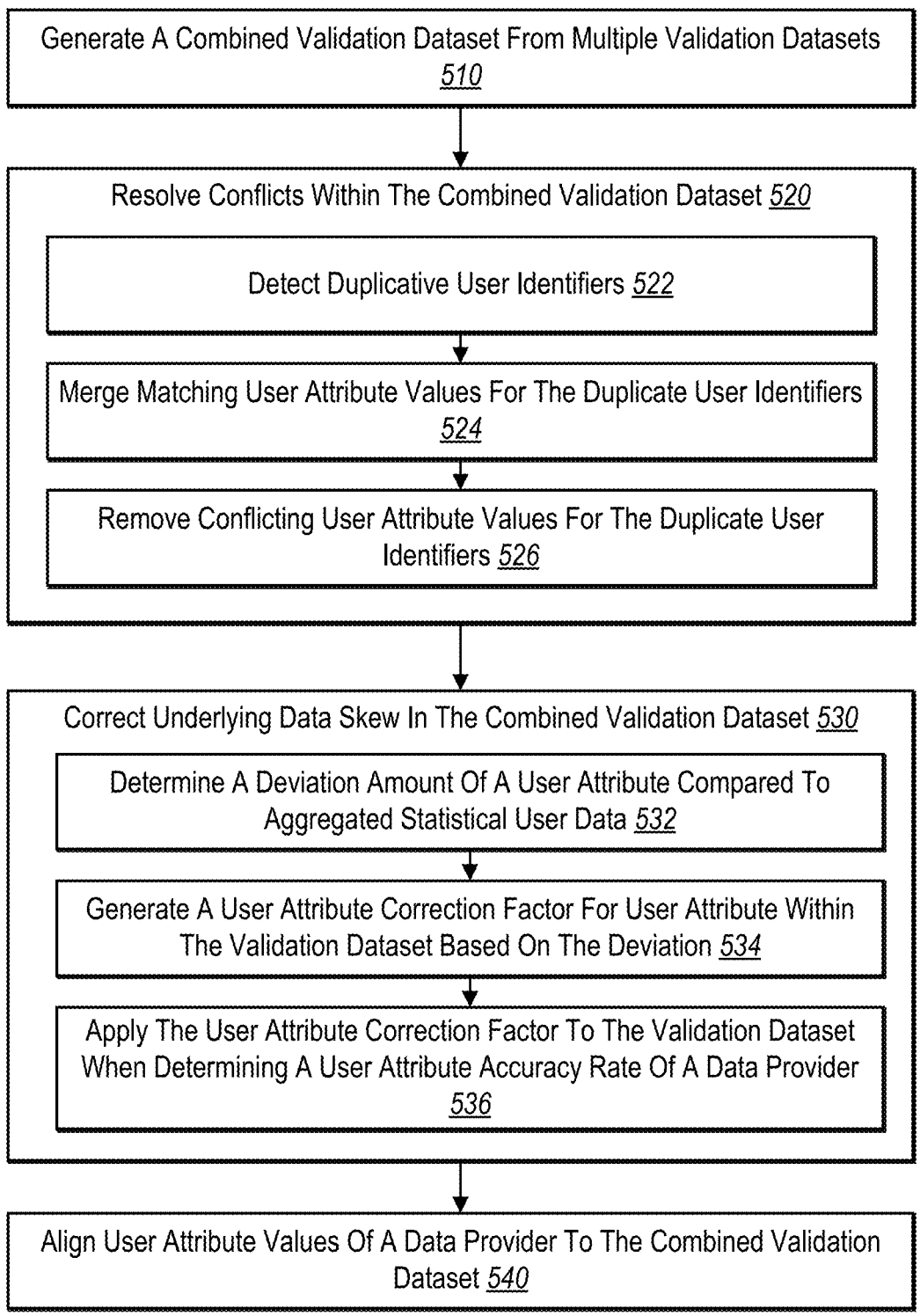
FIG. 5 illustrates a block diagram of generating and correcting validation datasets in accordance with one or more implementations.

Turning now to FIG. 5, additional detail is provided with respect to the data verification system 106 managing validation datasets. In particular, FIG. 5 illustrates a block diagram of generating and correcting validation datasets in accordance with one or more implementations. As shown, FIG. 5 includes a series of acts 500 that the data verification system 106 performs with respect to validation datasets.

As shown in FIG. 5, the series of acts 500 includes an act 510 of generating a combined validation dataset from multiple validation datasets. As mentioned above, in one or more implementations, the data verification system 106 receives user trait data from multiple validation datasets. Unlike data providers, which can include different accuracy rates for different user attributes as well as user attribute values of the same user attribute, the data verification system 106 treats user trait data and user attribute assertions from validation datasets as accurate. Accordingly, because user trait data from different validation datasets are equally weighted, in various implementations, the data verification system 106 links, joins, merges, and/or otherwise combines user trait data from multiple validation datasets into a combined validation dataset.

In some implementations, the data verification system 106 generates a new table or database to maintain the combined validation dataset. In alternative implementations, the data verification system 106 expands a current validation dataset by adding user trait data from other validation datasets. In one or more implementations, the data verification system 106 sorts, organizes, and/or indexes the combined validation dataset according to user identifiers (e.g., HEMs). In this manner, the data verification system 106 can detect duplicate user attribute assertions for the same user identifier.

As shown, the series of acts 500 includes an act 520 of resolving conflicts within the combined validation dataset. To illustrate, the act 520 includes various sub-acts for detecting and resolving conflicting user identifiers within the combined validation dataset. For example, the act 520 includes a sub-act 522 of detecting duplicate user identifies.

In some implementations, the sub-act 522 includes the data verification system 106 determining whether user attribute assertions for the duplicate user identifiers match. For example, in one or more implementations, upon detecting two entries for the user identifier of HEM321, the data verification system 106 can determine if they share the same user attributes. If so, the data verification system 106 can then determine whether the user attribute assertions for each user attribute match. Otherwise, the data verification system 106 can note the non-matching user attributes and their corresponding user attribute assertion between the two user identifier.

As shown, the act 520 includes a sub-act 524 of merging matching user attributes values for the duplicative user identifiers. For instance, in various implementations, when the two user identifiers include a matching user attribute (e.g., age) that also shares a matching user attribute assertion (e.g., 25 years old), the data verification system 106 merges or combines the user attribute value to a single user identifier. For example, the data verification system 106 selects one of the user identifiers and removes the other. In another example, the data verification system 106 creates a new merged entry for the user identifier and removes the two previous user identifier entries. In some implementations, the data verification system 106 takes no action when the two user identifiers are determined to have matching user attribute values.

As mentioned above, in some instances, the data verification system 106 detects that the two user identifiers have different user attributes. For example, a first user identifier has a combined age/income user attribute while the second user identifier does not. In these instances, the data verification system 106 can modify the second user identifier to include the missing user attribute or generate a new user identifier that includes each unique user attribute from the two user identifiers. In some implementations, the data verification system 106 removes any user attribute not found in both user identifiers.

As shown, the act 520 includes a sub-act 526 of removing conflicting user attribute values for the duplicate user identifier. For example, in some implementations, the data verification system 106 removes one or both of the user attribute values for a conflicting user attribute. In one or more implementations, when conflicting user attribute assertions are detected in a user attribute for the duplicate user identifier, the data verification system 106 completely removes both of the user identifiers from the combined validation dataset. Indeed, in these implementations, if the data verification system 106 detects any evidence of conflicting information across a user attribute, the data verification system 106 removes the user identifier and all corresponding user attributes entirely from the validation datasets.

As illustrated in FIG. 5, the series of acts 500 includes an act 530 of correcting underlying data skew in the combined validation dataset. In some cases, a panel from which user trait data is collected contains various biases and may not perfectly represent a given population. In these cases, it can be important for the data verification system 106 to detect and correct any underlying data skew that may affect the accuracy of the user trait data in a validation dataset, which, in turn, could compromise the accuracy of user attribute verification scores (e.g., truth scores).

To illustrate, if a certain demographic (e.g., young people, females, or low-income earners) is over-represented or under-represented in a particular validation dataset, the validation dataset could be erroneously impacted with respect to how accurate any given data provider performs when evaluated against that validation dataset. Additionally, as the underlying user attribute skew itself intensifies, the magnitude and extent to which user attribute verification scores distort also increases.

As an extreme example, suppose one validation set contains 90% female user identifiers (e.g., HEMs). Here, the data verification system 106 matches user identifiers from the validation set to a segment of user identifiers from Data Provider A. Further, Data Provider A, in truth, has an 80% accuracy rate of asserting a user identifiers is a male. Since the match rate between Data Provider A and the validation set is 9 times higher for those user identifiers that are inaccurately classified by Data Provider A—that is, the user identifiers that are actually female according to the validation set but that are asserted to be male— Data Provider A accuracy at making male assertions will appear to be well below 50% when it is really 80%. Accordingly, the data verification system 106 can apply corrective population re-factoring weights to validation sets at the record-level, in order for these data assets to more closely represent U.S. demographics.

To combat underlying user attribute skew, in various implementations, the data verification system 106 performs the act 530 of correcting underlying data skew in the combined validation dataset. As shown, the act 530 includes various sub-acts including a sub-act 532 of determining a deviation amount of a user attribute compared to aggregated statistical user data. For instance, in one or more implementations, the data verification system 106 compares the values of each user attribute (e.g., age, gender, household income, ethnicity) and/or user attribute combinations (e.g., age and household income, age, and gender) in a validation dataset to an aggregated statistical user data to determine to what extent the user attribute values in the validation dataset deviate. In example implementations, in making the above comparison, the data verification system 106 assumes that that user identifiers from a data provider are roughly uniform across the different user attribute values per user attribute (e.g., the average number of user identifiers is roughly equivalent for females and males, for lower and higher-income individuals, and/or for younger and older individuals).

In various implementations, the aggregated statistical user data represents statistics for the general population of the United States for individuals over the age of 16. For example, the aggregated statistical user data are derived from user trait data from the U.S. Census, the American Community Survey, Core Trends Survey from the Pew Research Group, and the Public Use Microdata Sample (PUMS). In one or more implementations, aggregated statistical user data is derived from other external datasets obtained to establish statistics of the US general population (e.g., data from the US Veterinary Association to get population information on pet owners in the US). In some implementations, the aggregated statistical user data contains a statistically representative sample of a population, such as 1% of the general population on both a state and a national level. In one or more implementations, the aggregated statistical user data is updated regularly, such as annually or bi-annually. Additionally, in example implementations, the aggregated statistical user data enables the data verification system 106 to establish user attribute targets for both single-user attributes (e.g., age) as well as combined user attributes (e.g., age and gender) when evaluating underlying data skew in a validation dataset.

As shown, the act 530 includes a sub-act 534 of generating a user attribute correction factor for the user attribute value for the validation dataset based on the deviation. For example, based on comparing the user trait data from a validation dataset to the aggregated statistical user data, the data verification system 106 detects under-representation or over-representation of the user trait data in the validation dataset. In response, in various implementations, the data verification system 106 generates a user attribute correction factor (e.g., a user attribute correcting weight) that re-aligns the user trait data from a validation dataset to the aggregated statistical user data. For example, if the data verification system 106 detects that men that are age 18-24 are twice as common in the aggregated statistical user data than in the data verification system 106, the data verification system 106 can generate a weight of 2.0 for the user attribute values of Male.

As shown, the act 530 includes a sub-act 536 of applying the user attribute correction factor to the validation dataset when determining a user attribute accuracy rate of a database. For instance, in various implementations, the data verification system 106 applies the user attribute correction factor for a given user attribute value to user attribute values in a data provider before determining the user attribute accuracy rate of the user attribute value for the data provider. To illustrate, in the above example where the data verification system 106 generated a user attribute correction factor of 2.0 for the user attribute value of Male, the data verification system 106 can weight the number of gender user attribute values asserted as Male by 2.0 when determining the user attribute accuracy rate for the data provider, which is described above.

In various implementations, the data verification system 106 continually refines the user attribute correction factors. For example, the data verification system 106 continuously detects underlying user attribute skew in user trait data within validation datasets as new data arrives, refreshed, and/or as aggregated statistical data is updated. In this manner, the data verification system 106 can both re-evaluate the user attribute skews in the validation datasets as well as and re-derive user attribute correction factors.

As illustrated in FIG. 5, the series of acts 500 includes an act 540 of aligning user attribute values of a data provider to the combined validation dataset. In some cases, a data provider and the combined validation dataset will both have a target user attribute, but they will have different user attribute values for the target user attribute. For example, a data provider may report user attribute values as number ranges (e.g., 18-24, 25-34, 35-44, . . . , 65+) while the combined validation dataset includes discrete numbers or points (e.g., 18, 19, 20, . . . , 115). In these examples, data verification system 106 can easily align the user attribute values for the target user attribute between the data provider and the combined validation dataset (e.g., convert the validation dataset to matching age ranges).

In some implementations, however, the data provider and the combined validation dataset include misaligned user attribute values. For example, Data Provider A asserts an income of $75K-$125K for a target user identifier, Data Provider B asserts an income of $60K-$80K for the target user identifier, and the combined validation dataset asserts an income of $45K-$75K for the target user identifier. Before the data verification system 106 can determine a user attribute accuracy rate for the data providers or user attribute verification score for the income user attribute, the data verification system 106 aligns and/or redistributes the user attribute value ranges to match across datasets.

In one or more implementations, the data verification system 106 splits up and reallocates the user attribute values. For instance, in these implementations, the data verification system 106 splits and reallocates the user attribute values (e.g., the resulting confusion matrix for the user attribute) based on the relative overlap between different user attribute value ranges. In particular, the data verification system 106 utilizes the co-occurrence of the given raw data provider assertions and the given raw validation data set assertions to determine how to roughly split and reallocate the user attribute values.

To illustrate, in various implementations, the data verification system 106 quantifies the relative overlap between a raw assertion range and a set attribute value range as utilizing the formulation shown in Equation 21 below.

$$\text{Raw Data Provider User Attribute Value Range} = [a, b] \quad (21)$$

$$\text{Validation Dataset User Attribute Value Range} = [c, d]$$

$$\text{Relative Overlap between } [a, b] \text{ and } [c, d] = \frac{\text{Min}(b, d) - \text{Max}(a, c)}{b - a}$$

For the above example income values, the target user identifier would fit into Data Provider A's confusion matrix in the cell that corresponded to a data provider assertion of $75K-$125K and the validation dataset's assertion of $45K-$75K. To illustrate, Table 8 shows an example confusion matrix.

TABLE 8

Pre-Re-Allocated Confusion Matrix

| | Data Provider A Raw Assertions | | |
|---|---|---|---|
| Income | $0-$75K | $75K-$125K | $125K+ |
| Validation Dataset | $0-$20K | | |
| | $20-$45K | | |
| | $45-$75K | 1 | |
| | $75-$90K | | |

Table 9, below, shows a reallocated version of Table 8 utilizing the above approach where the user attribute values of the validation dataset are split and reallocated.

TABLE 9

Post-Re-Allocated Confusion Matrix

| | Data Provider A Raw Assertions | | |
|---|---|---|---|
| Income | $0-$75K | $75K-$125K | $125K+ |
| Validation Dataset | $0-$50K | 0.17 | |
| | $50-$100K | 0.83 | |
| | $75-$90K | | |

To further illustrate, the results shown in Table 8, Equation 22 shows one example implementation of how the data verification system 106 determined the relative overlap.

Raw Data Provider Assertion on [45, 75]  (22)

Relative Overlap of [45, 75] and [0.50] =

$$\frac{\text{Min}(50, 75) - \text{Max}(45, 0)}{75 - 45} = \frac{50 - 45}{30} = 0.17$$

Relative Overlap of [45, 75] and [50, 100] =

$$\frac{\text{Min}(75, 100) - \text{Max}(45, 50)}{75 - 45} = \frac{75 - 50}{30} = 0.83$$

In some implementations, for some user attribute values, such as the income user attribute, the data verification system 106 applies the relative overlap transformation to one axis of the confusion matrix. In these implementations, the validation dataset keeps the user trait data from the data provider in terms of the "raw" user attribute assertion ranges. If the data verification system 106 modifies the ranges of the user attribute values of a target user attribute based on relative estimates, the accuracy of determining user attribute accuracy rates for the user attribute values could inadvertently decrease (and less accurate user attribute verification scores). Thus, by maintaining the user attribute values of the data provider, the data verification system 106 ensures highly accurate user attribute accuracy rates, which, in turn, leads to highly accurate user attribute verification scores.

As described above, the series of acts 500 in FIG. 5 is generally described with respect to the data verification system 106 performing actions on a combined validation dataset. In various implementations, the data verification system 106 skips or omits one or more of the acts or sub-acts. Additionally, in some implementations, the data verification system 106 performs one or more the acts 520-540 to an individual validation dataset before generating the combined validation dataset.

Figure 6A:
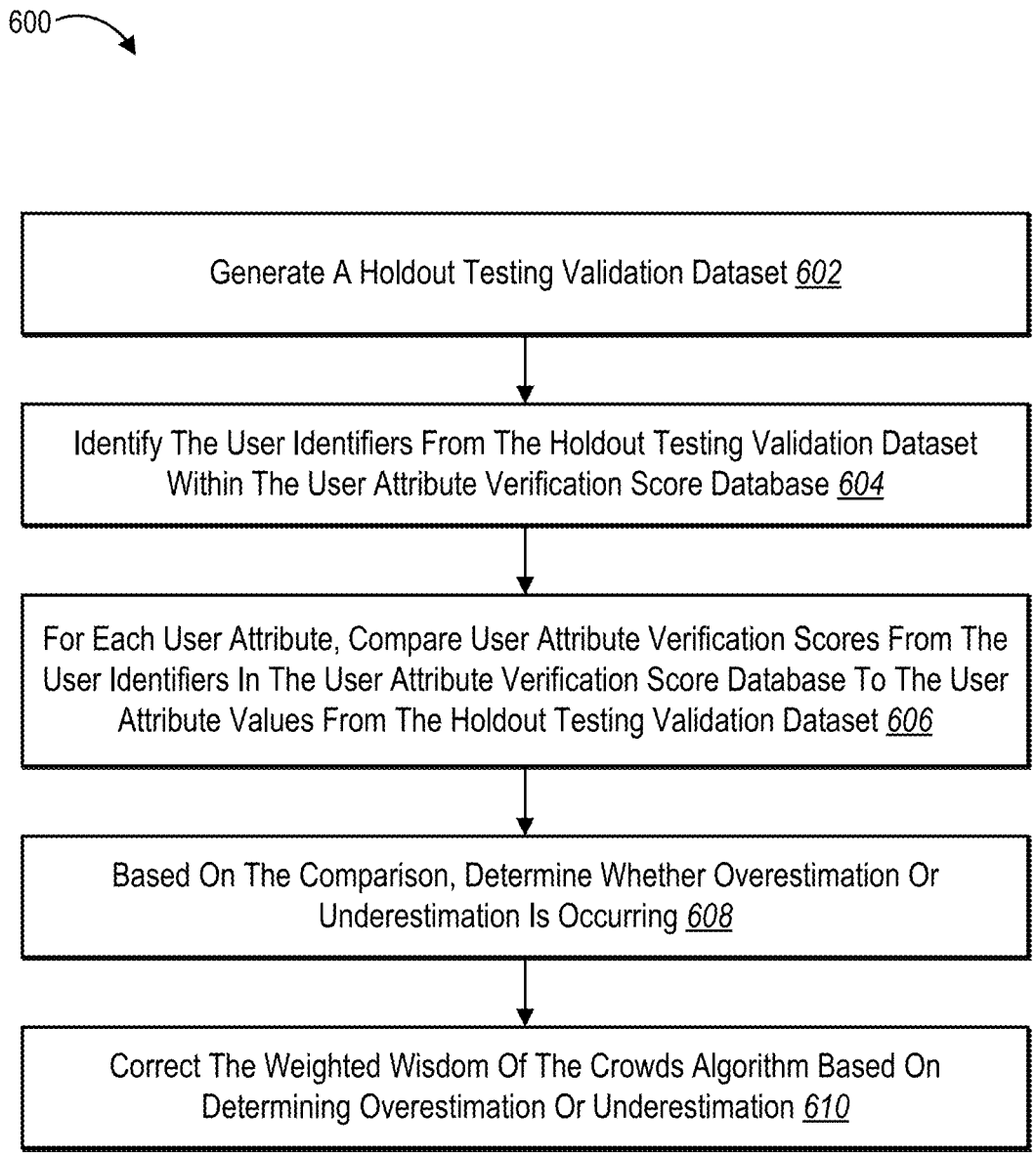
FIGS. 6A-6B illustrate block diagrams of verifying validation dataset accuracy in accordance with one or more implementations.
Figure 6B:
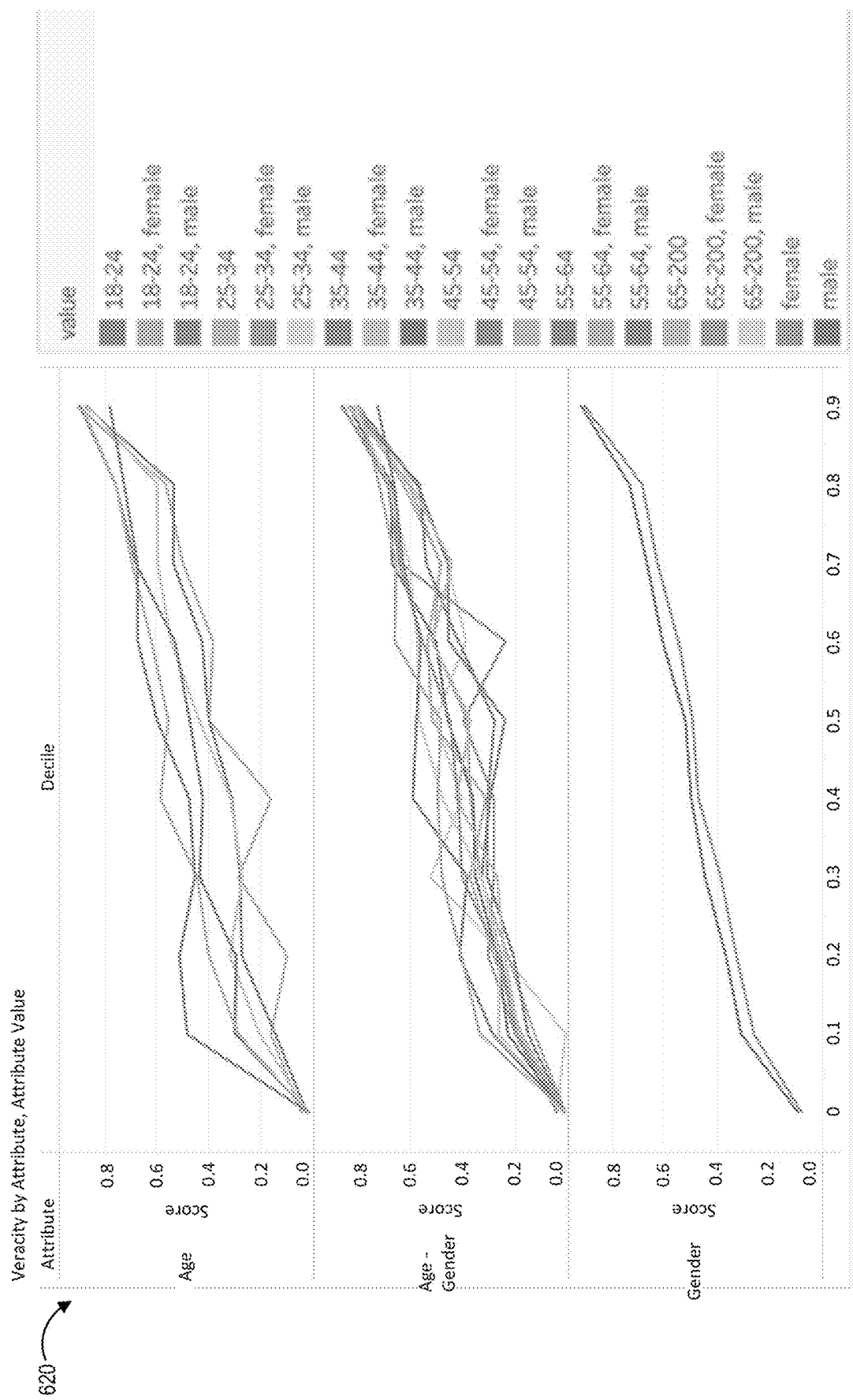

Turning now to FIGS. 6A-6B, additional detail is provided with respect to testing and correcting user attribute verification score deviations utilizing user trait data from validation datasets. In particular, FIGS. 6A-6B illustrate block diagrams of verifying validation dataset accuracy in accordance with one or more implementations. As shown, FIG. 6A includes a series of acts 600 that the data verification system 106 performs with respect to validation datasets.

As mentioned above, in various implementations, the data verification system 106 can validate user attribute verification scores to help ensure a high level of accuracy. For example, once the data verification system 106 determines user attribute verification scores for a set of user identifiers (e.g., HEMs) and a target user attribute, the data verification system 106 can measure and test the accuracy of the verification scores (sometimes referred to hereinafter as "truth score veracity"). In various implementations, the data verification system 106 represents truth score veracity as a number between 0.0-1.0, although other number ranges can be utilized.

In one or more implementations, the data verification system 106 tests the accuracy of user attribute verification scores for a target user attribute (e.g., truth score veracity of the target user attribute) utilizing test data from a validation dataset. To illustrate, the series of acts 600 includes an act 602 of generating a holdout testing validation dataset. For instance, in various implementations, the data verification system 106 randomly selects 20% (or another amount such as 10%, 15%, 20%, 25%, or 30%) of the user identifiers from a validation dataset (e.g., the combined validation dataset) for testing (e.g., an initial test dataset or holdout testing validation dataset). With the remaining 80% of the user identifiers, the data verification system 106 determines user attribute accuracy rates for data providers as well as user attribute verification score for user identifiers, as described above.

As shown, the series of acts 600 includes an act 604 of identifying the user identifiers from the holdout validation test dataset within the user attribute verification score database. For instance, in various implementations, the data verification system 106 determines matches for each of the user identifiers (e.g., HEMs) in the holdout validation test dataset that are also found in the user attribute verification score database. As described above, in various implementations, the data verification system 106 stores user attribute verification scores (e.g., truth scores) for user attribute values corresponding to a user identifier that indicates the probability that a target user attribute value for a user identifier is accurate.

As shown, the series of acts 600 includes an act 606 of comparing user attribute verification score from the user identifiers in the user attribute verification score database to the user attribute values from the holdout validation test dataset. For example, in one or more implementations, the data verification system 106 determines how many (e.g., a proportion) of the user identifiers from the holdout validation test dataset have user attribute values that correspond to user attribute verification scores for asserted user attribute value of the same user identifiers from the user attribute verification score database.

In one or more implementations, the data verification system 106 utilizes a user attribute verification score threshold to compare the user identifiers between the holdout validation test dataset and the verification score database for the asserted user attribute value. For example, given a user attribute verification score threshold of 0.6, the data verification system 106 determines a subset of user identifiers in the user attribute verification score database that has a user attribute verification score for the target user attribute value of 0.6 or greater. The data verification system 106 can then determine the percentage of user identifiers from the subset of user identifiers that make up the holdout validation test dataset. For instance, the data verification system 106 determines if the subset of user identifiers comprise more or less than 60% of the user identifiers in the holdout validation test dataset.

As shown, the series of acts 600 includes an act 608 of determining whether overestimating or underestimating is occurring based on the comparison. For instance, in various implementations, if the data verification system 106 detects that the user attribute verification score for a given user attribute value is higher than the percentage of user identifiers in the holdout validation test dataset matching the user attribute assertion, the data verification system 106 can determine that the wisdom of the crowds algorithm is systematically underestimating the truthfulness of the data providers assertions for user identifiers regarding user attribute values. Conversely, if the data verification system 106 detects that the user attribute verification score for a given user attribute value is lower than the percentage of user identifiers in the holdout validation test dataset matching the user attribute assertion, the data verification system 106 can determine that the wisdom of the crowds algorithm is systematically overestimating the truthfulness of the data providers assertions for user identifiers regarding user attribute values.

As shown, the series of acts 600 includes an act 610 of correcting the weighted wisdom of the crowds algorithm based on determining overestimation or underestimation. For example, in one or more implementations, based on determining overestimation, the data verification system 106 can adjust the wisdom of the crowds algorithm to incrementally underestimate the user attribute verification scores of the data providers assertions for user identifiers regarding user attribute values until the data verification system 106 no longer detects overestimated user attribute verification scores. In one or more implementations, the data verification system 106 applies other modifications to correct overestimation. Similarly, in various implementations, the data verification system 106 corrects underestimation.

With the above framework in place, additional detail is now provided regarding testing the veracity of truth scores (i.e., user attribute values). To illustrate, in various implementations, the data verification system 106 determines the accuracy of user attribute verification scores (e.g., truth score veracity) at a granular level. For instance, in one or more implementations, the data verification system 106 determines truth score veracity for a user attribute value at the decile level (e.g., a decile divides a truth score between 0.0-0.1 into ten equal truth score parts of 0.0-0.1, 0.1-0.2, 0.2-0.3, . . . , 0.9-1.0). Additionally, within a given truth score decile (for a given user attribute value), the data verification system 106 compares each user identifier in the truth score database that is also found in the holdout validation test dataset.

More specifically, in one or more implementations, the data verification system 106 determines the proportion of user identifiers in each decile for which the user attribute value in the truth score database corresponds with the user attribute value (e.g., age is 18-24, gender is female) in the holdout validation test dataset. The data verification system 106 then utilizes the proportions to indicate the truth score veracity of the corresponding truth score decile.

By determining the truth score veracity for a user attribute value, the data verification system 106 can verify and confirm that truth score (i.e., user attribute verification scores) for a given user attribute value and the decile accurately reflect the probability of the user attribute assertions for the user identifier is true. For instance, when a user interface has a truth score of 0.6 for the age user attribute assertion of 18-24, this should translate to a 60% chance that the user identifier is actually 18-24 years old. Accordingly, the truth score veracity ensures this assertion is being maintained.

In addition, an accurate truth score veracity indicates to the data verification system 106 that assumptions for the wisdom of the crowds algorithm are correct. For instance, based on the truth score veracity, the data verification system 106 verifies that data provider assertions for the Naïve Bayes are conditionally independent, or otherwise determines that these assumptions are being violated and, therefore, need to be re-examined.

In various implementations, a truth score decile and the truth score veracity for the decile should be highly correlated with a positive, linear trend. To illustrate, FIG. 6B shows truth score veracity graphs 620 showing a linear relationship between truth score veracity scores of a decile and the proportion of user identifiers in each decile for which the user attribute value in the truth score database corresponds. As shown, the truth score veracity graph 620 displays three user attributes comparisons (e.g., age at the top, age-gender in the middle, and gender at the bottom).

In example implementations, the data verification system 106 expects to observe the mathematical properties of positive directionality, linearity, and value equivalency in the relationship between a truth score decile and that decile's truth score veracity. Regarding positive directionality, as the value of each truth score decile increases, so should the truth score veracity metric. In other words, the truth score veracity for every subsequent decile (e.g., 0.9-1.0) should be higher than the veracity of the previous decile (e.g., 0.8-0.9).

Regarding linearity, in addition to a truth score decile and the truth score veracity for the decile having the same (positive) directionality, they should also track each other linearly. That is, as the value of the truth score decile doubles (e.g., from the 0.2-0.3 decile to the 0.4-0.5 decile), the veracity measure should also ideally double. To illustrate, the truth score veracity graphs 620 show the linearity of both deciles as well as their corresponding truth score veracities.

Regarding value equivalency, in one or more implementations, the value of the truth score veracity for a given decile should be similar to the value of the decile itself. For instance, in some implementations, the value of the truth score veracity for a given decile should be contained within the range of truth scores covered by the decile itself. For example, for the 0.8-0.9 decile, the truth score veracity for this decile should be close to the 0.8-0.9 range.

In one or more implementations, the data verification system 106 determines that one or more truth scores (e.g., user attribute verification scores) are being overestimated. For instance, the data verification system 106 detects that truth score veracity for a given truth score decile is lower than the lower bound of the decile itself (e.g., a truth score veracity of 0.72 for the 0.8-0.9 decile). In these implementations, the data verification system 106 determines that the wisdom of the crowds algorithm is systematically overestimating the truthfulness of the data provider's assertions for user identifiers regarding user attribute values. In some implementations, the data verification system 106 can adjust the wisdom of the crowds algorithm to incrementally underestimate the truth scores of the data providers assertions for user identifiers regarding user attribute values until the data verification system 106 no longer detects overestimated truth scores.

In some implementations, the data verification system 106 determines that one or more truth scores (e.g., user attribute verification scores) are being underestimated. For instance, the data verification system 106 detects that the truth score veracity for a given decile is higher than the upper bound of the decile itself (e.g., a truth score veracity of 0.95 for the 0.8-0.9 decile). In these implementations, the data verification system 106 determines that the wisdom of the crowds algorithm is systematically underestimating the truthfulness of one or more data providers' assertions for user identifiers regarding user attribute values and take appropriate corrective actions.

In some implementations, the data verification system 106 tests the two criteria (e.g., positive directionality and linearity) by analyzing the correlation (i.e., calculating Pearson's correlation coefficient, $R^2$) between the average truth score in a given decile and that decile's truth score veracity. For example, in various implementations, the data verification system 106 can evaluate the correlation coefficient of $R^2$ for a target attribute (e.g., gender) and target user attribute value (e.g., male), as well as across all user attributes.

For the criteria of value equivalency, the data verification system 106 can test these criteria through statistical hypothesis testing. More specifically, for every decile, for every user attribute, and for every user attribute value, the data verification system 106 may conduct a binomial exact test between the truth score veracity in that decile and the average truth score in the same decile. In this manner, the data verification system 106 determines whether the truth score veracity of each decile is statistically equivalent to the average truth score in that same decile or, rather, attributable to random chance.

To illustrate, in various implementations, the data verification system 106 tests the null and alternative hypotheses shown in Equation 23 below.

$$H_o: \hat{V} = P_0 \Rightarrow \hat{V} - P_0 = 0$$

$$H_A: \hat{V} - P_0 \neq 0 \quad (23)$$

In Equation 23, $\hat{V}$ may represent the veracity for a given decile and target user attribute value and $P_0$ may represent the null proportion being tested. In some implementations, $P_0$ is a dataset to $\hat{T}$, which represents an average user attribute verification score (e.g., truth score) in a decile.

In some implementations, the data verification system 106 follows the binomial test statistic shown in Equation 24 below to further test these hypotheses.

$$\text{For } k \leq np_0: \quad P(X \leq k) = 2 * \sum_i^k \binom{n}{i} p_0^k (1-p_0)^{n-i} \quad (24)$$

$$\text{For } k \geq np_0: \quad P(X \geq k) = 2 * \sum_k^i \binom{n}{i} p_0^k (1-p_0)^{n-i}$$

In Equation 24, n may represent the observed number of user identifiers (e.g., HEMs) for a decile and user attribute value that overlap with the test dataset, k may represent the observed number of user identifiers for a decile and user attribute value that overlap with the test dataset that has the target user attribute value, and $p_0$ may represent the average user attribute verification score (e.g., truth score) among the user identifiers found in the test dataset for the target decile and user attribute value.

In example implementations, if the above test statistic returns an associated p-value of below 0.05, then the data verification system 106 can reject the null hypothesis that the truth score veracity in a given decile and the average truth score in that decile are equivalent.

In alternative implementations, the data verification system 106 can test the calibration criteria in another manner. To illustrate, in various implementations, the data verification system 106 can test the two criteria of positive directionality and linearity by examining the correlation (e.g., calculating Pearson's correlation coefficient) between the average user attribute verification score in a given decile and that decile's veracity. In some instances, the correlation can be evaluated for a specific attribute (e.g., gender) and attribute value (e.g., male) and/or across all attributes.

For certain attributes, such as binary attributes (e.g., gender and presence of children), the correlation coefficient between veracity and the average user attribute verification score in a decile is based on a limited number of data points (e.g., 20 at most including one data point for each of the 10 deciles and 2 attribute values per decile). For these attributes, the correlation coefficient between veracity and average user attribute verification score may not be the most robust metric, since it can be easily influenced by outliers (e.g., deciles with particularly high or low veracity) from run to run of the user attribute verification score algorithm. Outliers often occur because veracity itself can be an aggregate measure that pertains to all user identifiers with user attribute verification scores in a given decile for a given attribute value and that are found in the random 20% holdout of the validation set. Further, in these instances, veracity can be susceptible to low sample sizes. For example, consider the extreme case where only one user identifier is found in the 20% holdout of the validation set and falls into the 0.3 decile for a given attribute value (e.g., female). The user attribute verification score veracity in this decile (based upon a sample size of 1) will either be 0 or 1. Whether the veracity in this one particular decile is 0 or 1, however, will likely greatly impact the overall correlation between veracity and the average user attribute verification score for the entire attribute (e.g., gender). Therefore, the correlation coefficient is used primarily to test the health and calibration of all user attribute verification score—that is, whether across all attributes and all deciles, user attribute verification scores and veracity have a strong, positive, linear relationship.

For specific attributes, the data verification system 106 can utilize a more cumulative approach to test the relationship between user attribute verification scores and user attribute verification score veracity. For instance, the following steps are followed for one or more attribute verification score attributes to test if user attribute verification scores are an effective and valid estimator. The following approach as well as the general concept of higher prediction accuracy of a binary condition as predicted likelihood increases is related to ROC (Receiver Operating Characteristic) curves. In some instances, however, the data verification system 106 has adapted that statistical approach for determining model validity to be more directly aligned to the use case of a marketer targeting a subset of user identifiers that meet some threshold of likelihood (e.g., a user attribute verification score threshold) for truly possessing the desired attribute.

To illustrate, the following approach for every attribute value and every potential user attribute verification score threshold (i.e., ranging from 0.0 to 1.0) can include:
1. Creating a holdout sample of user identifiers (e.g., HEMs) from the validation sets, such as user identifiers found in the validation sets that were intentionally not used to estimate provider accuracies. Therefore, the data verification system 106 can compare these user identifiers' true demographics from the validation set to their user attribute verification score.
2. Dividing the holdout sample user identifiers into two groups including those below versus those above the given user attribute verification score threshold.
3. Examining the true incidence of user identifiers within each group of user identifiers that possess a given attribute value according to the validation set (e.g., computing the user attribute verification score veracity). The user attribute verification score methodology is valid if the incidence of user identifiers truly possessing the given attribute value (i.e., user attribute verification score veracity) is statistically significantly different between the two groups of user identifiers, and specifically, if this incidence rate is higher among the user identifiers that fall above the chosen user attribute verification score threshold. For the group of user identifiers that fall above the user attribute verification score threshold for the given attribute value, the incidence of user identifiers truly possessing the given attribute value in that group (i.e., the user attribute verification score veracity) is statistically significantly higher than the incidence of the given attribute value in the U.S. population (e.g., where the data verification system 106 quantifies the demographics of the U.S. general population from PUMs and the Core Trends Survey from Pew).

In one or more implementations, given the two estimates of user attribute verification score veracity (e.g., one for the user identifiers that fall above the designated user attribute verification score threshold and another for the user identifiers that fall below the designated user attribute verification score threshold), the data verification system 106 can utilize a two-proportion Z test to test that the veracity among the user identifiers that fall above the user attribute verification score threshold is statistically significantly larger.

To illustrate, in various implementations, the data verification system 106 tests the null and alternative hypotheses shown in Equation 25 below.

$$H_o: V_1 = V_2 \Rightarrow V_1 - V_2 = 0$$

$$H_A: V_1 \leq V_2 \Rightarrow V_1 - V_2 \leq 0 \tag{25}$$

In Equation 25, $V_1$ may represent the veracity among user identifiers that fall below the user attribute verification score threshold for attribute value j and $V_2$ may represent the veracity among user identifiers that fall above the user attribute verification score threshold for attribute value j.

In some implementations, the data verification system 106 utilizes a two-proportion Z test to construct a test statistic, Z. As a reminder, a fundamental assumption of the two proportion Z test is that Z~N(0, 1) having a Gaussian with mean 0 and variance 1. To illustrate, in one or more implementations, Z can be written as shown in Equation 26 below.

$$Z = \frac{v_1 - v_2}{SE} \tag{26}$$

In Equation 26, $v_1$ and $v_2$, may represent the observed veracity among the user identifiers that fall below the user attribute verification score threshold versus above the user attribute verification score threshold for attribute value j. Additionally, SE may represent the standard error estimate. In the two-proportion Z test, the standard error estimate can be based upon a pooled proportion, which can be calculated as shown in Equation 27 below.

$$p = \frac{v_1 n_1 + v_2 n_2}{n_1 + n_2} \tag{27}$$

In Equation 27, $n_1$ and $n_2$ may represent the number of user identifiers (e.g., after bias-correction) that fall above the user attribute verification score threshold versus below the user attribute verification score threshold for attribute value j (e.g., the denominators of $v_1$ and $v_2$). After the pooled proportion has been computed, the data verification system 106 can determine the standard error for the two-proportion Z test statistic, as shown in Equation 28 below.

$$SE = \sqrt{\frac{p*(1-p)}{n_1} + \frac{p*(1-p)}{n_2}} \tag{28}$$

Further, given the test statistic of Z from Equation 26, the data verification system 106 can determine the test statistic by computing the area under the probability density of a N(0, 1) above the test statistic Z. Specifically, in various implementations, to compute the p-value, the data verification system 106 evaluates (e.g., via Scala) the following integral shown in Equation 29 below.

$$\int_{-\infty}^{Z} \frac{1}{1*\sqrt{2\pi}} e^{-\frac{1}{2}\frac{(x-0)^2}{1}} dx \tag{29}$$

In example implementations, if the above test statistic (i.e., Z) returns an associated p-value of below 0.05, then the data verification system 106 can reject the null hypothesis that the truth score (i.e., user attribute verification score) veracity among the two groups of user identifiers (e.g., HEMs) is statistically significant. Instead, with a p-value lower than 0.05, the test statistic Z is sufficiently large to suggest that there is enough evidence that, for this choice of user attribute verification score threshold and attribute value, the veracity among the user identifiers that fall above the user attribute verification score threshold is statistically significantly larger than the veracity among the user identifiers that fall below the same user attribute verification score threshold. Indeed, user identifiers that fall above the desired threshold are significantly more likely to possess the attribute value than user identifiers that do not.

In some implementations, the data verification system 106 perform another statistical hypothesis test to confirm that the user attribute verification score veracity for the user identifiers above the selected user attribute verification score threshold for a given attribute value is larger than that attribute value's natural incidence in the U.S. population. To illustrate, in various implementations, the data verification system 106 tests the null and alternative hypotheses shown in Equation 30 below.

$$H_o: V_1 = V_0 \Rightarrow V_1 - V_0 = 0$$

$$H_A: V_1 \geq V_0 \Rightarrow V_1 - V_0 \geq 0 \tag{30}$$

In Equation 30, $V_1$ may represent the veracity among user identifiers that fall above the user attribute verification score threshold for attribute value j and $V_0$ may represent the natural incidence of attribute value j in the general U.S. population. In some instances, the data verification system 106 treats $V_0$ as a fixed number and not a random variable. Accordingly, the data verification system 106 can use a one proportion Z test and again construct the test statistic Z. Similar to the above, a fundamental assumption of the one-proportion Z test is that Z~N(0, 1) having a Gaussian with mean 0 and variance 1. To illustrate, in one or more implementations, Z can be written as shown in Equation 31 below.

$$Z = \frac{v_1 - V_0}{\sqrt{\frac{V_0 * (1 - V_0)}{n_1}}} \quad (31)$$

In Equation 31, $v_1$ may represent the observed veracity among the user identifiers that fall above the user attribute verification score threshold cutoff and n may represent the number of user identifiers (e.g., after bias correction) that fall above the user attribute verification score cutoff (i.e., the denominator to $n_1$). As in the above statistical hypothesis test, the data verification system 106 can compare Z to a Gaussian with mean 0 and variance 1 to calculate the corresponding p-value. If the p-value is below 0.05, the data verification system 106 can reject the null hypothesis and have sufficient evidence that the veracity among the user identifiers that exceed the user attribute verification score threshold for a given attribute is statistically significantly larger than attribute's respective incidence in the general U.S. population. Further, the data verification system 106 can determine that user identifiers that fall above the selected user attribute verification score for a given attribute value are statistically significantly more likely than random chance to actually possess the desired attribute value.

In some implementations, the data verification system 106 performs both of the statistical hypothesis proportion tests above (e.g., starting with Equation 25) using every decile as the selected user attribute verification score threshold (e.g., truth score threshold), for every attribute and attribute value. For the data verification system 106 to determine that user attribute verification scores are valid, well-calibrated estimators for a given attribute, these statistical hypothesis proportion tests should pass for the overwhelming majority of attribute values and all choices of user attribute verification score threshold (e.g., accounting for type I error, these two tests must not fail to reject the null hypothesis in greater than 5% of cases).

In some implementations, the data verification system 106 calibrates the wisdom of the crowd algorithm until a $R^2$ of 0.80 or higher between is achieved for the truth score veracity and the average truth score, across all deciles, all user attributes, and all user attributes value (i.e., for all truth scores in the user attribute verification score database). In one or more implementations, the data verification system 106 calibrates the wisdom of the crowd algorithm until many, but not all binomial exact tests between a decile's truth score veracity and the average truth score in a decile pass. In one or more implementations, the data verification system 106 determines that the wisdom of the crowd algorithm is not calibrated while the $R^2$ between the truth score veracity and the average truth score in a decile is below 0.80 when measured across all deciles, all attributes, and all attributes value, or when most binomial exact tests (e.g., more than half between the truth score veracity and the average truth score in a decile are failing at the decile attribute value level). In the event of non-calibration, the data verification system 106 can refine the wisdom of the crowd algorithm and redetermine all truth scores.

As mentioned above, in various implementations, the data verification system 106 utilizes truth score veracity to improve the wisdom of the crowd algorithm. To illustrate, for each incremental change to the wisdom of the crowd algorithm, from small tweaks in the calculation of truth scores to major changes like the addition of a new data provider or validation dataset, the data verification system 106 can determine the impact of that change on truth score veracity. In this way, the data verification system 106 can utilize truth score veracity as a yardstick for evaluating each new batch of truth scores (e.g., user attribute verification score). Indeed, the iterative process of determining truth scores and then verifying the truth score based on truth score veracity initiates a feedback loop that allows the data verification system 106 to continuously refine the wisdom of the crowd algorithm.

Figure 7:
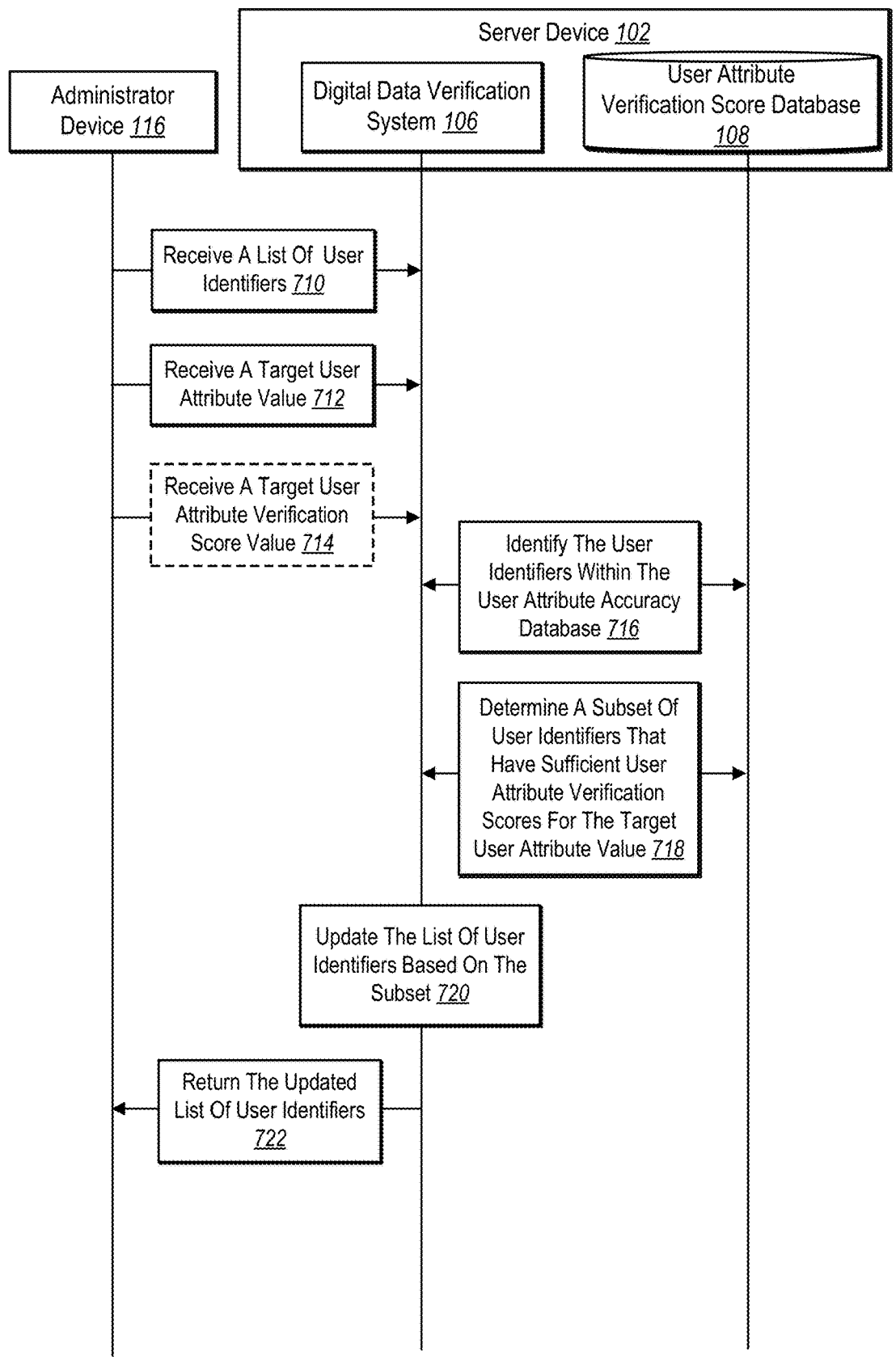
FIG. 7 illustrates a sequence flow diagram of generating a modified user segment utilizing user attribute verification scores in accordance with one or more implementations.

Turning to FIG. 7, additional detail is provided with respect to receiving, modifying, and returning user identifier lists or segments. In particular, FIG. 7 illustrates a sequence flow diagram of a series of acts for generating a modified user segment utilizing user attribute verification scores in accordance with one or more implementations. As shown, FIG. 7 includes the administrator device 11 and the server device 102 having the digital data verification system 106 as well as the user attribute verification score database 108.

As shown in FIG. 7, the series of acts includes an act 710 of the data verification system 106 receiving a list of user identifiers from the administrator device 116. For instance, in one or more implementations, the user interface list includes various user identifiers (HEMs) that have historically been used to identify a particular target audience in a digital content campaign. In some implementations, the list of user identifiers includes user identifiers from one or more data providers.

The series of acts includes an act 712 of the data verification system 106 receiving a target user attribute value from the administrator device 116. For example, in one or more implementations, the administrator device 116 specifies one or more target user attribute values that correspond to the user identifier list. For instance, the target user attribute value indicates a particular age, gender, ethnicity, and/or other user attribute value for which the administrator device 116 desires to validate against the user identifier list.

As shown, the series of acts includes an optional act 714 of the data verification system 106 receiving a target user attribute verification score value in connection with the target user attribute value. In some implementations, the administrator device 116 provides, or otherwise indicates, a user attribute verification score threshold (e.g., truth score threshold) for the target user attribute value. For example, the data verification system 106 receives a user attribute verification score threshold for a target user attribute value of Female indicating that the user attribute verification score (e.g., truth score) for user identifier must satisfy a truth score of at least 0.85 or 85%.

In addition, the series of acts includes an act 716 of the data verification system 106 identifying the user identifiers within the user attribute verification score database (e.g., truth score database). In various implementations, the data verification system 106 matches the user identifiers from the user identifier list to matching user identifiers in the truth score database. As described above, the data verification system 106 can utilize a lookup, query, or another method to access user identifiers in the truth score database that correspond to the user identifiers from the received user identifier list.

As shown, the series of acts includes an act 718 of the data verification system 106 determining a subset of user identifiers that have sufficient user attribute verification scores for the target user attribute value. For example, in a number of implementations, the data verification system 106 identifies the user identifiers from the truth score database that have truth scores for the target user attribute value that satisfy a default truth score value (e.g., 0.3, 0.5, 0.75) or the received user attribute verification score threshold (e.g., truth score threshold). In some implementations, each target user attribute value has a separate default truth score value, for example, based on aggregated statistical user data for the target user attribute value.

Further, as shown in FIG. 7, the series of acts includes an act 720 of the data verification system 106 updating the list of user identifiers based on the subset. For example, in various implementations, if a user identifier is determined to not satisfy the default truth score value or truth score threshold, the data verification system 106 removes the user identifier. Accordingly, in these implementations, the data verification system 106 generates a subset list of user identifiers that include user identifiers for which their user attribute assertions are true and accurate. In this way, the data verification system 106 greatly improves the accuracy of the user identifier list by removing user identifiers that falsely, or with a low likelihood of being accurate, assert to have a target user attribute value when such asserting is incorrect As shown, the series of acts includes an act 722 of the data verification system 106 returning the updated list of user identifiers to the administrator device 116. For instance, in one or more implementations, the data verification system 106 provides the updated list of user identifiers that includes the subset of user identifiers to the administrator device 116 to inform the administrator device 116 as to the accuracy of the user attribute assertions made with respect to the original list of user identifiers and the target user attribute value.

In one or more implementations, the administrator device 116 provides one or more user identifiers to the data verification system 106 with one or more target user attribute values as part of a verification request. In response, the data verification system 106 looks up the truth score (i.e., user attribute verification score) for one or more user identifiers with respect to the target user attribute value. In some implementations, the data verification system 106 provides the target user attribute value truth score to the administrator device 116 in response to the request. In some implementations, the data verification system 106 performs additional actions, such as adding one or more user identifiers to a segment of users as part of a digital content campaign.

In various implementations, the data verification system 106 provides an interactive graphical user interface to an administrator device 116 in connection with providing truth score for user attribute values of user identifiers. For example, the data verification system 106 facilitates the administrator device 116 to provide the list of user identifiers, select a target user attribute value, and/or provides a truth score threshold for the target user attribute value within a user interface that updates in response to detected input.

To illustrate, FIGS. 8A-8D show graphical user interfaces of displaying attribute verification scores for segments of user identifiers in accordance with one or more implementations. As shown, FIGS. 8A-8D each includes a computing device 800 (e.g., an administrator device or another client device) that includes an interactive graphical user interface 802 (or simply "interactive interface 802). In various implementations, the data verification system 106 provides the interactive interface 802 to the computing device 800, either from a remote computing device (e.g., server device 102) and/or from the computing device 800 itself.

Figure 8A:
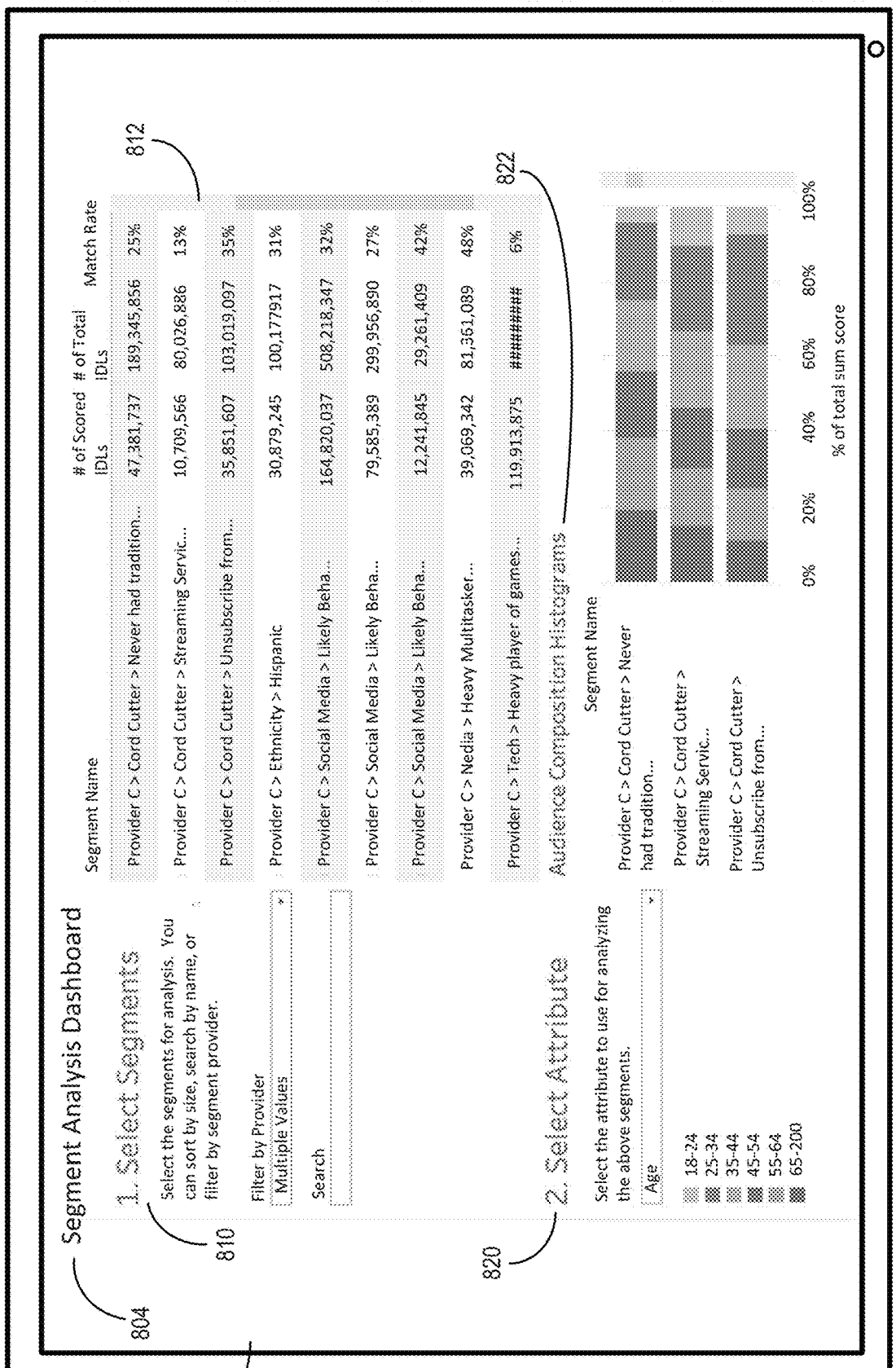
FIGS. 8A-8D illustrate graphical user interfaces displaying attribute verification scores for segments of user identifiers in accordance with one or more implementations.

As shown in FIG. 8A, the interactive interface 802 displays a segment analysis dashboard 804. In various implementations, the segment analysis dashboard 804 provides user attribute verification score (e.g., truth score) information to user identifiers belonging to one or more user identifier segments. As illustrated, the segment analysis dashboard 804 includes text and graphics along with selectable elements for providing and/or displaying accurate information regarding the one or more user identifier segments.

In some implementations, the segment analysis dashboard 804 within the interactive interface 802 includes a user identifier count summary. For instance, in one or more implementations, the user identifier count summary shows the number of total user identifiers, the number of user identifiers currently being displayed, and/or the number of unique segments of user identifiers. In various implementations, the segment analysis dashboard 804 includes additional and/or different user identifier information, such as the number of selected user identifiers located within a validation dataset or the number of users stored in the truth score database and/or maintained by the data verification system 106.

As FIG. 8A illustrates, the segment analysis dashboard 804 includes a select segment portion 810. As shown, the select segment portion 810 facilitates the selection of one or more user identifier segments. For example, the select segment portion 810 enables the selection of one or more data providers (e.g., via a drop-down menu or another selection method). In some implementations, the data verification system 106 provides various search and filtering tools within the select segment portion 810 for selecting segments and/or data providers.

As also shown, the select segment portion 810 includes a selected segment table 812 that shows information for selected segments of user identifiers. As illustrated, the selected segment table 812 displays segment names of selected segments, the number of scored user identifiers in a selected segment, the total number of user identifiers in a selected segment, and a match rate (e.g., the ratio of scored to total user identifiers). The selected segment table 812 may display additional and/or different segment information. Additionally, in various implementations, the data verification system 106 dynamically updates the selected segment table 812 in real-time in response to different segments, data providers, and/or user attribute values being added or removed from the selection.

As FIG. 8A illustrates, the segment analysis dashboard 804 includes a select attribute portion 820. As illustrated, the select attribute portion 820 facilitates the selection of user attributes. For example, in a number of implementations, the data verification system 106 provides a list of user attributes for selection by a user of the computing device 800. In response to detecting the selection of a target user attribute, the select attribute portion 820 updates to show user attribute values associated with the target user attribute. As shown, the select attribute portion 820 displays the age user attribute and age ranges representing user attribute values corresponding to the age user attribute.

In various implementations, upon selection of a target user attribute and/or user attribute value, the select attribute portion 820 updates to display a user attribute graph. To illustrate, the select attribute portion 820 includes audience composition histograms 822, which provides histograms on a per-data provider basis (e.g., each line is a data provider and/or unique segment) with respect to the target user attribute. If a change in the target user attribute is detected, the data verification system 106 can update the interactive interface 802 to show updated segment and/or target user attribute information.

In some implementations, in response to detecting user input selecting an element of reported user data (e.g., a chart, graph, or text), the data verification system 106 provides additional information for display within the interactive interface 802. For example, if a specific user attribute value is selected, the data verification system 106 provides additional information regarding the selected user attribute.

Figure 8B:
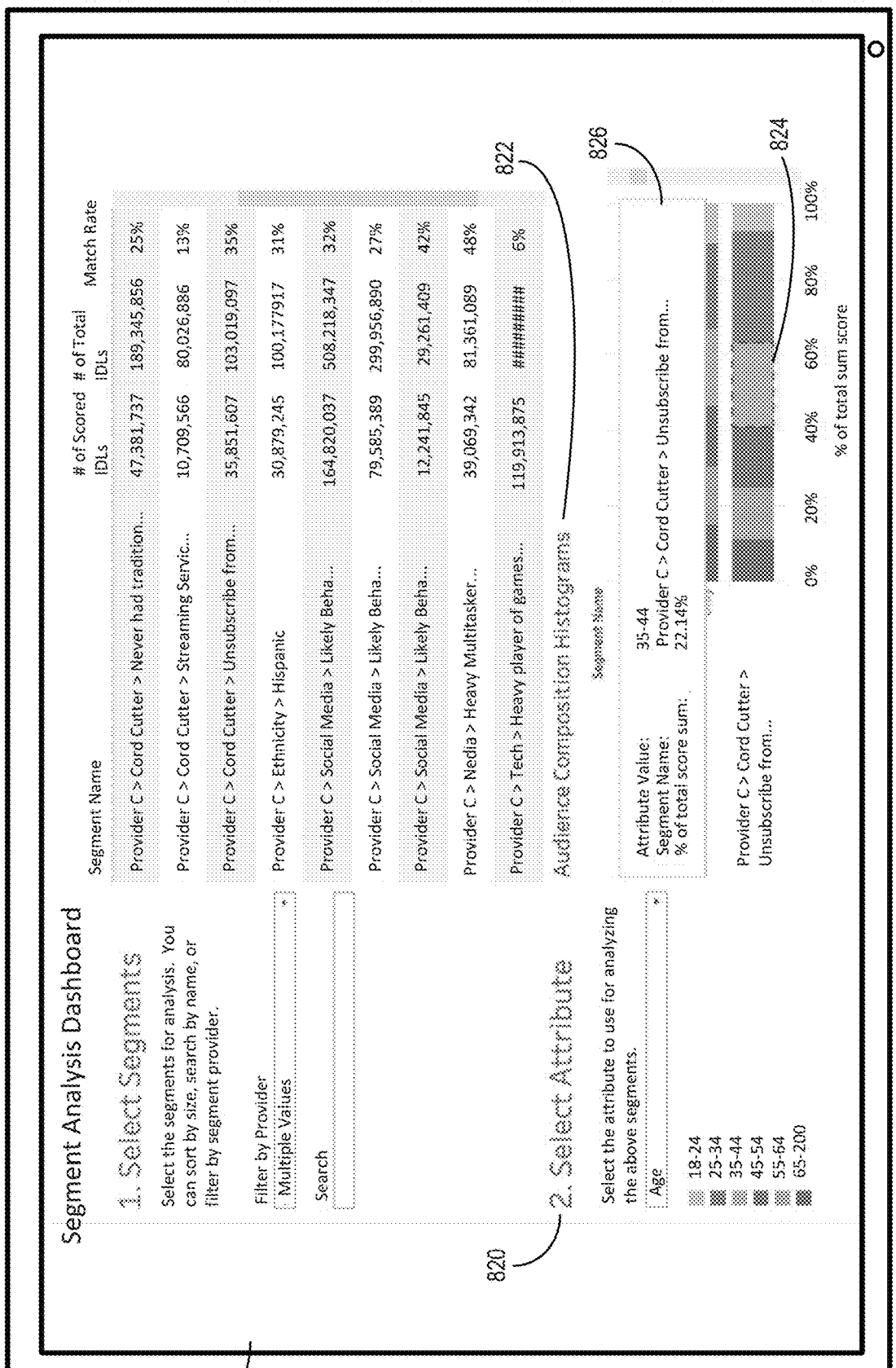

To illustrate, FIG. 8B shows a popup graphical window 826 that the data verification system 106 displays in response to detecting a selection 824 (e.g., denoted by the dashed box) of a particular user attribute value (e.g., an age of 35-44) for a specific data provider (e.g., Provider C) and a particular segment (e.g., unsubscribe from traditional tv services). As shown, the popup graphical window 826 summarizes the selected user attribute value by providing information about the selected target user attribute value. For example, the popup graphical window 826 indicates that the selected user attribute value of user identifiers age 35-44 makes up 22% of the total user identifiers from the segment of user identifiers within Data Provider C that have unsubscribed from traditional tv services. Upon detecting a selection of another user attribute value in the same segment, the validation dataset can indicate the number or percentage of user identifiers that belong to the newly selected user attribute value.

While the select attribute portion 820 shows the audience composition histograms 822, the select attribute portion 820 can include additional and/or different visuals that convey information about the selected user attribute. For example, the select attribute portion 820 includes different charts or graphs displaying the user attribute value composition of user attribute values of the target user attribute.

Figure 8C:
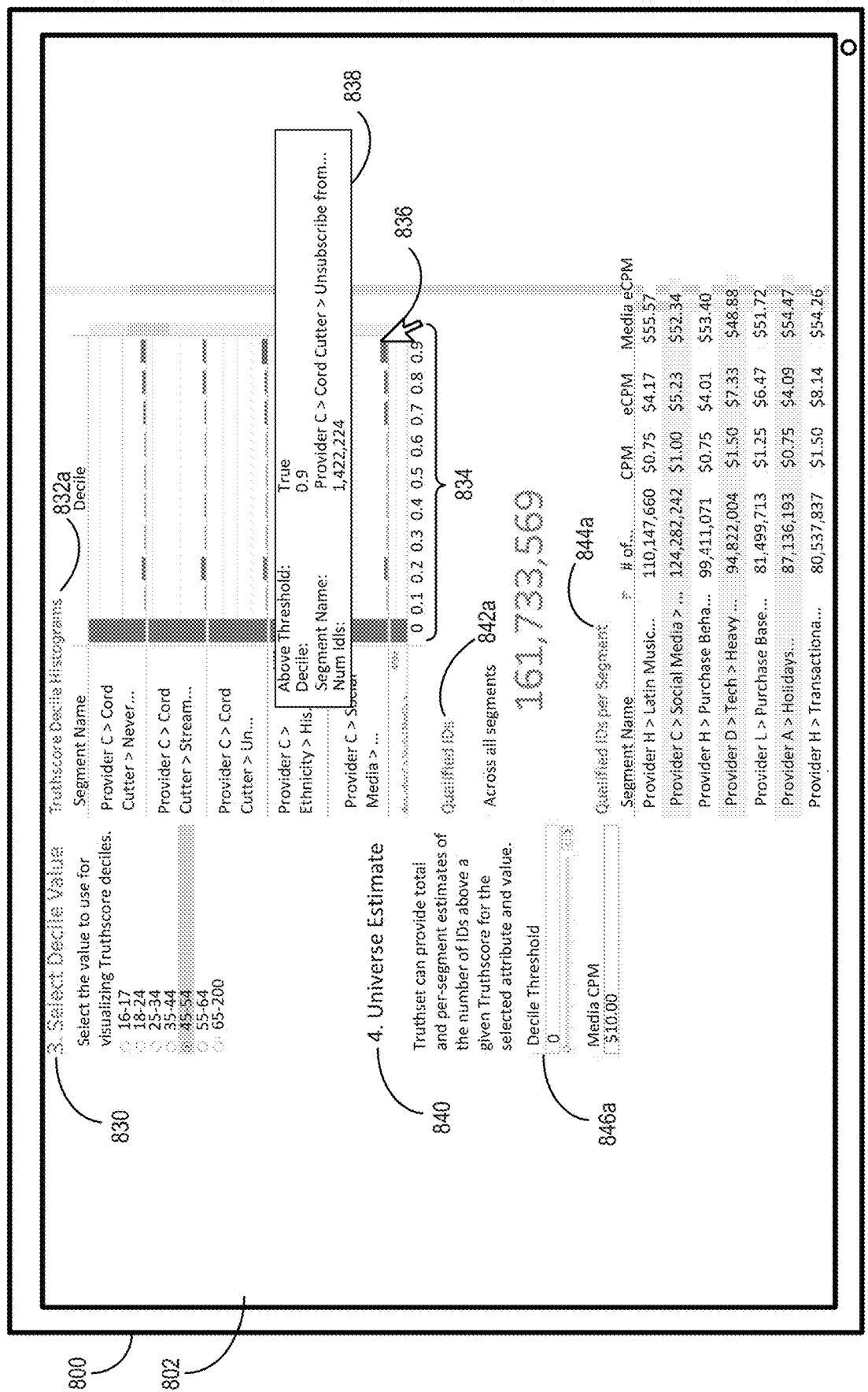

As FIG. 8C illustrates, the segment analysis dashboard 804 includes a select decile value portion 830 within the interactive interface 802. In various implementations, the select decile value portion 830 facilitates the display of visualizing selected truth score deciles 834 for target user attribute values. For instance, in various implementations, the select decile value portion 830 allows for the selection of one or more target user attribute values (e.g., 45-54 as shown in FIG. 8C) belonging to the target user attribute selected in the select attribute portion 820. As mentioned above, a truth score decile 834 corresponds to truth scores for a user attribute value portioned into ten portions.

As shown, the select decile value portion 830 also includes truth score decile histograms 832a. In various implementations, the truth score decile histograms 832a display the number of user identifiers per provider, per segment that have truth scores for the target user attribute value that falls within a given truth score decile 834. As shown, the truth score decile 834 of 0.0-0.1 includes a large number of user identifiers for each segment shown in the truth score decile histograms 832a. In some instances, this indicates that the data verification system 106 has determined that the probability of a user identifier in this truth score decile 834 has less than a 10% of being 45-54 (e.g., the target user attribute value).

In addition, the interactive interface 802 shows the data verification system 106 detecting the selection 836 of the 0.9-1.0 truth score decile for a particular segment. In response, the data verification system 106 updates the interactive interface 802 to display a popup graphical window 838 that includes a precise number of user identifiers that fall into the selected truth score decile. In some implementations, the data verification system 106 facilitates selecting multiple truth score deciles at a time.

In various implementations, the data verification system 106 facilitates filtering in and filtering out one or more selected graphical elements. For example, the data verification system 106 enables the selection of multiple truth score deciles to group together into a new combined segment of user identifier that accurately adheres to target user attribute assertions. The data verification system 106 can then export the new combined segment and/or perform additional actions, such as utilizes them in a digital content campaign.

As FIG. 8C illustrates, the segment analysis dashboard 804 includes a universe estimate portion 840. In various implementations, the universe estimate portion 840 can display total and per-segment estimates of the number of user identifiers (e.g., HEMs) above a given truth score threshold for the selected user attribute and user attribute value.

To illustrate, the universe estimate portion 840 includes the total number of qualified user identifiers 842a across all selected segments. The universe estimate portion 840 also includes the qualified user identifiers per segment 844a that includes the number of qualified user identifiers 842a per segment. The qualified user identifiers per segment 844a also includes additional metric associated with qualified user identifiers, such as CPM (cost per mile/thousand clicks or impressions), eCPM (effect CPM), and Media eCPM. In various implementations, the qualified user identifiers per segment 844a can include additional and/or other information.

As shown, the universe estimate portion 840 includes a decile threshold 846a for selecting a truth score threshold 846a (i.e., user attribute verification score threshold). In various implementations, the data verification system 106 detects modification to the truth score threshold for the selected user attribute and user attribute value via the truth score threshold 846a. To illustrate, in FIG. 8C, the truth score threshold 846a is set to 0 and the data displayed within the audience composition histograms 822, the truth score decile histograms 832a, the total number of qualified user identifiers 842a, and the qualified user identifiers per segment 844a includes user identifiers that satisfy this truth score threshold (e.g., qualified user identifiers).

Figure 8D:
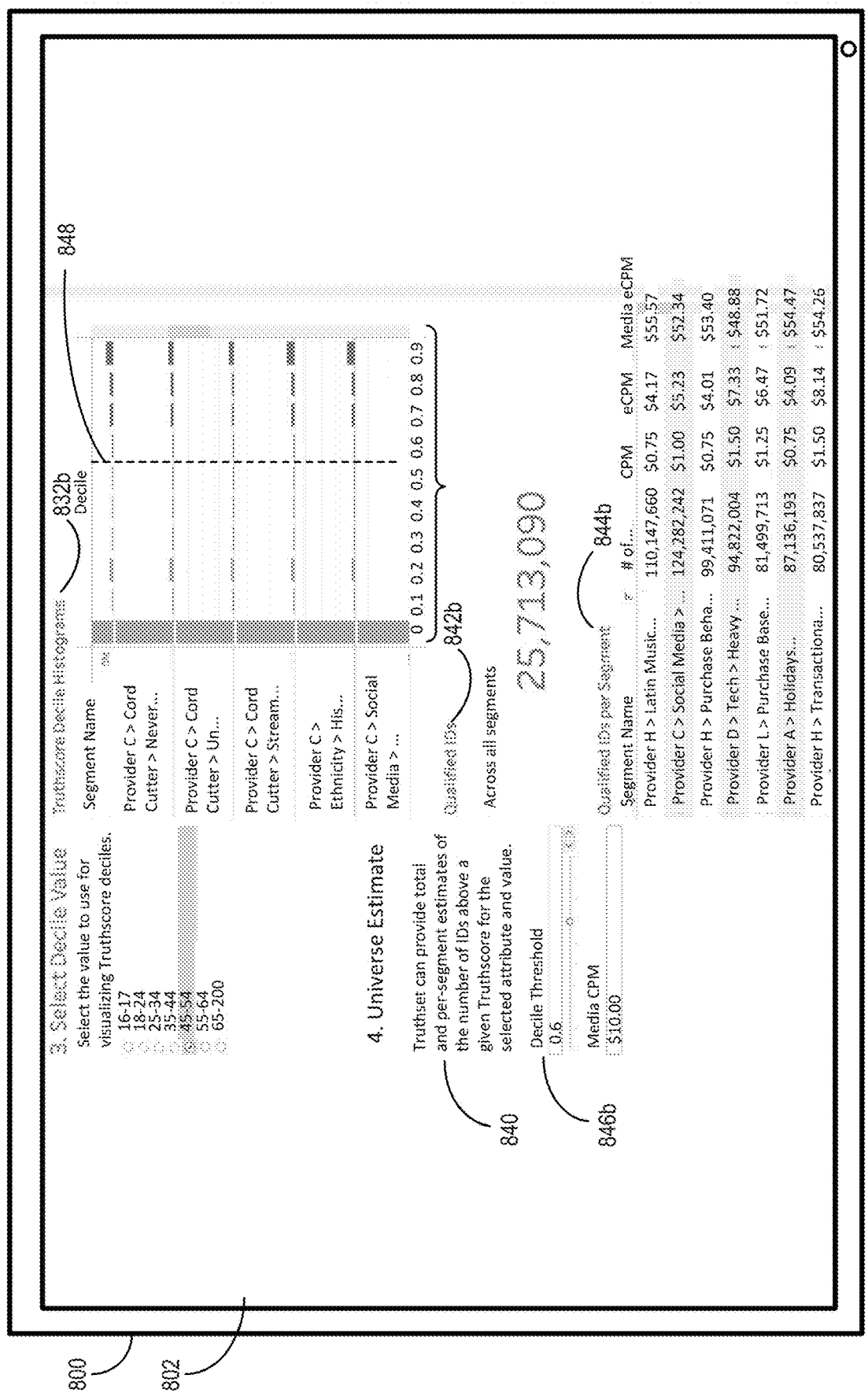

Upon detecting a change to the truth score threshold 846a, the data verification system 106 updates each of the portions mentioned above, elements, and/or values to be based on the updated number of qualified user identifiers. To illustrate, FIG. 8D shows the data verification system 106 detecting a change to the truth score threshold. In particular, the data verification system 106 detects an updated truth score threshold 846b (e.g., an updated user attribute verification score threshold) of 0.6 for the target user attribute and user attribute value. Accordingly, the data verification system 106 updates the segment analysis dashboard 804 within the interactive interface 802, where applicable, to display user identifiers that have a likelihood of 60% or greater of having an age of 45-54 with a given segment.

To further illustrate, FIG. 8D shows an updated truth score decile histograms 832b, a total number of updated qualified user identifiers 842b, as well updated qualified user identifiers per segment 844b. As shown, the updated truth score decile histograms 832b emphasizes each decile 834 having a truth score of 0.6 or greater (e.g., the deciles below 0.6 are de-emphasized). In some implementations, and as shown, the data verification system 106 adds a truth score threshold line 848 to shows where the updated truth score threshold 846b is with respect to the truth score deciles.

In addition, the total number of updated qualified user identifiers 842b is updated in FIG. 8D to show the reduced number of total qualified user identifiers based on increasing the updated truth score threshold 846b. Indeed, as the data verification system 106 detects changes to selected user attributes, user attribute values, and/or truth score thresholds for user attribute selection, the data verification system 106 can dynamically determine which user identifiers in the truth score database (e.g., user attribute verification score database) are qualified user identifiers. The data verification system 106 can then provide the qualified user identifiers to the computing device 800 as an updated list of user identifiers (and/or perform other functions on the subset of user identifiers) as previously described.

Figure 9A:
FIGS. 9A-9C illustrate graphical user interfaces displaying measured results of an example digital content campaign in accordance with one or more implementations.
Figure 9B:
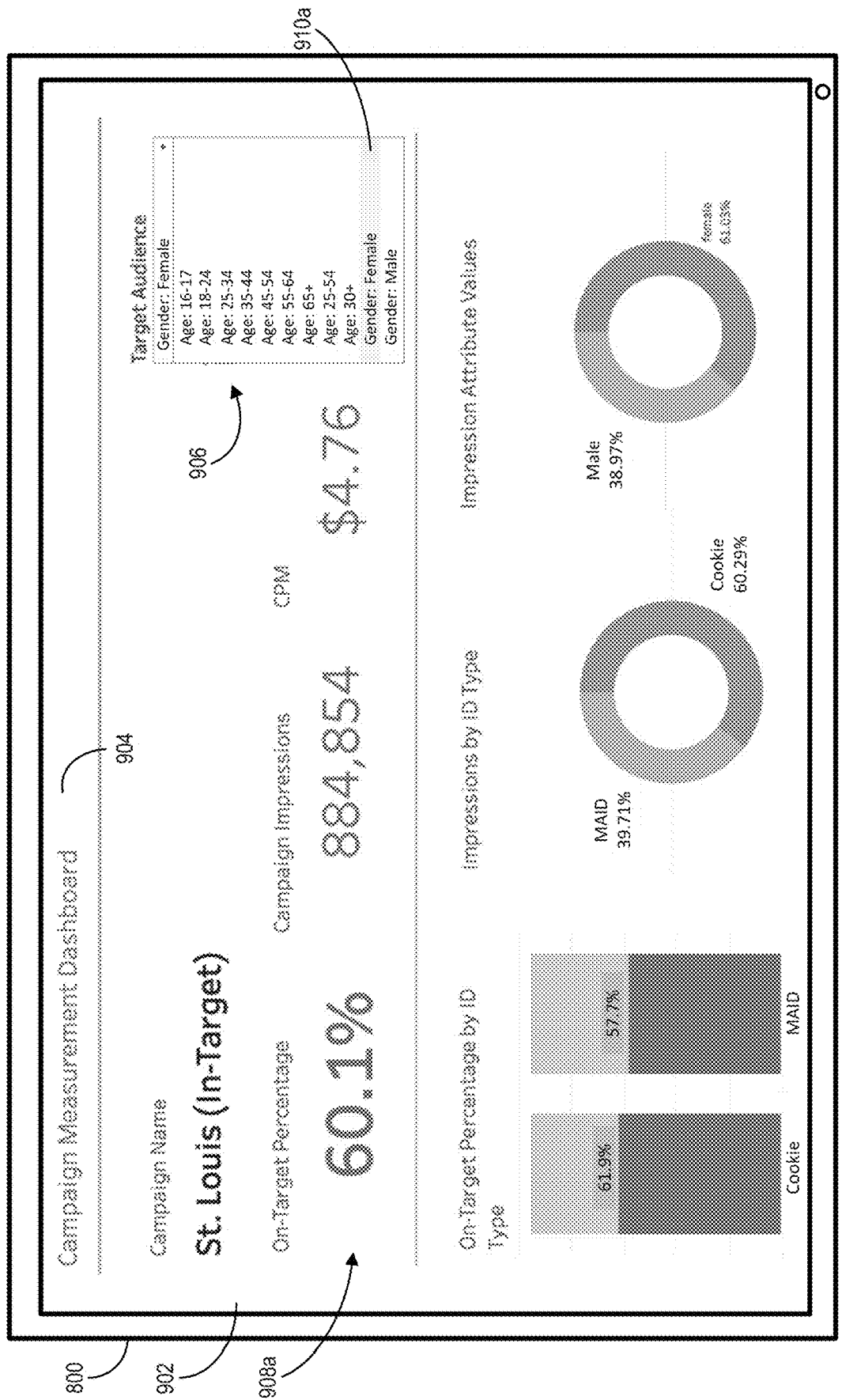
Figure 9C:
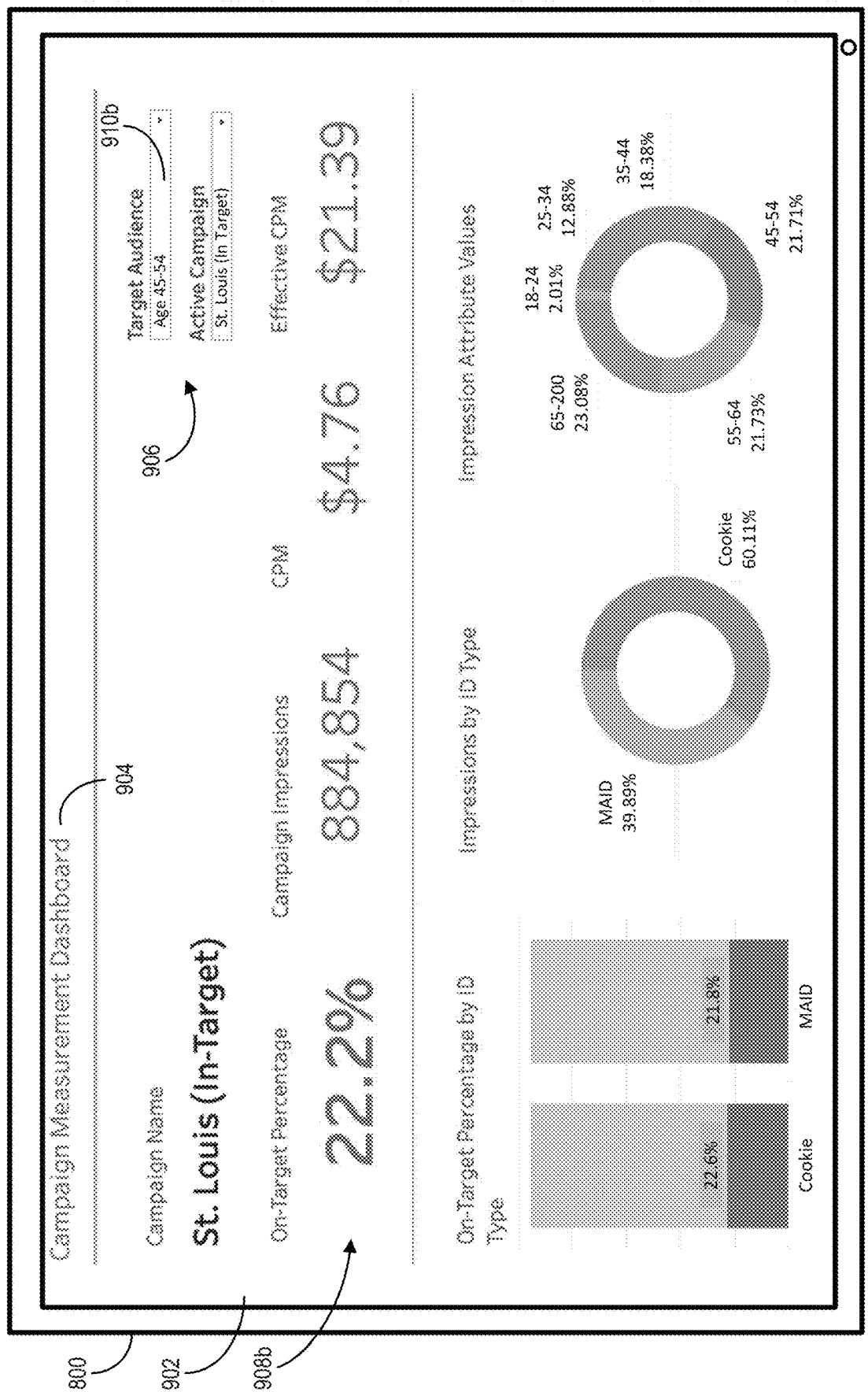

Turning to the next set of figures, FIGS. 9A-9C illustrate graphical user interfaces of displaying measured results of an example digital content campaign in accordance with one or more implementations. As shown, FIGS. 9A-9C include the computing device 800 introduced above. Further, FIGS. 9A-9C illustrate an interactive graphical user interface 902 that displays a campaign measurement dashboard 904.

As shown in FIG. 9A, the campaign measurement dashboard 904 includes a digital content campaign metrics 908a and a user attribute value selection tool 906 that detects selection of a target user attribute and user attribute value 910a for which the data verification system 106 measures a digital content campaign. For example, FIG. 9B provides example selection options of the user attribute value selection tool 906 for which the data verification system 106 can evaluate a digital content campaign.

As shown in FIGS. 9A and 9B, the digital content campaign metrics 908a include text, graphics, and/or other elements for measuring the digital content campaign based on truth scores (i.e., user attribute verification scores) of the selected (e.g., target) user attribute and user attribute value. For example, as shown, the data verification system 106 monitors on-target percentage (OTP) metrics against target user attributes and provides real-time results within the digital content campaign metrics 908a of the campaign measurement dashboard 904. In various implementations, the data verification system 106 updates the OTP and other displayed metrics corresponding to a digital content campaign daily, or at other intervals (e.g., hourly, weekly, monthly).

Further, as shown, data verification system 106 utilizes truth scores to determine the accuracy of a digital content campaign. For example, as shown in the digital content campaign metrics 908a, the data verification system 106 indicates that for the gender user attribute value of Female, digital content was inaccurately directed to nearly 40% of user identifiers.

Upon the data verification system 106 detecting a change to a different target user attribute value 910b via the user attribute value selection tool 906, the data verification system 106 can update the digital content campaign metrics 908a. To illustrate, FIG. 9C shows the data verification system 106 detecting the user attribute value selection tool 906 updating to indicate a new target user attribute value of 45-54 years old. In response, the data verification system 106 displays updated digital content campaign metrics 908b to show the OTP and other real-time results of the digital content campaign with respect to the truth score of the new target user attribute value.

Figure 10:
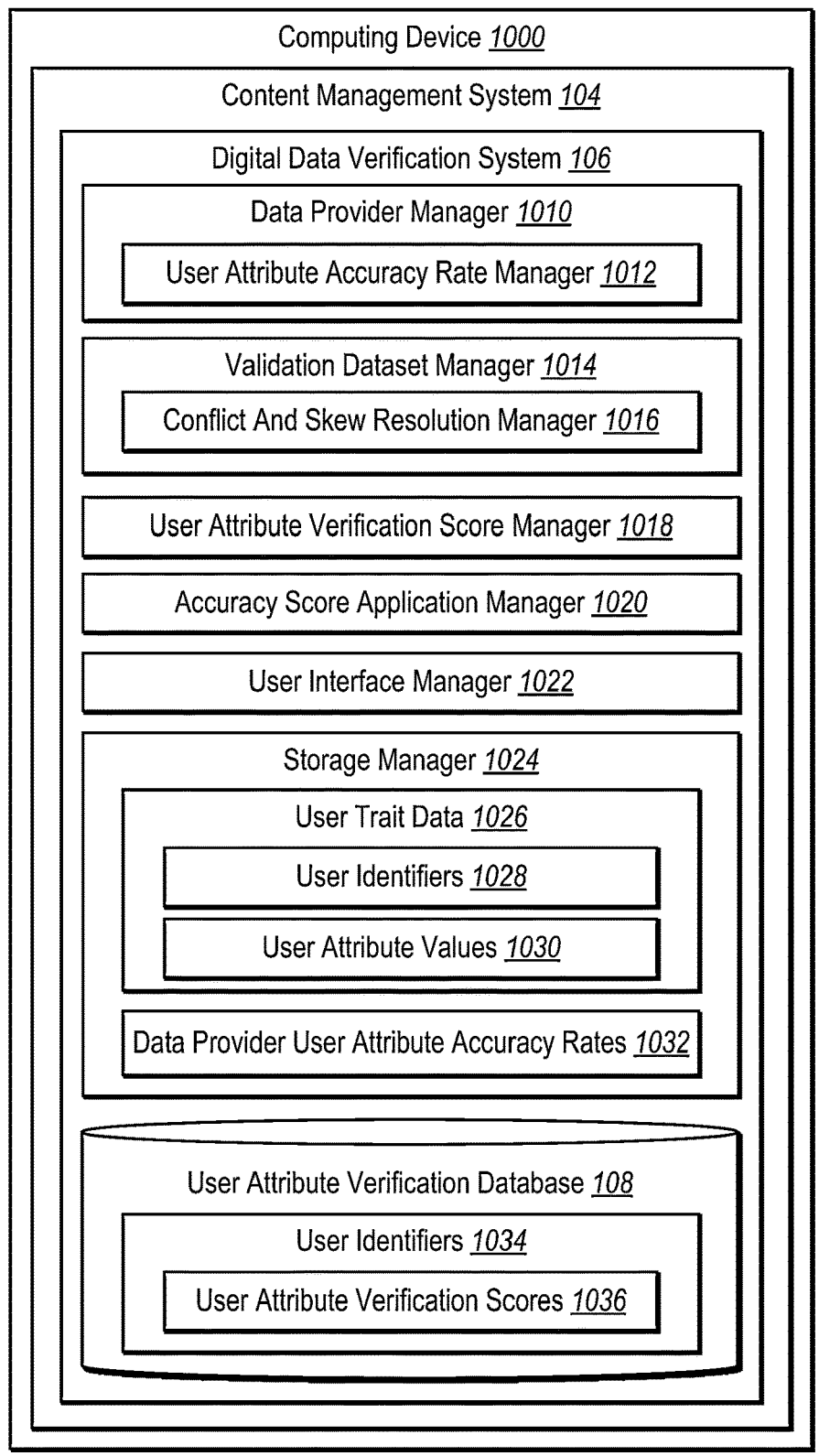
FIG. 10 illustrates a schematic diagram of the data verification system in accordance with one or more implementations.

Referring now to FIG. 10, additional detail is provided regarding the capabilities and components of a data verification system 106 in accordance with one or more implementations. In particular, FIG. 10 shows a schematic diagram of an example architecture of the data verification system 106 implemented within a content management system 104 and hosted on a computing device 1000.

In addition, the computing device 1000 may represent various types of computing devices (e.g., the server device 102, the administrator device 116, the client devices 120, and/or the computing device 800). For example, in one or more implementations, the computing device 1000 is a non-mobile computing device, such as a server, a cluster of servers, a desktop, or another type of non-mobile computing device. In some implementations, the computing device 1000 is a mobile computing device, such as a laptop, a tablet, a mobile telephone, a smartphone, a wearable device, or a device connected to the Internet. Additional details with regard to the computing device 1000 are discussed below with respect to FIG. 12.

As shown, the computing device 1000 includes the content management system 104, which is described above, and the data verification system 106. The data verification system 106 includes various components for performing the processes and features described herein. To illustrate, the data verification system 106 includes a data provider manager 1010 having a user attribute accuracy rate manager 1012, a validation dataset manager 1014 having a conflict and skew resolution manager 1016, a user attribute verification score manager 1018, an accuracy score application manager 1020, a user interface manager 1022, a storage manager 1024, and a user attribute verification score database 108. As shown, the storage manager 1024 includes user trait data 1026 having user identifiers 1028 and user attribute values 1030. The storage manager 1024 also includes data provider user attribute accuracy rates 1032. In addition, the user attribute verification score database 108 (e.g., truth score database) includes user identifiers 1034 and corresponding user attribute verification scores 1036.

As mentioned above, the data verification system 106 includes the data provider manager 1010 having a user attribute accuracy rate manager 1012. In general, the data provider manager 1010 facilitates identifying, accessing, receiving, obtaining, generating, importing, exporting, copying, modifying, removing, providing, and organizing user trait data 1026 from one or more data providers. In some implementations, the data provider manager 1010 communicates with the storage manager 1018 to store and retrieve the user trait data 1026, which often includes user identifiers 1028 and corresponding user attribute values 1030.

In some implementations, the user attribute accuracy rate manager 1012 determines data provider user attribute accuracy rates 1032. For example, in various implementations, for a given user attribute and/or user attribute value, the user attribute accuracy rate manager 1012 determines a user attribute accuracy rate. As described above, the data verification system 106 can determine a user attribute accuracy rate based on comparing user trait data 1026 from a data provider to user trait data from a validation dataset.

As mentioned above, the data verification system 106 includes the validation dataset manager 1014 having a conflict and skew resolution manager 1016. In general, the validation dataset manager 1014 facilitates identifying, accessing, receiving, obtaining, generating, importing, exporting, copying, modifying, removing, providing, and organizing user trait data 1026 from one or more validation datasets. In some implementations, the validation dataset manager 1014 generates a combined validation dataset as described above. In various implementations, the validation dataset manager 1014 ensures that the validation dataset maintains highly accurate user trait data 1026 based on best data hygiene practices, as described above.

In various implementations, the conflict and skew resolution manager 1016 correct issues detected in a validation dataset. For example, the conflict and skew resolution manager 1016 determines and resolves user identifier and/or user attribute value conflicts within a validation dataset, as described above. In one or more implementations, the conflict and skew resolution manager 1016 detects underlying data skew in a validation dataset and, in response, determines a user attribute correction factor, as provided above.

As shown, the data verification system 106 includes the user attribute verification score manager 1018. In various implementations, the user attribute verification score manager 1018 determines user attribute verification scores 1036 for user identifiers 1034 based on the data provider user attribute accuracy rates 1032, which is described above. In many implementations, the user attribute verification score manager 1018 utilizes a wisdom of the crowds approach to generate user attribute verification scores 1036 for user identifiers 1034 for a given user attribute value, as provided previously. In various implementations, the user attribute verification score manager 1018 stores the user attribute verification scores 1036 in the user attribute verification score database 108 (e.g., truth score database).

As shown, the data verification system 106 includes the accuracy score application manager 1020. In various implementations, the accuracy score application manager 1020 utilizes the user attribute verification scores 1036 in the user attribute verification score database 108 to improve the accuracy of user identifier segments, as described above. For example, in one or more implementations, the accuracy score application manager 1020 compares a list of user identifiers to the user attribute verification scores 1036 with respect to a target user attribute and/or user attribute value to generate an updated list of user identifier that satisfies an accuracy requirement (e.g., a truth score threshold) for the target user attribute.

As shown, the data verification system 106 includes the user interface manager 1022. In various implementations, the user interface manager 1022 can generate, create, update, change, replace, delete, remove, refresh, render, reveal, display, present, and/or provide interactive graphical user interfaces associated with the data verification system 106 to computing devices (e.g., an administrator device and/or client devices). In various implementations, the user interface manager 1022 facilitates displaying visual elements as well as detecting input with respect to the visual content and elements.

Each of the components 1010-1036 of the data verification system 106 may include software, hardware, or both. For example, the components 1010-1036 may include one or more instructions stored on a computer-readable storage medium and executable by processors of one or more computing devices, such as a client device (e.g., a mobile client device) or server device. When executed by the processors, the computer-executable instructions of the data verification system 106 may cause a computing device to perform the feature learning methods described herein. Alternatively, the components 1010-1036 may include hardware, such as a special-purpose processing device to perform a certain function or group of functions. In addition, the components 1010-1036 of the data verification system 106 may include a combination of computer-executable instructions and hardware.

Furthermore, the components 1010-1036 of the data verification system 106 may be implemented as one or more operating systems, as one or more stand-alone applications, as one or more modules of an application, as one or more plug-ins, as one or more library functions or functions that may be called by other applications, and/or as a cloud-computing model. Thus, the components 1010-1036 may be implemented as a stand-alone application, such as a desktop or mobile application. Additionally, the components 1010-1036 may be implemented as one or more web-based applications hosted on a remote server. The components 1010-1036 may also be implemented in a suite of mobile device applications or "apps."

FIGS. 1-10, the corresponding text, and the examples provide several different methods, systems, devices, and non-transitory computer-readable media of the data verification system 106. In addition to the foregoing, one or more implementations may also be described in terms of flowcharts comprising acts for accomplishing a particular result, such as the flowcharts of acts shown in FIG. 11. Additionally, the acts described herein may be repeated or performed in parallel with one another or parallel with different instances of the same or similar acts.

Figure 11:
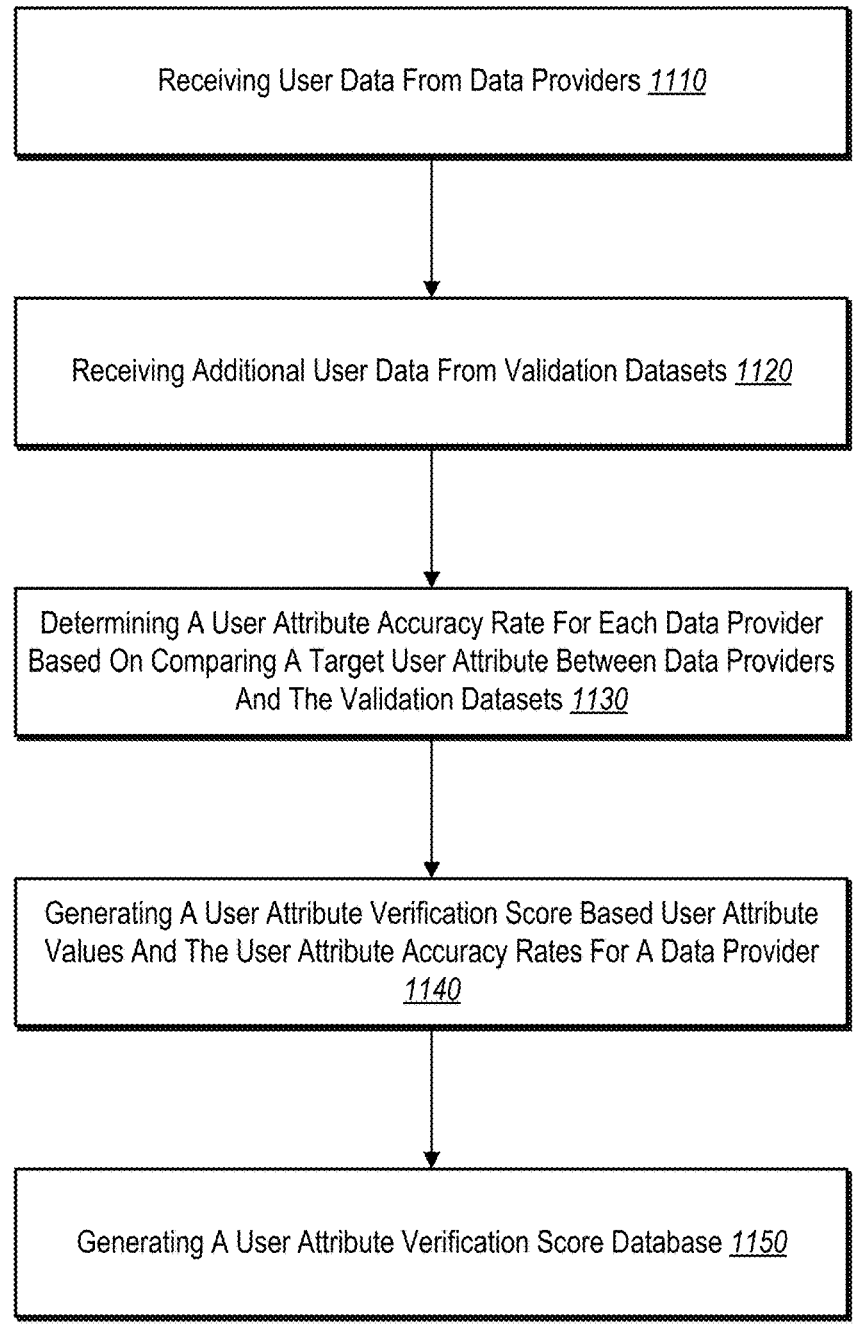
FIG. 11 illustrates a flowchart of a series of acts for generating user attribute verification scores for user attributes in accordance with one or more implementations.

While FIG. 11 illustrates acts according to one or more implementations, alternative implementations may omit, add to, reorder, and/or modify any of the acts shown in FIG. 11. The acts of FIG. 11 may be performed as part of methods. Alternatively, non-transitory computer-readable mediums may comprise instructions that, when executed by one or more processors, cause a computing device to perform the acts of FIG. 11. In some implementations, one or more systems may perform the acts of FIG. 11.

In one or more implementations, the series of acts are implemented on one or more computing devices, such as the server device 102, the administrator device 116, the client devices 120, and/or the computing devices 800, 1000. For example, the series of acts are implemented on a computing device or computing system having one or more memory devices.

As mentioned previously, FIG. 11 illustrates a flowchart of a series of acts 1100 for generating user attribute verification scores for user attributes in accordance with one or more implementations. The series of acts 1100 includes an act 1110 of receiving user data from data providers. In particular, the act 1110 may involve receiving user trait data from a plurality of data providers, the user trait data including user identifiers and corresponding user attributes. In some implementations, the user trait data from the plurality of data providers includes scaled data entries.

As shown, the series of acts 1100 also includes an act 1120 of receiving additional user data from validation datasets. In particular, the act 1120 may involve receiving additional user trait data from one or more validation datasets. In various implementations, the act 1120 includes aggregating the one or more validation datasets into a combined validation dataset and resolving conflicts in the combined validation dataset between duplicative user identifiers that have different user attribute values for the target user attribute. In example implementations, the act 1120 includes validating the target user attribute verification score for the target user attribute within the user attribute verification score database by comparing the target user attribute verification score for the target user attribute to a random holdout of user identifies within the one or more validation datasets.

In some implementations, the act 1120 also includes analyzing the one or more validation datasets to determine a data skew; generating a validation correction factor based on the data skew; and determining the user attribute accuracy rate for a given data provider further based on applying the validation correction factor to the given data provider. In one or more implementations, the user trait data from one or more validation datasets includes declared data entries. In various implementations, a first number of user trait data from the plurality of data providers exceeds a second number of user trait data from the one or more validation datasets.

As shown, the series of acts 1100 also includes an act 1130 of determining a user attribute accuracy rate for each data provider based on comparing a target user attribute between data providers and the validation datasets. In particular, the act 1130 may involve determining, for each data provider of the plurality of data providers, a user attribute accuracy rate based on comparing a target user attribute for a plurality of user identifiers in the user trait data for each data provider and the target user attribute for the plurality of user identifiers in the one or more validation datasets.

In some implementations, the act 1130 includes determining, between the given data provider and the one or more validation datasets, matching user identities that include user attribute values for the target user attribute; comparing, for each matching user identifier, the user attribute values of the target user attribute in the given data provider to the user attribute values of the target user attribute in the one or more validation datasets; and generating the attribute accuracy rate for the target user attribute for the given data provider by averaging the compared user attribute values. In various implementations, the act 1130 also includes detecting a plurality of user attribute values for the target user attribute; generating a confusion matrix comparing target user attribute values between a given data provided and the one or more validation datasets; and determining, for the given data provider, the user attribute accuracy rate based on the confusion matrix.

As shown, the series of acts 1100 also includes an act 1140 of generating a user attribute verification score based user attribute values and the user attribute accuracy rates for a data provider. In particular, the act 1140 may involve generating, for each user identifier having the target user attribute from the plurality of data providers, a target user attribute verification score based on values of the target user attribute within the user trait data from the plurality of data providers and an average of the user attribute accuracy rates for the plurality of data providers for the target user attribute. In various implementations, the act 1140 includes generating the target user attribute verification score for each user identifier having the target user attribute by applying a weighted wisdom of crowds algorithm based on the user attribute values of the target user attribute within the user trait data from the plurality of data providers.

As shown, the series of acts 1100 also includes an act 1150 of generating a user attribute verification score database. In particular, the act 1150 may involve generating a user attribute verification score database that includes the target user attribute verification score for the target user attribute. In example implementations, the act 1150 includes receiving, from a client device, a segment of user identifiers and a target attribute value for the target user attribute; determining, from the user attribute verification score database, a subset of user identifiers from the segment of user identifiers that have the user attribute value for the target user attribute; and providing the subset of user identifiers to the client device.

In addition, in some implementations, the act 1150 also includes utilizing a user attribute verification score threshold to determine the subset of user identifiers by identifying user attribute verification score data entries within the user attribute verification score database based on the segment of user identifiers; and for each of the identified user attribute verification score data entries within the user attribute verification score database, determining the subset of user identifiers by adding a user identifier to the subset of user identifiers when a user attribute value of the target user attribute associated with the identified user attribute verification score data entry within the user attribute verification score database satisfies the user attribute verification score threshold.

In one or more implementations, the act 1150 also includes providing, for display at the client device, an interactive user interface that includes the subset of user identifiers shown within the segment of user identifiers; receiving an update to the user attribute verification score threshold; determining an updated subset of user identifiers that satisfies the updated user attribute verification score threshold; and providing, for display at the client device, the updated subset of user identifiers within the interactive user interface.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 12:
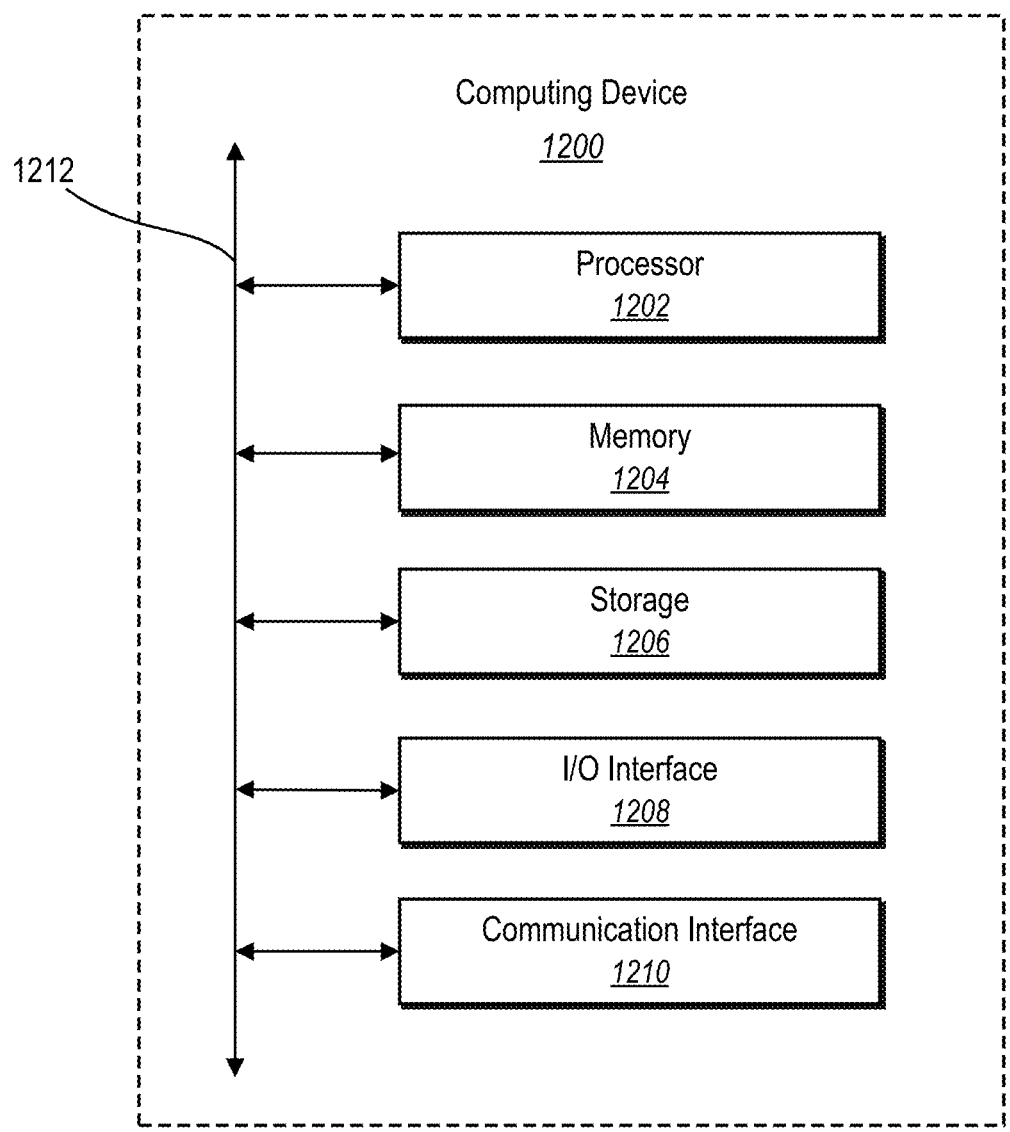
FIG. 12 illustrates a block diagram of an example computing device for implementing one or more implementations of the present disclosure.

FIG. 12 illustrates a block diagram of an example computing device 1200 that may be configured to perform one or more of the processes described above. One will appreciate that one or more computing devices, such as server device 102, the administrator device 116, the client devices 120, or the computing devices 800, 1000. In one or more implementations, the computing device 1200 may be a non-mobile device (e.g., a desktop computer, a server device, a web server, a file server, a social networking system, a program server, an application store, or a content provider). Further, the computing device 1200 may be a server device that includes cloud-based processing and storage capabilities. In some implementations, the computing device 1200 may be a mobile device (e.g., a laptop, a tablet, a smartphone, a mobile telephone, a camera, a tracker, a watch, a wearable device, etc.).

As shown in FIG. 12, the computing device 1200 may include one or more processor(s) 1202, memory 1204, a storage device 1206, input/output ("I/O") interfaces 1208, and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other implementations. Furthermore, in certain implementations, the computing device 1200 includes fewer components than those shown in FIG. 12. Components of the computing device 1200 shown in FIG. 12 will now be described in additional detail.

In particular implementations, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 may include a non-transitory storage medium described above. The storage device 1206 may include a hard disk drive (HDD), flash memory, a Universal Serial Bus (USB) drive, or a combination of these or other storage devices.

As shown, the computing device 1200 includes one or more I/O interfaces 1208, which are provided to allow a user to provide input to (e.g., user strokes), receive output from, and otherwise transfer data to and from the computing device 1200. These I/O interfaces 1208 may include a mouse, keypad or a keyboard, a touch screen, camera, optical scanner, network interface, modem, other known I/O devices, or a combination of these I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 1208 are configured to provide graphical data to a display for presentation to a user. The graphical data may be representative of one or more graphical user interfaces and/or any other graphical content as may serve a particular implementation.

The computing device 1200 may further include a communication interface 1210. The communication interface 1210 may include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 may further include a bus 1212. The bus 1212 may include hardware, software, or both that connects components of computing device 1200 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
   receiving user trait data from a plurality of data providers, wherein the plurality of data providers explicitly or implicitly collect the user trait data comprising user identifiers and corresponding user attributes;
   receiving additional user trait data from one or more validation datasets;
   determining a target user attribute associated with the user identifiers in the user trait data for the plurality of data providers;
   determining, by a processor, for each data provider of the plurality of data providers, a user attribute accuracy rate associated with each data provider based on comparing ft the target user attribute for a plurality of user identifiers in the user trait data for each data provider and the target user attribute for the plurality of user identifiers in the one or more validation datasets to determine a frequency of matches for the target user attribute between each data provider and the one or more validation datasets;
   generating, by the processor, for each user identifier having the target user attribute from the plurality of data providers, a target user attribute verification score based on:
      determining a value of the target user attribute within the user trait data from each data provider of the plurality of data providers;
      sampling user attribute accuracy rates from each provider of the plurality of data providers for the value of the target user attribute to generate a user attribute verification score distribution; and
      determining an average user attribute verification score from the user attribute verification score distribution for the plurality of data providers for the target user attribute; and
   generating, for display on an interactive graphical user interface on a client device, a user attribute verification score that comprises the target user attribute verification score for the target user attribute.

2. The computer-implemented method of claim 1, further comprising:
   aggregating the one or more validation datasets into a combined validation dataset; and
   resolving conflicts in the combined validation dataset between duplicative user identifiers that have different user attribute values for the target user attribute.

3. The computer-implemented method of claim 1, further comprising determining the user attribute accuracy rate for a given data provider by:
   determining, between the given data provider and the one or more validation datasets, matching user identities that comprise user attribute values for the target user attribute;
   comparing, for each matching user identifier, the user attribute values of the target user attribute in the given data provider to the user attribute values of the target user attribute in the one or more validation datasets; and
   generating the user attribute accuracy rate for the target user attribute for the given data provider by averaging the compared user attribute values.

4. The computer-implemented method of claim 1, further comprising generating the target user attribute verification score for each user identifier having the target user attribute by applying a weighted wisdom of crowds algorithm based on the user attribute values of the target user attribute within the user trait data from the plurality of data providers.

5. The computer-implemented method of claim 1, further comprising:
generating a user attribute verification score database that comprises the target user attribute verification score for the target user attribute;
receiving, from the client device, a segment of user identifiers and a target attribute value for the target user attribute;
determining, from the user attribute verification score database, a subset of user identifiers from the segment of user identifiers that have the target user attribute; and
providing the subset of user identifiers to the client device.

6. The computer-implemented method of claim 5, further comprising utilizing a user attribute verification score threshold to determine the subset of user identifiers by:
identifying user attribute verification score data entries within the user attribute verification score database based on the segment of user identifiers; and
for each of the identified user attribute verification score data entries within the user attribute verification score database, determining the subset of user identifiers by adding a user identifier to the subset of user identifiers when a user attribute value of the target user attribute associated with a given user attribute verification score data entry within the user attribute verification score database satisfies the user attribute verification score threshold.

7. The computer-implemented method of claim 6, further comprising:
providing, for display at the client device, on the interactive graphical user interface the subset of user identifiers shown within the segment of user identifiers;
receiving an update to the user attribute verification score threshold;
determining an updated subset of user identifiers that satisfies the updated user attribute verification score threshold; and
providing, for display at the client device, the updated subset of user identifiers within the interactive graphical user interface.

8. The computer-implemented method of claim 1, further comprising:
generating a user attribute verification score database that comprises the target user attribute verification score for the target user attribute; and
validating the target user attribute verification score for the target user attribute within the user attribute verification score database by comparing the target user attribute verification score for the target user attribute to a random holdout of user identifies within the one or more validation datasets.

9. The computer-implemented method of claim 1, further comprising:
analyzing the one or more validation datasets to determine a data skew corresponding to a deviation in user trait data in the one or more validation datasets;
generating a validation correction factor based on the data skew; and
determining the user attribute accuracy rate for a given data provider further based on applying the validation correction factor to the given data provider.

10. The computer-implemented method of claim 1, further comprising:
detecting a plurality of user attribute values for the target user attribute;
generating a confusion matrix comparing target user attribute values between a given data provided and the one or more validation datasets; and
determining, for a given data provider, the user attribute accuracy rate based on the confusion matrix.

11. The computer-implemented method of claim 1, wherein the user trait data from the plurality of data providers comprises scaled data entries, wherein the user trait data from the one or more validation datasets comprises declared data entries, and wherein a first number of user trait data from the plurality of data providers exceeds a second number of user trait data from the one or more validation datasets.

12. A system comprising:
one or more memory devices; and
one or more server devices configured to cause the system to:
receive user trait data from a plurality of data providers, wherein the plurality of data providers explicitly or implicitly collect the user trait data comprising user identifiers and corresponding user attributes;
receive additional user trait data from one or more validation datasets;
determining a target user attribute associated with the user identifiers in the user trait data for the plurality of data providers;
determine, by the one or more server devices, for each data provider of the plurality of data providers, a user attribute accuracy rate associated with each data provider based on comparing the target user attribute for a plurality of user identifiers in the user trait data for each data provider and the target user attribute for the plurality of user identifiers in the one or more validation datasets to determine a frequency of matches for the target user attribute between teach data provider and the one or more validation datasets;
generate, by the one or more server devices, for each user identifier having the target user attribute from the plurality of data providers, a target user attribute verification score based on:
determining a value of the target user attribute within the user trait data from each data provider of the plurality of data providers;
sampling user attribute accuracy rates from each provider of the plurality of data providers for the value of the target user attribute to generate a user attribute verification score distribution; and
determining an average user attribute verification score from the user attribute verification score distribution for the plurality of data providers for the target user attribute; and
generate, by the one or more server devices for display on an interactive graphical user interface on a client device, a user attribute verification score that comprises the target user attribute verification score for the target user attribute.

13. The system of claim 12, wherein the one or more server devices are further configured to cause the system to determine the user attribute accuracy rate for a given data provider by:
determining, between the given data provider and the one or more validation datasets, matching user identities that comprise user attribute values for the target user attribute;

comparing, for each matching user identifier, the user attribute values of the target user attribute in the given data provider to the user attribute values of the target user attribute in the one or more validation datasets; and generating the user attribute accuracy rate for the target user attribute for the given data provider by averaging the compared user attribute values.

14. The system of claim 12, wherein the one or more server devices are further configured to cause the system to generate the target user attribute verification score for each user identifier having the target user attribute by applying a weighted wisdom of crowds algorithm based on user attribute values of the target user attribute within the user trait data from the plurality of data providers.

15. The system of claim 12, wherein the one or more server devices are further configured to cause the system to:
detect a plurality of user attribute values for the target user attribute;
generate a confusion matrix comparing target user attribute values between a given data provider and the one or more validation datasets; and
determine, for the given data provider, the user attribute accuracy rate based on the confusion matrix.

16. A non-transitory computer-readable medium storing instructions that, when executed by at least one processor, cause a computing device to:
receive user trait data from a plurality of data providers, wherein the plurality of data providers explicitly or implicitly collect the user trait data comprising user identifiers and corresponding user attributes;
receive additional user trait data from one or more validation datasets;
determining a target user attribute associated with the user identifiers in the user trait data for the plurality of data providers;
determine, for each data provider of the plurality of data providers, a user attribute accuracy rate associated with each data provider based on comparing the target user attribute for a plurality of user identifiers in the user trait data for each data provider and the target user attribute for the plurality of user identifiers in the one or more validation datasets to determine a frequency of matches for the target user attribute between each data provider and the one or more validation datasets;
generate, for each user identifier having the target user attribute from the plurality of data providers, a target user attribute verification score based on:
determining a value of the target user attribute within the user trait data from each data provider of the plurality of data providers;
sampling user attribute accuracy rates from each provider of the plurality of data providers for the value of the target user attribute to generate a user attribute verification score distribution; and
determining an average user attribute verification score from the user attribute verification score distribution for the plurality of data providers for the target user attribute; and
generate, for display on an interactive graphical user interface on a client device, a user attribute verification score that comprises the target user attribute verification score for the target user attribute.

17. The non-transitory computer-readable medium of claim 16, further comprising instructions that, when executed by the at least one processor, cause the computing device to:
generate a user attribute verification score database that comprises the target user attribute verification score for the target user attribute;
receive, from the client device, a segment of user identifiers and a target attribute value for the target user attribute;
determine, from the user attribute verification score database, a subset of user identifiers from the segment of user identifiers that have the target user attribute; and
provide the subset of user identifiers to the client device.

18. The non-transitory computer-readable medium of claim 17, further comprising instructions that, when executed by the at least one processor, cause the computing device to utilize a user attribute verification score threshold to determine the subset of user identifiers by:
identifying user attribute verification score data entries within the user attribute verification score database based on the segment of user identifiers; and
for each of the identified user attribute verification score data entries within the user attribute verification score database, determining the subset of user identifiers by adding a user identifier to the subset of user identifiers when a user attribute value of the target user attribute associated with a given user attribute verification score data entry within the user attribute verification score database satisfies the user attribute verification score threshold.

19. The non-transitory computer-readable medium of claim 18, further comprising instructions that, when executed by the at least one processor, cause the computing device to:
provide, for display at the client device, on the interactive graphical user interface the subset of user identifiers shown within the segment of user identifiers;
receive an update to the user attribute verification score threshold;
determining an updated subset of user identifiers that satisfies the updated user attribute verification score threshold; and
provide, for display at the client device, the updated subset of user identifiers within the interactive graphical user interface.

20. The non-transitory computer-readable medium of claim 16, further comprising instructions that, when executed by the at least one processor, cause the computing device to:
generate a user attribute verification score database that comprises the target user attribute verification score for the target user attribute; and
validate the target user attribute verification score for the target user attribute within the user attribute verification score database by comparing the target user attribute verification score for the target user attribute to a random holdout of user identifies within the one or more validation datasets.

* * * * *